US012122919B2

(12) United States Patent
Feiler et al.

(10) Patent No.: US 12,122,919 B2
(45) Date of Patent: Oct. 22, 2024

(54) DICHROIC AZO-AZOMETHINE DYES FOR LIQUID CRYSTAL COMPOSITIONS

(71) Applicant: BASF SE, Ludwigshafen am Rhein (DE)

(72) Inventors: Leonhard Feiler, Basel (CH); Thomas Ruch, Basel (CH); Frank Bachmann, Basel (CH); Marie-Pascale Perritaz, Basel (CH); Gerardus De Keyzer, Basel (CH)

(73) Assignee: BASF SE, Ludwigshafen am Rhein (DE)

( * ) Notice: Subject to any disclaimer, the term of this patent is extended or adjusted under 35 U.S.C. 154(b) by 120 days.

(21) Appl. No.: 17/427,403

(22) PCT Filed: Jan. 17, 2020

(86) PCT No.: PCT/EP2020/051103
§ 371 (c)(1),
(2) Date: Jul. 30, 2021

(87) PCT Pub. No.: WO2020/156832
PCT Pub. Date: Aug. 6, 2020

(65) Prior Publication Data
US 2022/0098412 A1    Mar. 31, 2022

(30) Foreign Application Priority Data
Feb. 1, 2019    (EP) ..................................... 19155043

(51) Int. Cl.
*C09B 31/053*    (2006.01)
*C09B 31/043*    (2006.01)
(Continued)

(52) U.S. Cl.
CPC .......... *C09B 31/053* (2013.01); *C09B 31/043* (2013.01); *C09B 31/26* (2013.01); *C09B 31/30* (2013.01); *C09K 19/601* (2013.01)

(58) Field of Classification Search
CPC ....................................................... C09K 19/60
See application file for complete search history.

(56) References Cited

U.S. PATENT DOCUMENTS

| 4,398,803 A | 8/1983 | Eidenschink et al. |
| 4,565,424 A | 1/1986 | Huffman et al. |

(Continued)

FOREIGN PATENT DOCUMENTS

| CN | 102822142 B | 11/2014 |
| DE | 3022818 A1 | 1/1982 |

(Continued)

OTHER PUBLICATIONS

F . Nourmohammadian et al. (Benzothiazole-Based Bis-azo Cationic Fluorescent Dyes with Extended Conjugated Systems: Synthesis and Properties; Journal of Applied Solution Chemistry and Modeling, 2015, 4, 83-94). (Year: 2015).*

(Continued)

*Primary Examiner* — Chanceity N Robinson
(74) *Attorney, Agent, or Firm* — Faegre Drinker Biddle & Reath LLP

(57) ABSTRACT

Azo-azomethine dyes, a dichroic dye mixture including azo-azomethine dyes, a liquid crystal composition with the azo-azomethine dyes, and methods for producing the dyes and dye compositions. The dyes can be used in liquid crystal systems, transmissive displays, and smart windows.

(Continued)

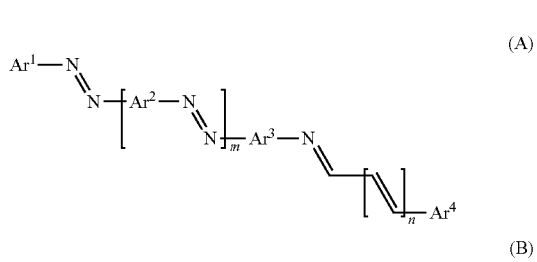

14 Claims, 2 Drawing Sheets

(51) Int. Cl.
*C09B 31/26* (2006.01)
*C09B 31/30* (2006.01)
*C09K 19/60* (2006.01)

(56) References Cited

U.S. PATENT DOCUMENTS

| | | | |
|---|---|---|---|
| 2006/0147652 | A1 | 7/2006 | Liu et al. |
| 2013/0187090 | A1 | 7/2013 | Goto |
| 2015/0218455 | A1 | 8/2015 | Xu et al. |

FOREIGN PATENT DOCUMENTS

| | | | | |
|---|---|---|---|---|
| EP | 0084208 | A2 | * | 7/1983 |
| EP | 0202341 | A1 | | 11/1986 |
| EP | 0260450 | A1 | | 3/1988 |
| EP | 1352943 | A1 | | 10/2003 |
| EP | 2554536 | A1 | | 2/2013 |
| EP | 2725083 | A2 | | 4/2014 |
| EP | 3048159 | A1 | | 7/2016 |
| JP | 56-104984 | A | | 8/1981 |
| JP | 60-262858 | A | | 12/1985 |
| JP | 61-098768 | A | | 5/1986 |
| JP | 2011-046904 | A | | 3/2011 |
| TW | 201127943 | A | | 8/2011 |
| WO | WO-2011024891 | A1 | * | 3/2011 .......... C09B 31/047 |
| WO | 2011/157614 | A1 | | 12/2011 |

OTHER PUBLICATIONS

F. Nourmohammadian (An Arginine Selective Colorimetric Assay Using Azo benzothiazole-Polyene Based Dipolar Molecular Receptor; ISSN 1061-9348, Journal of Analytical Chemistry, 2016, vol. 71, No. 1, pp. 50-55. © Pleiades Publishing, Ltd., 2016). (Year: 2016).*

Agnieszka et al., "Mesomorphic Behavior of Symmetrical and Unsymmetrical Azomethines with Two Imine Groups" Materials, vol. 2, No. 1, 2009, pp. 38-61.

International Search Report and Written Opinion received for PCT Patent Application No. PCT/EP2020/051103, mailed on Apr. 9, 2020, 16 pages.

Invitation to Pay Additional Fees received for PCT Patent Application No. PCT/EP2020/051103, mailed on Feb. 25, 2020, 12 pages.

Shahab et al., "Design of geometry, synthesis, spectroscopic (FT-IR, UV/Vis, excited state, polarization) and anisotropy (thermal conductivity and electrical) properties of new synthesized derivatives of (E,E)-azomethines in colored stretched poly (vinyl alcohol) matrix", Journal of Molecular Structure, vol. 1157, 2017, pp. 536-550.

European Search Report for EP Patent Application No. 19155043.3, Issued on Nov. 26, 2019, 6 pages.

Ibrahim, Tareq K., "Synthesis of 2-amino-5-(substituted phenyl)-1,3,4-thiadiazole and evaluation of biological activity", Journal of Applicable Chemistry, vol. 4, No. 3, 2015, pp. 847-852.

Seki et al., "Light-Stability of Guest-Host Cells", Molecular Crystals and Liquid Crystals, vol. 66, 1981, pp. 209-218.

Thaker et al., "Effects of Different Terminal Substituents on the Mesomorphic Behavior of Some Azo-Schiff Base and Azo-Ester-Based Liquid Crystals", Molecular Crystals and Liquid Crystals, vol. 528, 2010, pp. 120-137.

White et al., "New absorptive mode reflective liquid crystal display device", Journal of Applied Physics, vol. 45, Issue 11, 1974, pp. 4718-4723.

* cited by examiner

DICHROIC AZO-AZOMETHINE DYES FOR LIQUID CRYSTAL COMPOSITIONS

CROSS-REFERENCE TO RELATED APPLICATIONS

This application is a national stage application (under 35 U.S.C. § 371) of PCT/EP2020/051103, filed Jan. 17, 2020, which claims benefit of European Application No. 19155043.3, filed Feb. 1, 2019, both of which are incorporated herein by reference in their entirety.

The present invention relates to azo-azomethine dyes, a dichroic dye mixture comprising said azo-azomethine dyes, a liquid crystal composition comprising a liquid crystal material and said azo-azomethine dyes as well as to a process for preparing said azo-azomethine dyes. Further, the invention relates to a light absorption anisotropic element comprising said azo-azomethine dyes. The azo-azomethine dyes are suitable as part of a light absorption anisotropic element in a switchable optical device, for example, as a polymer dispersed liquid crystal system, a reversed polymer dispersed liquid crystal system, a polymer network liquid crystal system, a light shutter for smart windows or decorative elements, a transmissive display, or a reflective display, or in an optically anisotropic film, for example, as a stretched polymer film, a coatable polarizer, a retarder film, a security feature or a feature for brand protection.

BACKGROUND OF THE INVENTION

Azo compounds are of interest for many technical fields of application. Chromophores, for example, based on azo compounds, are known to be suitable as dichroic dyes.

In the meaning of the present application, a dichroic dye is a light-absorbing compound in which the absorption properties are dependent on the alignment (orientation) of the compound relative to the direction of the polarization of the light. A dichroic dye compound typically has an elongated shape, i.e., the compound is significantly longer in one spatial direction (longitudinal direction) than in the other two spatial directions.

Therefore, dichroic dyes are useful in liquid crystal mixtures of switchable optical devices.

With such liquid crystal mixtures comprising at least one dichroic dye, it is possible to control the absorption or emission (or both) of light by the dye. A measure how well the absorption can be controlled is the dichroic ratio (DR) of the dye in the liquid crystal mixture. The dichroic ratio (DR) is the ratio in absorption for light which is polarized parallel to the orientational axis of the molecule ($A_{\parallel}$) versus light which is polarized perpendicular to the orientational axis ($A_{\perp}$): DR (dichroic ratio)=$A_{\parallel}/A_{\perp}$.

Another value for expressing the degree of dichroism is the order parameter (S), which is defined as $$S = \frac{(A_{\parallel} - A_{\perp})}{A_{\parallel} + 2A_{\perp}} = (DR-1)/(DR+2).$$

The order parameter is 1 for perfect order and 0 for a perfect isotropic system.

A high dichroic ratio or order parameter allows to realize a high contrast in absorption, which is desirable in many applications.

In order to achieve a good control of the absorption of light, a high dichroic ratio is desired.

Additionally, it is desirable to have a high solubility of the dichroic dye in the liquid crystal mixture. The higher the solubility of the dye, the higher is the optical contrast for the light controlling device.

Further, a high light stability of the dye is desirable. A light stability allows a long lifetime of the devices in high power conditions, such as sunlight, lasers or interior lighting.

Because of its good dichroic ratio, azo compound chromophores have been suggested as dyes in liquid crystal mixtures.

WO 2011/157614 A1 discloses blue dichroic polyazo dyes and a black dichroic dye composition comprising said blue dye and further at least one red polyazo dye and its use in display technology. The composition comprises, for example, the following compounds:

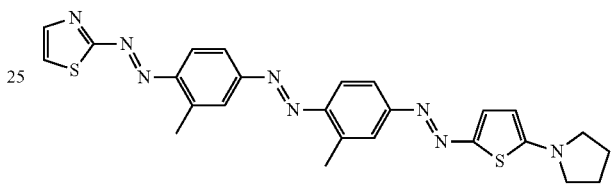

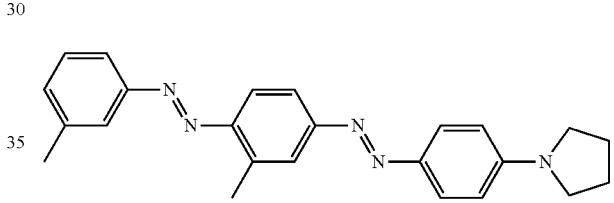

U.S. Pat. No. 4,565,424 A relates to dichroic dyes and to guest-host combinations thereof with nematic liquid crystals. The dichroic dyes are asymmetric molecules having poly(arylazo) linking groups, bis-substituted aryl thiazyl substituents, and either naphthyl, perimidine or julolidine substituents. The use of the dichroic dyes with additional well-known dichroic dyes having absorption maxima between about 400 and 600 nm, in liquid crystal devices provides displays which alternate generally between a neutral black and a clear state when an electric field is present, or absent, respectively. An Example for a suitable dye according to U.S. Pat. No. 4,565,424 A is dye 1 having the following structure:

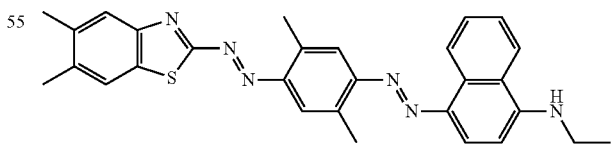

JP 2011-046904 A discloses a dichroic dye composition containing at least one liquid-crystalline dichroic dye of general formula (I): $Ar^1$—N=N—$Ar^2$-$L^1$-$Ar^3$-$L^2$-$Ar^4$ (I), for example, a compound A9 having the following structure, which requires an azo-containing aldehyde for the preparation:

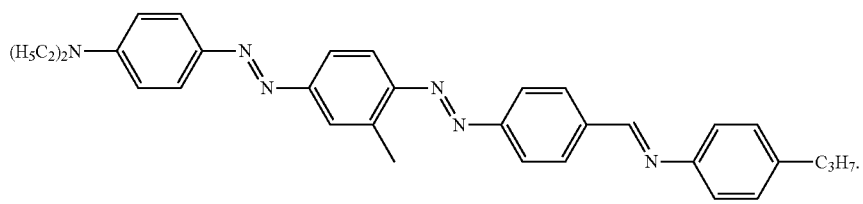

The composition is described to exhibit a high dichroic ratio and good orientation properties and is suitable for forming a polarization film with thin film thickness and high polarization degree. Said films may be used in liquid crystal display devices.

JP S61-098768 A discloses yellow to purple benzoxazole-substituted diazo or azo-azomethine dyes for use in liquid crystal displays. JP S60-262858 A discloses benzotriazole-substituted azo dyes.

EP 0202341 A1 discloses dichroic azo dyes with the characteristic feature of a p-substituted biphenylene-azo-1,4-naphylene unit which are described as suitable for use in liquid crystal displays, for example, a compound of the following formula:

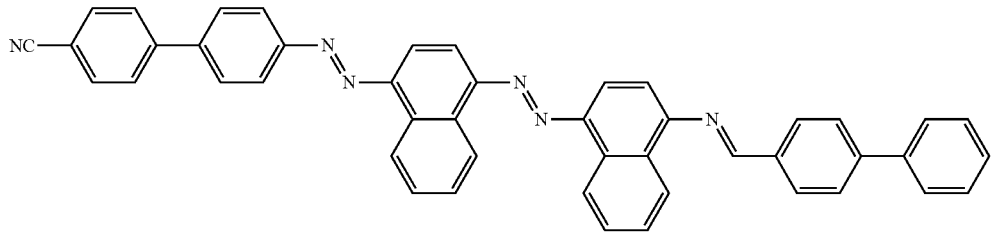 [SMILES: N#Cc1ccc(-c2ccc(/N=N/c3ccc(/N=N/c4ccc(/N=C/c5ccc(-c6ccccc6)cc5)c5ccccc45)c4ccccc34)cc2)cc1]

In H. Seki et al., Mol. Cryst. Liq. Cryst., 1981, Vol. 66, pp. 209-218, the light-stability of liquid-crystal color display devices using guest-host interactions is investigated. Various azomethine-, diazo- and anthraquinone-dyes with high dichroic ratios were put into the test, wherein a biphenyl mixture LIXON GR-41 (Chisso Corp.) was used as a host. One azomethine dye is mentioned in H. Seki et al.:

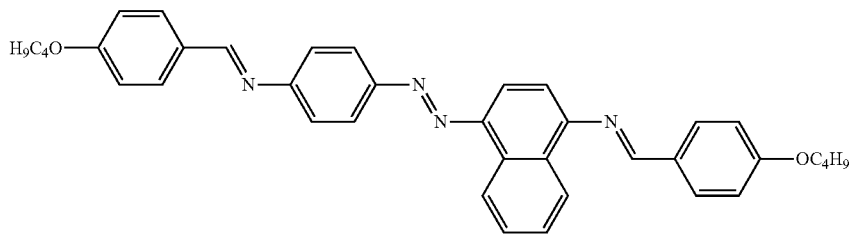

US 2015/0218455 A1 discloses a dichroic dye mixture comprising, for example, the same azo-azomethine dye, as disclosed by Seki et al., and two dichroic dyes based on amino-anthraquinones. The mixture contained in the host liquid crystal composition MLC-2039 (Merck) is described to have a uniform absorption to light between 420 and 680 nm and a good low-temperature storage stability.

US 2006/0147652 A1 discloses dichroic dyes which are described to exhibit good solubility and high dichroic ratio, for example, a compound of following structure, and dichroic compositions containing the same in ZLI 1840 (Merck):

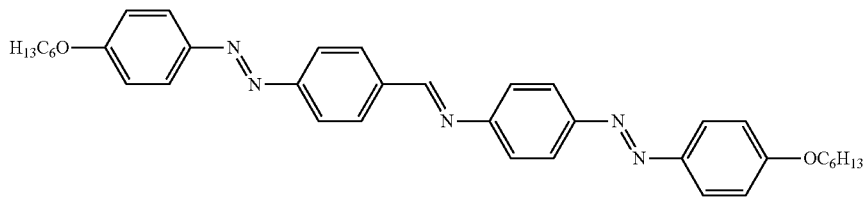

The prior art mentioned herein-before mainly concerns liquid crystal "guest-host" systems which are, for example, employed in display devices. The term "host" refers to the liquid crystal material, and the term "guest" refers to an agent which may be aligned by the host to produce contrasting light absorptive states.

As mentioned herein-before, a high dichroic ratio is desired in order to achieve a good control of the absorption (or emission, or both) of light. Additionally, it is desirable to have a high compatibility, e.g., a high solubility and a good durability of the dichroic dye in the liquid crystal mixture.

In order to provide a high solubility, dyes with long alkyl groups or optionally substituted phenyl-cyclohexyl groups are preferred, since such groups positively influence the solubility. In order to provide a sufficiently high dichroic ratio, the dichroic dye typically has an elongated shape with substituents similar to the liquid-crystalline material which also comprises an elongated shape. There is a continuing need for dichroic dyes in order to comply with the requirements of high solubility and high dichroic ratio.

Therefore, it is an object of the present invention to provide easily available dichroic dyes for use in liquid crystal compositions having a high compatibility, e.g., a high solubility and a good durability, like high lightfastness, in the liquid crystal mixture, and at the same time a high dichroic ratio.

SUMMARY OF THE INVENTION

It has now been found that specific azo-azomethine dyes are characterized by a high dichroic ratio as well as by a high compatibility, e.g., a high solubility and a good durability in liquid crystal mixtures.

Accordingly, in a first aspect the invention relates to a compound of formula (A) or (B)

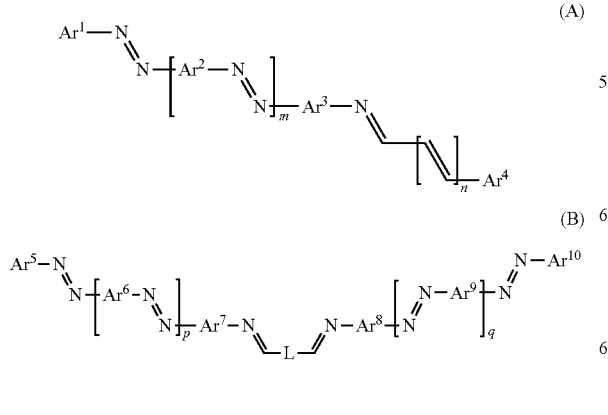

wherein $Ar^1$, $Ar^5$ and $Ar^{10}$ are independently of one another a residue selected from the group consisting of

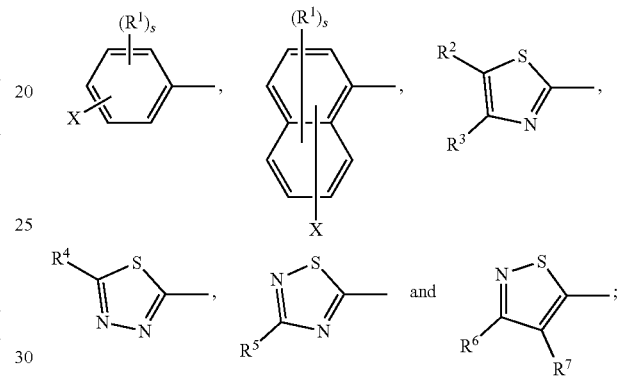

$Ar^2$, $Ar^3$, $Ar^6$, $Ar^7$, $Ar^8$ and $Ar^9$ are independently of one another and at each occurrence selected from

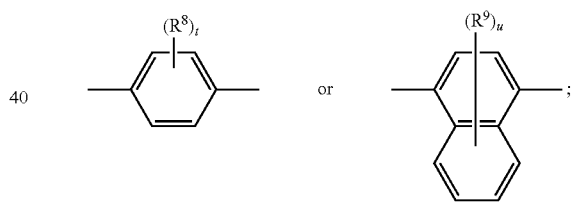

$Ar^4$ is a residue of

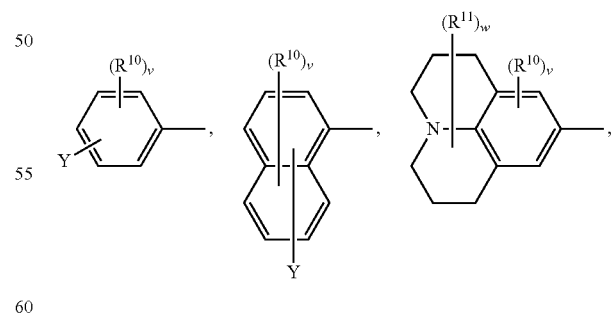

$C_2$-$C_{10}$-heteroaryl, $C_2$-$C_{10}$-heteroaryl substituted with $C_1$-$C_{12}$-alkyl, $C_1$-$C_{12}$-alkoxy, $C_1$-$C_{12}$-alkylthio, OH, halogen, $C_1$-$C_4$-haloalkyl, $NR^{12}R^{13}$, $CO_2R^{14}$, $COR^{15}$, $SO_2R^{16}$, $NO_2$ or CN;

X is $C_1$-$C_6$-haloalkyl, halogen, CN, $COOR^{17}$, $CONR^{18}R^{19}$, $SO_2R^{20}$ or heteroaryl, said heteroaryl is selected from the group consisting of

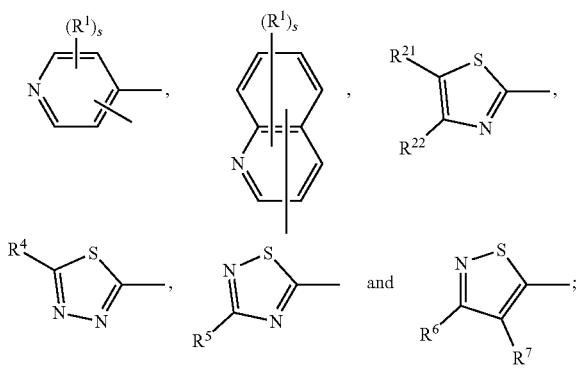

Y is H, $C_1$-$C_{12}$-alkyl; $C_1$-$C_{12}$-alkyl substituted with OH or $NH_2$ and/or interrupted with $NR^{23}$, O or S; $C_1$-$C_{12}$-haloalkyl, $C_7$-$C_{12}$-aralkyl; $NR^{24}R^{25}$, halogen, CN, OH, $C_1$-$C_{12}$-alkoxy; $C_2$-$C_{12}$-alkoxy interrupted with O; $C_1$-$C_{12}$-alkylthio; $COOR^{26}$, $C_6$-$C_{12}$-aryl; $C_6$-$C_{12}$-aryl substituted with $C_1$-$C_{12}$-alkyl, $C_1$-$C_{12}$-alkoxy, $C_1$-$C_{12}$-alkylthio, CN, halogen, OH or $NR^{27}R^{28}$; $C_2$-$C_{10}$-heteroaryl, $C_2$-$C_{10}$-heteroaryl substituted with $C_1$-$C_{12}$-alkyl, $C_1$-$C_{12}$-alkoxy, $C_1$-$C_{12}$-alkylthio, OH, halogen, CN or $NR^{29}R^{30}$; $C_3$-$C_{18}$-cycloalkyl, or $C_3$-$C_{18}$-cycloalkyl substituted with $C_1$-$C_{12}$-haloalkyl, halogen, CN, OH, $C_1$-$C_{12}$-alkoxy, $C_1$-$C_{12}$-alkylthio or $NR^{31}R^{32}$ and/or interrupted by one or more O;

or Y and one adjacent H form together a group

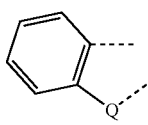

or a 5 to 7-membered heterocyclic ring containing one or two Q,

Q is $NR^{33}$, O or S;

said group

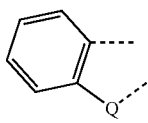

or heterocyclic ring is unsubstituted or substituted with $C_1$-$C_4$alkyl;

$R^1$ is $C_1$-$C_{12}$-alkyl, $C_1$-$C_{12}$-haloalkyl, halogen, CN, $C_1$-$C_{12}$-alkoxy or $C_2$-$C_{12}$-alkoxy interrupted with O;

$R^2$, $R^3$, $R^4$, $R^5$, $R^6$, $R^7$, $R^{21}$ and $R^{22}$ are independently of one another and at each occurrence selected from H, halogen, $OCF_3$, $NO_2$, CN, formyl, $COOR^{34}$, $COR^{35}$, $SO_2R^{36}$, $CONR^{37}R^{38}$, $C_1$-$C_{12}$-alkyl; $C_1$-$C_{12}$-alkyl substituted with halogen or CN; $C_1$-$C_{12}$-alkoxy; $C_2$-$C_{12}$-alkoxy interrupted with O; $C_3$-$C_{12}$-cycloalkyl; $C_3$-$C_{12}$-cycloalkyl substituted with halogen or CN and/or interrupted by one or more O; phenyl; or phenyl substituted with halogen, CN, $C_1$-$C_8$-alkyl or $C_1$-$C_8$-haloalkyl;

or $R^2$ and $R^3$, or $R^6$ and $R^7$ together are C3-$C_4$-alkylene or form a benzoanellated ring, said alkylene or benzoanellated ring is unsubstituted or substituted with $C_1$-$C_4$-alkyl, CN, $C_1$-$C_4$-alkoxy, $NO_2$, halogen, or $SO_2R^{39}$;

or $R^{21}$ and $R^{22}$ together are C3-$C_4$-alkylene, said alkylene is unsubstituted or substituted with C1-$C_4$-alkyl, CN, $C_1$-$C_4$-alkoxy, $NO_2$, halogen, or $SO_2R^{40}$;

$R^8$ and $R^9$ are independently of one another and at each occurrence selected from $C_1$-$C_4$-alkyl, $C_1$-$C_4$-haloalkyl, halogen, CN or $C_1$-$C_4$-alkoxy;

$R^{10}$ is at each occurrence selected from $C_1$-$C_{12}$-alkyl, $C_1$-$C_4$-haloalkyl, $C_1$-$C_{12}$-alkoxy, OH, halogen or CN;

$R^{11}$ is at each occurrence $C_1$-$C_4$-alkyl;

$R^{14}$, $R^{15}$, $R^{16}$, $R^{17}$, $R^{20}$, $R^{26}$, $R^{34}$, $R^{35}$, $R^{36}$, $R^{39}$ and $R^{40}$ are independently of one another $C_1$-$C_{12}$-alkyl; $C_1$-$C_{12}$-alkyl substituted with CN or OH; $C_1$-$C_{12}$-haloalkyl; $C_3$-$C_{12}$-cycloalkyl, $C_3$-$C_{12}$-cycloalkyl substituted with $C_1$-$C_{12}$-haloalkyl, CN, OH or halogen and/or interrupted by one or more O; $C_6$-$C_{12}$-aryl, $C_6$-$C_{12}$-aryl substituted with halogen, CN, OH, $C_1$-$C_{12}$-alkyl or $C_1$-$C_{12}$-haloalkyl; phenylene-$C_3$-$C_{12}$-cycloalkyl; phenylene-$C_3$-$C_{12}$-cycloalkyl substituted with halogen, CN or OH; $C_3$-$C_{12}$-cycloalkylene-phenyl; or $C_3$-$C_{12}$-cycloalkylene-phenyl substituted with $C_1$-$C_{12}$-alkyl, $C_1$-$C_{12}$-haloalkyl, halogen, CN or OH;

$R^{12}$, $R^{13}$, $R^{18}$, $R^{19}$, $R^{24}$, $R^{25}$, $R^{27}$, $R^{28}$, $R^{29}$, $R^{30}$, $R^{31}$, $R^{32}$, $R^{37}$ or $R^{38}$ are independently of one another H, $C_1$-$C_{12}$-alkyl; $C_3$-$C_{14}$-cycloalkyl; $C_6$-$C_{12}$-aryl; $C_6$-$C_{12}$-aryl substituted with halogen, CN, OH, $C_1$-$C_{12}$-alkyl or $C_1$-$C_{12}$-haloalkyl; phenylene-$C_3$-$C_{12}$-cycloalkyl; phenylene-$C_3$-$C_{12}$-cycloalkyl substituted with halogen, CN or OH; $C_3$-$C_{12}$-cycloalkylene-phenyl; or $C_3$-$C_{12}$-cycloalkylene-phenyl substituted with $C_1$-$C_{12}$-alkyl, $C_1$-$C_{12}$-haloalkyl, halogen, CN or OH;

or $R^{12}$ and $R^{13}$, $R^{18}$ and $R^{19}$, $R^{24}$ and $R^{25}$, $R^{27}$ and $R^{28}$, $R^{29}$ and $R^{30}$, $R^{31}$ and $R^{32}$, or $R^{37}$ and $R^{38}$ together are $C_2$-$C_{12}$-alkylene or $C_2$-$C_{12}$-alkylene interrupted by O, S and/or $NR^{41}$;

$R^{23}$, $R^{33}$ and $R^{41}$ are independently of one another H, $C_1$-$C_{12}$-alkyl, $C_3$-$C_{12}$-cycloalkyl, phenyl or phenyl substituted with $C_1$-$C_6$-alkyl, F or CN;

L is a single bond or a group selected from

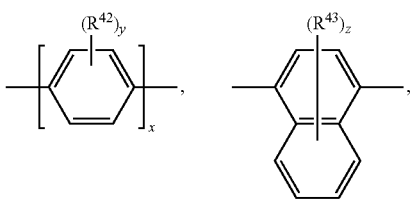

$C_4$-$C_{10}$-heteroarylene or $C_4$-$C_{10}$-heteroarylene substituted with $R^{44}$;

$R^{42}$, $R^{43}$ and $R^{44}$ are independently of one another and at each occurrence selected from $C_1$-$C_4$-alkyl, $C_1$-$C_4$-haloalkyl, $C_1$-$C_4$-alkoxy, halogen, OH, CN or $COOR^{45}$;

$R^{45}$ is $C_1$-$C_4$-alkyl;

m, n, p and q are independently of one another 0 or 1, with the proviso that the sum m+n≥1;

s, t, u, v, y and z are independently of one another 0, 1 or 2;

w is 0, 1, 2, 3 or 4; and x is 1 or 2.

In a further aspect, the invention relates to a process for preparing a compound of formula (A) or (B), as defined herein.

In a further aspect, the invention relates to a dichroic dye mixture comprising one or more compounds of formula (A) or (B), as defined herein, and optionally further dichroic dyes.

In a further aspect, the invention relates to a liquid crystal composition comprising a liquid crystal material and at least one compound of formula (A) or (B), as defined herein, or a dichroic dye mixture, as defined herein.

In a further aspect, the invention relates to a light absorption anisotropic element comprising a compound of formula (A) or (B), as defined herein, or a dichroic dye mixture, as defined herein, or a liquid crystal composition, as defined herein.

In a further aspect, the invention relates to a switchable optical device comprising a compound of formula (A) or (B), as defined herein, or a dichroic dye mixture, as defined herein, or a liquid crystal composition, as defined herein.

In a further aspect, the invention relates to an optically anisotropic film comprising at least one compound of formula (A) or (B), as defined herein, or a dichroic dye mixture, as defined herein, or a liquid crystal composition, as defined herein.

In a further aspect, the invention relates to the use of a compound of formula (A) or (B), as defined herein, or a dichroic dye mixture, as defined herein, or a liquid crystal composition, as defined herein, in a light absorption anisotropic element as component of an optically switchable device or of an optically anisotropic film.

DETAILED DESCRIPTION OF THE INVENTION

The terms alkyl, alkylene, cycloalkyl, haloalkyl, alkoxy, aryl, heteroaryl, aralkyl, halogen are known in the art and generally have the following meaning, if said groups are not further specified in specific embodiments mentioned below:

Alkyl, e.g., $C_1$-$C_4$-alkyl, $C_1$-$C_6$-alkyl, $C_1$-$C_8$-alkyl, $C_1$-$C_{12}$-alkyl, $C_5$-$C_{12}$-alkyl, $C_2$-$C_{12}$-alkyl, may be within the given limits of carbon atoms linear or branched, where possible. Examples are methyl (Me), ethyl (Et), n-propyl, isopropyl, n-butyl, s-butyl, isobutyl, t-butyl, n-pentyl, 2-pentyl, 3-pentyl, 2,2-dimethylpropyl, n-hexyl, 1-methylhexyl, n-heptyl, isoheptyl, 1,1,3,3-tetramethylbutyl, 1-methylheptyl, 3-methylheptyl, n-octyl, 2-ethylhexyl, n-nonyl, n-decyl, n-undecyl, n-dodecyl and constitutional isomers of the aforementioned n-alkyl radicals. Any alkyl moiety may be substituted, for example, with F, CN and/or OH, preferably F or CN.

Any alkyl, alkoxy or alkylthio moiety of more than one, especially more than 2 carbon atoms, or such alkyl moieties which are part of another moiety may be interrupted by a heterofunction like O, S or NR', wherein R' is, for example, H, $C_1$-$C_{12}$-alkyl, $C_3$-$C_{12}$-cycloalkyl or phenyl. They may be interrupted by one or more of these heterofunction groups, one group in each case being inserted, in general, into one C—C-bond of the alkyl or alkoxy moiety. If the interrupted moiety is additionally substituted, the substituents are generally not at the heteroatom. If two or more interrupting groups of the type —O—, —NR'—, —S— occur in one radical, they often are identical.

Alkylene, e.g., $C_3$-$C_4$-alkylene, $C_2$-$C_{12}$-alkylene, may be derived from above-defined alkyl by abstracting a H atom from any terminal carbon atom of the alkyl.

Cycloalkyl, e.g., $C_3$-$C_{18}$-cycloalkyl, $C_3$-$C_{12}$-cycloalkyl, $C_5$-$C_{14}$-cycloalkyl, $C_5$-$C_6$-cycloalkyl, include cycloalkyl groups which may be unsubstituted or substituted with alkyl groups. Examples are cyclopropyl, cyclobutyl, cyclopentyl, methylcyclopentyl, dimethylcyclopentyl, cyclohexyl, methylcyclohexyl, dimethylcyclohexyl, trimethylcyclohexyl, tert-butylcyclohexyl, butylcyclohexyl, hexylcyclohexyl, dodecylcyclohexyl, cycloheptyl, cyclooctyl, cyclononyl, cyclodecyl, cyclododecyl or 1,4-cyclohexylene-cyclohexyl. Cyclohexyl and cyclopentyl are preferred, more preferred is cyclohexyl, optionally 4-substituted with $C_1$-$C_{12}$-alkyl, $C_1$-$C_8$-alkyl, $C_1$-$C_7$-alkyl or $C_1$-$C_5$-alkyl, Cycloalkyl, e.g., $C_3$-$C_{18}$-cycloalkyl which is interrupted by one or more O, preferably one O, is, for example, tetrahydropyranyl.

Examples of phenylene-$C_3$-$C_{18}$-cycloalkyl groups are

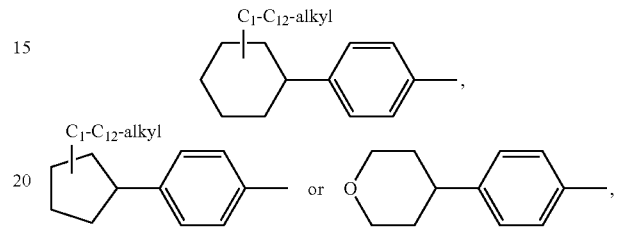

preferably

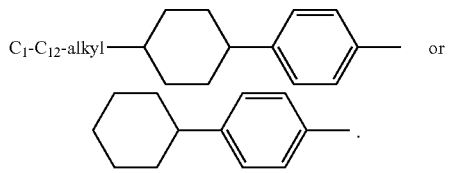

Substituents like halogen, CN or OH are preferably located at the alkyl groups.

An example of a $C_3$-$C_{18}$-cycloalkylene-phenyl group is

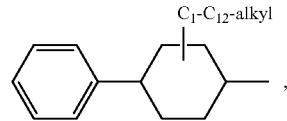

preferably

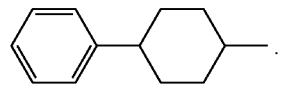

Substituents, like alkyl, haloalkyl, halogen, CN or OH are preferably located at the phenyl ring.

Haloalkyl, e.g., $C_1$-$C_4$-haloalkyl, $C_1$-$C_6$-haloalkyl, $C_1$-$C_8$-haloalkyl, $C_1$-$C_{12}$-haloalkyl, may be within the given limits of carbon atoms linear or branched, where possible. Examples are alkyl groups mentioned herein-before wherein the H atoms thereof are partly or entirely substituted by halogen atoms. Preferred haloalkyl groups are fluoroalkyl groups, more preferred are perfluoro groups, most preferred is $CF_3$.

Alkoxy, e.g., $C_1$-$C_4$-alkoxy, $C_1$-$C_8$-alkoxy, $C_1$-$C_{12}$-alkoxy, $C_2$-$C_{12}$-alkoxy, is alkyl-O.

Alkylthio, e.g., $C_1$-$C_4$-alkylthio, $C_1$-$C_{12}$-alkylthio, $C_2$-$C_{12}$-alkylthio, is alkyl-S. Aryl, e.g., $C_6$-$C_{10}$-aryl or $C_6$-$C_{12}$-aryl, may be within the given limits of carbon atoms phenyl, 1-naphthyl, 2-naphthyl, biphenylyl or ferrocenyl. Said aryl groups may be unsubstituted or substituted.

Heteroaryl, e.g., $C_2$-$C_{10}$-heteroaryl, $C_2$-$C_5$-heteroaryl, may be a non-condensed or condensed heteroaryl group, typically containing O, S and/or N. Examples are thienyl, furyl, pyrrolyl, imidazolyl, pyrazolyl, thiazolyl, isothiazolyl, thiadiazolyl, oxazolyl, isoxazolyl, pyridyl, triazinyl, pyrimidinyl, benzo[b]thienyl, benzofuranyl, bipyridyl, isoindolyl, indolyl, chinolyl, isochinolyl, benzothiazolyl, benzoisothiazolyl, benzotriazolyl, benzoxazolyl, azabenzo-isothiazolyl, thienothienyl orthieno[2,3-d]thiazol-yl. Said heteroaryl groups may be unsubstituted or substituted.

Heteroarylene, e.g., $C_4$-$C_{10}$-heteroarylene or $C_4$-$C_6$-heteroarylene, may be thiophene-2,5-diyl, pyrrol-2,5-diyl, for example,

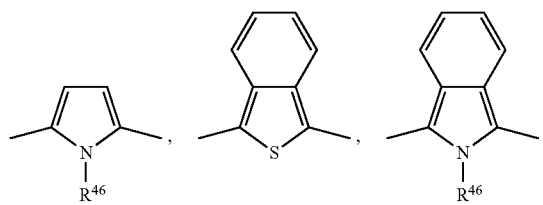,

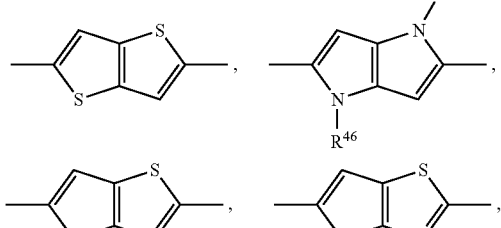,

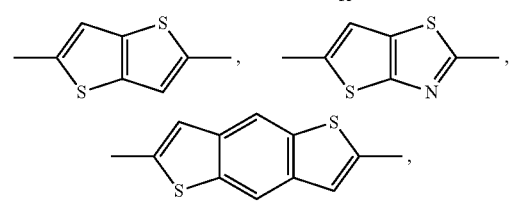,

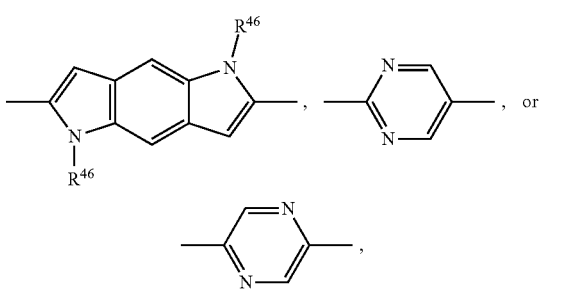 or wherein $R^{46}$ is H, $C_1$-$C_4$-alkyl, $C_5$-$C_6$-cycloalkyl or phenyl, preferably H, methyl or ethyl.

Aralkyl, e.g., $C_7$-$C_{12}$-aralkyl, may be within the given limits of carbon atoms, for example, benzyl, 2-benzyl-2-propyl, p-phenyl-ethyl (phenethyl), α,α-dimethylbenzyl, ω-phenyl-butyl, ω,ω-dimethyl-ω-phenyl-butyl, in which both the aliphatic and the aromatic hydrocarbon group may be unsubstituted or substituted. Preferred examples are benzyl, phenethyl, α,α-dimethylbenzyl, ω-phenyl-butyl, ω-phenyl-dodecyl and ω-phenyl-octadecyl.

Halogen (Hal) denotes I, Br, Cl, or F, preferably F or Cl, more preferably F.

Examples of groups

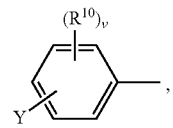, where Y and one adjacent H form together a group

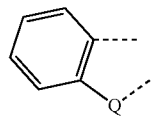

and Q is $NR^{33}$, O or S, may be

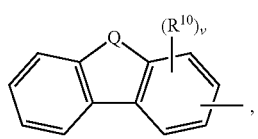, preferably

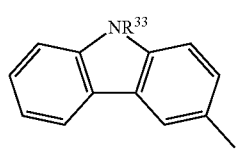.

Said groups are unsubstituted or substituted with $C_1$-$C_4$-alkyl, preferably with methyl or ethyl. More preferred are unsubstituted groups.

Examples of groups

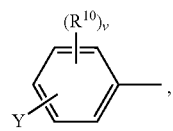, where Y and one adjacent H form together a 5- to 7-membered heterocyclic ring containing one or two Q, may be

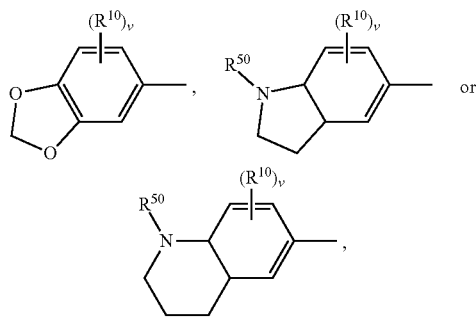

wherein R⁵⁰ is H or $C_1$-$C_4$-alkyl, preferably H, methyl or ethyl. Said groups are unsubstituted or substituted with $C_1$-$C_4$-alkyl, preferably methyl or ethyl. More preferred are unsubstituted groups, and v is 0.

Examples of groups of formula

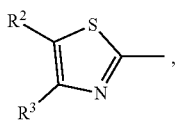

where $R^2$ and $R^3$ together are $C_3$-$C_4$-alkylene, may be

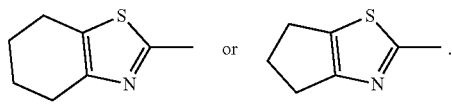

The groups may be unsubstituted or substituted. Butylene is preferred. The same applies to $R^6$ and $R^7$ and $R^{21}$ and $R^{22}$.

Examples of groups of formula

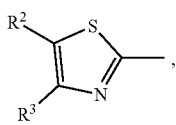

where $R^2$ and $R^3$ together form a benzoannelated ring, may be

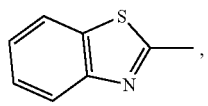

which may be unsubstituted or substituted.

Amine groups, for example, as represented by $NR^{12}NR^{13}$, wherein $R^{12}$ and $R^{13}$ together are $C_2$-$C_{12}$-alkylene or $C_2$-$C_{12}$-alkylene interrupted by O, S and/or $NR^{41}$, are cyclic amines, wherein $R^{12}$ and $R^{13}$ thus form, together with the nitrogen atom they are attached to, an aliphatic N-heterocyclic residue comprising 2 to 12 ring carbon atoms, which may be optionally substituted by alkyl groups. Examples are morpholinyl, thiomorpholinyl, piperidinyl, pyrrolidinyl,

or a $C_1$-$C_8$-alkyl substituted variant thereof.

The term "substituted" means "substituted one or more times with", that is 1 to 3 times, where possible, preferably 1 or 2 times, more preferably 1. If a substituent occurs more than once in a group, it may be different in each occurrence.

Figure 1:
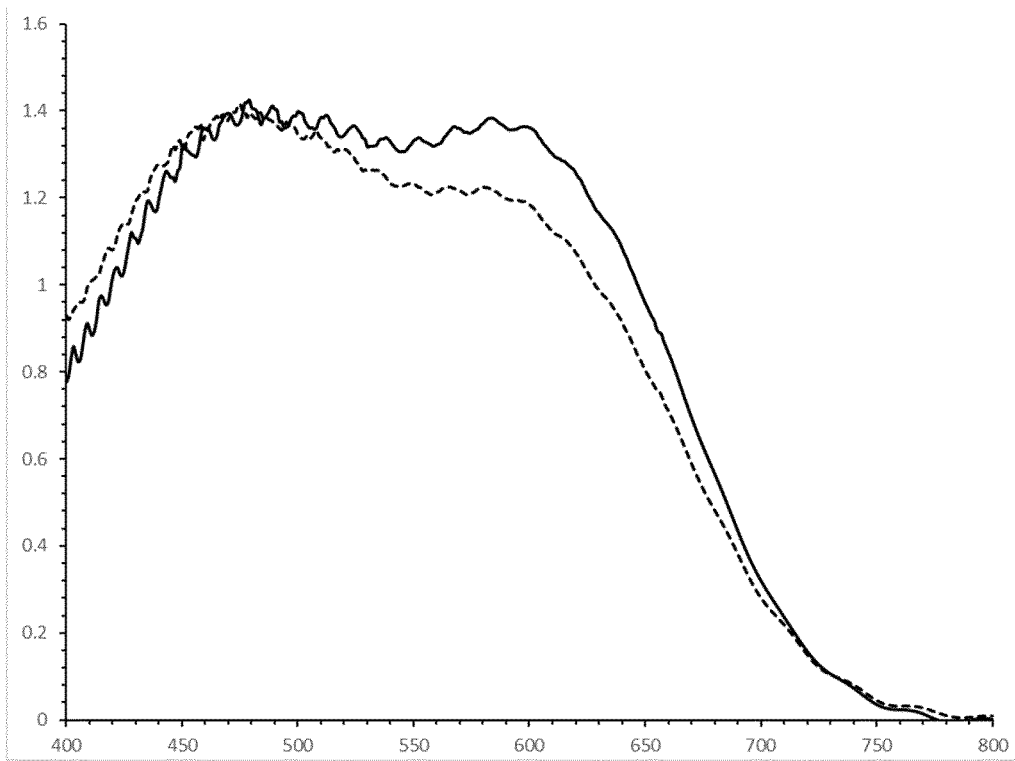
FIG. 1 is a graph showing the absorption spectra in visual range of Example 36 in a LC cell and after 240 hours of irradiation (continuous line: initial absorption spectrum; dashed line: after 240 hours).

Preferably, the groups $Ar^1$, $Ar^5$ and $Ar^{10}$ may be a residue selected from the group consisting of

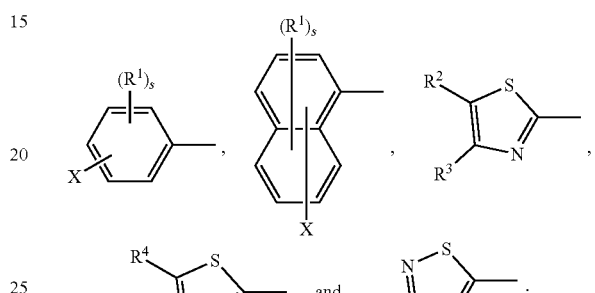

X is $CF_3$, F, CN, $COOR^{17}$, $CONR^{18}R^{19}$, $SO_2R^{20}$ or

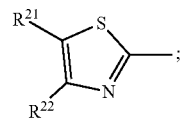

wherein
$R^1$ is $C_1$-$C_4$-alkyl, $CF_3$, F, CN or $C_1$-$C_4$-alkoxy;
$R^2$, $R^3$, $R^4$, $R^5$, $R^{21}$ and $R^{22}$ are independently of one another and at each occurrence selected from H, F, $NO_2$, CN, $COOR^{34}$, $C_1$-$C_{12}$-alkyl; $C_1$-$C_{12}$-alkyl substituted with F or CN; $C_1$-$C_{12}$-alkoxy; $C_3$-$C_{12}$-cycloalkyl; $C_3$-$C_{12}$-cycloalkyl substituted with F or CN; phenyl; or phenyl substituted with F, CN, $C_1$-$C_8$-alkyl or $CF_3$;
or $R^2$ and $R^3$ together are butylene or form a benzoanellated ring, said n-butylene or benzoanellated ring is unsubstituted or substituted with $CH_3$, $C_2H_5$, CN, $OCH_3$, $OC_2H_5$, $NO_2$, F or $SO_2R^{39}$;
or $R^{21}$ and $R^{22}$ together are butylene, said butylene is unsubstituted or substituted with $CH_3$, $C_2H_5$, CN, $OCH_3$, $OC_2H_5$, $NO_2$, F or $SO_2R^{40}$;
$R^{17}$, $R^{20}$, $R^{34}$, $R^{39}$ and $R^{40}$ are independently of one another $C_1$-$C_8$-alkyl; $C_1$-$C_8$-alkyl substituted with CN; $C_5$-$C_{14}$-cycloalkyl, $C_5$-$C_{14}$-cycloalkyl substituted with CN or F; phenyl, phenyl substituted with F, CN, $C_1$-$C_8$-alkyl or $CF_3$; phenylene-$C_5$-$C_{14}$-cycloalkyl; phenylene-$C_5$-$C_{14}$-cycloalkyl substituted with F or CN; $C_5$-$C_{12}$-cycloalkylene-phenyl; or $C_5$-$C_{12}$-cycloalkylene-phenyl substituted with $C_1$-$C_8$-alkyl, $CF_3$, F or CN;
$R^{18}$ and $R^{19}$ are H, $C_1$-$C_8$-alkyl; $C_5$-$C_{14}$-cycloalkyl; phenyl, phenyl substituted with $C_1$-$C_8$-alkyl; phenylene-$C_5$-$C_{14}$-cycloalkyl; $C_5$-$C_{12}$-cycloalkylene-phenyl; or $C_5$-$C_{12}$-cycloalkylene-phenyl substituted with $C_1$-$C_8$-alkyl;

or $R^{18}$ and $R^{19}$ together are $C_3$-$C_6$-alkylene or $C_3$-$C_6$-alkylene interrupted by O, S and/or $NR^{41}$;

$R^{41}$ is H, $C_1$-$C_8$-alkyl, $C_5$-$C_6$-cycloalkyl or phenyl; and s is 0, 1 or 2.

The substituent X is preferably p-substituted.

More preferred groups of $Ar^1$, $Ar^5$ and $Ar^{10}$ are a residue selected from the group consisting of

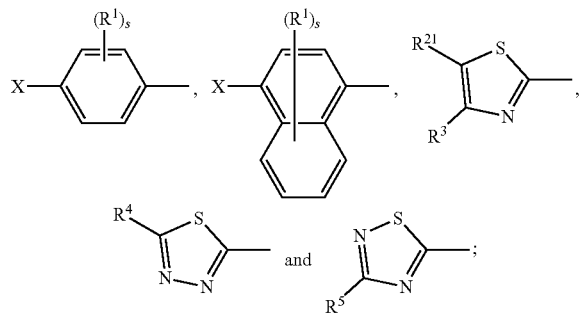

most preferred groups of $Ar^1$, $Ar^5$ and $Ar^{10}$ are a residue selected from the group consisting of

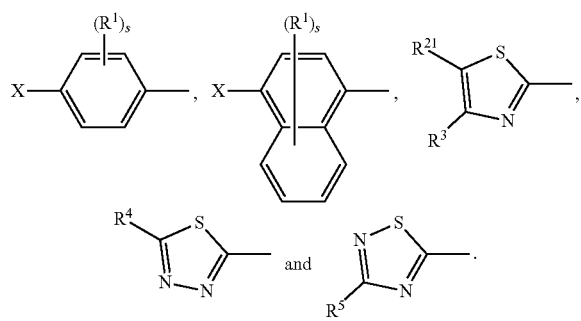

Especially preferred groups of $Ar^1$, $Ar^5$ and $Ar^{10}$ are a residue selected from the group consisting of

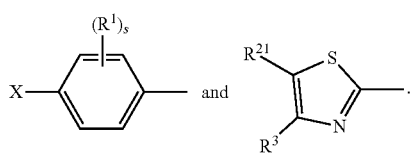

The groups $Ar^5$ and $Ar^{10}$ may be the same or may be different in a compound of formula (B). Preferably, groups $Ar^5$ and $Ar^{10}$ are the same.

Alternatively, preferred is a compound of formula (B), wherein $Ar^5$ and $Ar^{10}$ are different.

The substituent X within the groups of $Ar^1$, $Ar^5$ and $Ar^{10}$ may be $CF_3$, F, CN, $COOR^{17}$, $CONR^{18}R^{19}$, $SO_2R^{20}$ or

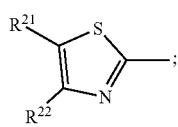

wherein $R^{21}$ and $R^{22}$ are independently of one another and at each occurrence selected from H, F, CN, $COOR^{34}$, $C_1$-$C_8$-alkyl, cyclohexyl or phenyl;

$R^{17}$, $R^{20}$ and $R^{34}$ are independently of one another $C_1$-$C_8$-alkyl; $C_5$-$C_{14}$-cycloalkyl; phenyl, phenyl substituted with $C_1$-$C_8$-alkyl; phenylene-$C_5$-$C_{14}$-cycloalkyl or $C_5$-$C_{12}$-cycloalkylene-phenyl;

$R^{18}$ and $R^{19}$ are independently of one another H, $C_1$-$C_8$-alkyl; $C_5$-$C_{14}$-cycloalkyl; phenyl; phenylene-$C_5$-$C_{14}$-cycloalkyl; or $C_5$-$C_{12}$-cycloalkylene-phenyl;

or $R^{18}$ and $R^{19}$ together are $C_5$-$C_6$-alkylene or $C_3$-$C_6$-alkylene interrupted by O or $NR^{41}$;

$R^{41}$ is H, $C_1$-$C_4$-alkyl, $C_5$-$C_6$-cycloalkyl or phenyl; and $R^{21}$ and $R^{22}$ are independently of one another and at each occurrence selected from H, F, CN, $COOR^{34}$, $C_1$-$C_8$-alkyl, cyclohexyl or phenyl.

The substituent X is more preferably $CF_3$, F, CN, $COOR^{17}$, $CONR^{18}R^{19}$, $SO_2R^{20}$ or

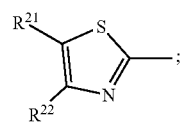

wherein $R^{21}$ and $R^{22}$ are independently of one another and at each occurrence selected from H, F, CN, $CO_2R^{34}$, $C_1$-$C_8$-alkyl or phenyl;

$R^{17}$, $R^{20}$ and $R^{34}$ are independently of one another $C_1$-$C_5$-alkyl; $C_6$-$C_{12}$-cycloalkyl; phenyl, phenyl substituted with $C_1$-$C_8$-alkyl; phenylene-$C_6$-$C_{12}$-cycloalkyl or $C_6$-$C_{12}$-cycloalkylene-phenyl;

$R^{18}$ and $R^{19}$ are independently of one another H, $C_1$-$C_8$-alkyl; $C_5$-$C_{14}$-cycloalkyl; phenyl; phenylene-$C_5$-$C_{12}$-cycloalkyl; or $C_6$-$C_{12}$-cycloalkylene-phenyl;

or $R^{18}$ and $R^{19}$ together are $C_5$-$C_6$-alkylene or $C_3$-$C_6$-alkylene interrupted by O or $NR^{41}$;

$R^{41}$ is H, $C_1$-$C_4$-alkyl, $C_5$-$C_6$-cycloalkyl or phenyl; and $R^{21}$ and $R^{22}$ are independently of one another and at each occurrence selected from H, F, CN, $COOR^{34}$, $C_1$-$C_8$-alkyl, cyclohexyl or phenyl.

Most preferably, the substituent X is $CF_3$, F, CN or $COOR^{17}$, wherein $R^{17}$ is $C_1$-$C_5$-alkyl; $C_6$-$C_{12}$-cycloalkyl; phenyl, phenyl substituted with $C_1$-$C_8$-alkyl; phenylene-$C_6$-$C_{12}$-cycloalkyl or $C_6$-$C_{12}$-cycloalkylene-phenyl; especially $C_1$-$C_8$-alkyl; $C_6$-$C_{12}$-cycloalkyl or phenyl;

The substituent $R^1$ within the groups of $Ar^1$, $Ar^5$ and $Ar^{10}$ may be $C_1$-$C_4$-alkyl, $CF_3$, F, CN or $C_1$-$C_4$-alkoxy, preferably $C_1$-$C_4$-alkyl, $CF_3$, F or CN; more preferably $CH_3$ or F, and most preferably $CH_3$.

Especially preferred are groups of $Ar^1$, $Ar^5$ and $Ar^{10}$, wherein s is 0.

Preferably, the substituents $R^2$, $R^3$, $R^4$ and $R^5$ within the groups of $Ar^1$, $Ar^5$ and $Ar^{10}$ are independently of one another and at each occurrence selected from H, F, CN, $COOR^{34}$, $C_1$-$C_8$-alkyl, cyclohexyl or phenyl;

or $R^2$ and $R^3$ together form a benzoanellated ring, said benzoanellated ring is unsubstituted or substituted with $CH_3$, $C_2H_5$ or CN; and $R^{34}$ is $C_1$-$C_8$-alkyl, $C_5$-$C_{14}$-cycloalkyl; phenyl; phenyl substituted with $C_1$-$C_8$-alkyl; phenylene-$C_5$-$C_{14}$-cycloalkyl; or $C_5$-$C_{12}$-cycloalkylene-phenyl.

More preferably, the substituents $R^2$, $R^3$, $R^4$ and $R^5$ within the groups of $Ar^1$, $Ar^5$ and $Ar^{10}$ are independently of one another and at each occurrence selected from H, F, CN, $CO_2R^{34}$, $C_1$-$C_8$-alkyl or phenyl;

or $R^2$ and $R^3$ together form a benzoanellated ring, said benzoanellated ring is unsubstituted or substituted with $CH_3$, $C_2H_5$ or CN; and $R^{34}$ is $C_1$-$C_5$-alkyl, $C_6$-$C_{12}$-cycloalkyl, phenyl, phenyl substituted with $C_1$-$C_5$-alkyl; phenylene-$C_6$-$C_{12}$-cycloalkyl; or $C_6$-$C_{12}$-cycloalkylene-phenyl, preferably unsubstituted.

Especially, $R^2$, $R^3$, $R^4$ and $R^5$ within the groups of $Ar^1$, $Ar^5$ and $Ar^{10}$ are independently of one another H, F, $C_1$-$C_7$-alkyl or $CF_3$;

or $R^2$ and $R^3$ together form a benzoanellated ring, said benzoanellated ring is unsubstituted or substituted with $CH_3$, $C_2H_5$ or CN, preferably unsubstituted.

Preferably, the groups $Ar^2$, $Ar^3$, $Ar^6$, $Ar^7$, $Ar^8$ and $Ar^9$ are independently of one another and at each occurrence selected from

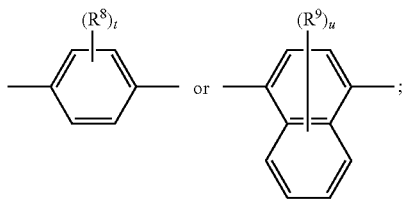

wherein $R^8$ and $R^9$ are independently of one another and at each occurrence $CH_3$, $CF_3$, F, CN or $OCH_3$; more preferably $CH_3$;

t and u are independently of one another 0, 1 or 2.

Preferably, the group $Ar^4$ may be a residue of

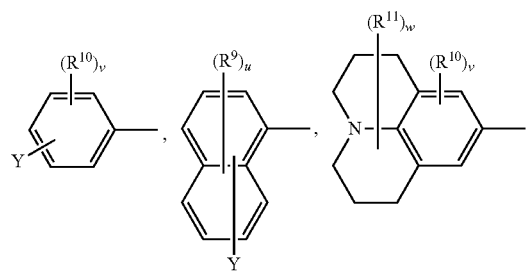

$C_2$-$C_{10}$-heteroaryl, $C_2$-$C_{10}$-heteroaryl substituted with $C_1$-$C_{12}$-alkyl, $C_1$-$C_{12}$-alkoxy, $C_1$-$C_{12}$-alkylthio, OH, halogen, $CF_3$, $NR^{12}R^{13}$, $CO_2R^{14}$, $COR^{15}$, $SO_2R^{16}$, $NO_2$ or CN;

Y is H, $C_1$-$C_{12}$-alkyl; $C_1$-$C_{12}$-alkyl substituted with OH or $NH_2$ and/or interrupted with $NR^{23}$ or O; $CF_3$, $C_7$-$C_{12}$-aralkyl, $NR^{24}R^{25}$, F, CN, OH, $C_1$-$C_{12}$-alkoxy; $C_1$-$C_{12}$-alkylthio, $COOR^{26}$, $C_6$-$C_{12}$-aryl; $C_6$-$C_{12}$-aryl substituted with $C_1$-$C_{12}$-alkyl, $C_1$-$C_{12}$-alkoxy, $C_1$-$C_{12}$-alkylthio, CN, F, OH or $NR^{27}R^{28}$; $C_2$-$C_{10}$-heteroaryl, $C_2$-$C_{10}$-heteroaryl substituted with $C_1$-$C_{12}$-alkyl, $C_1$-$C_{12}$-alkoxy, $C_1$-$C_{12}$-alkylthio, OH, F, CN or $NR^{29}R^{30}$; $C_5$-$C_{12}$-cycloalkyl, or $C_5$-$C_{18}$-cycloalkyl substituted with $CF_3$, F, CN, OH, $C_1$-$C_{12}$-alkoxy, $C_1$-$C_{12}$-alkylthio or $NR^{31}R^{32}$ and/or interrupted by one or more O;

or Y and one adjacent H form together a group

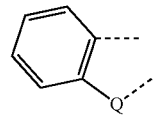

or a 5 to 7-membered heterocyclic ring containing Q,
Q is $NR^{33}$, O or S;
said heterocyclic ring is unsubstituted or substituted with $CH_3$;
$R^{10}$ is at each occurrence selected from $C_1$-$C_8$-alkyl, $CF_3$, F, $C_1$-$C_8$-alkoxy, OH or CN;
$R^{11}$ is at each occurrence $CH_3$ or $C_2H_5$;
$R^{14}$, $R^{15}$, $R^{16}$ and $R^{26}$ are independently of one another $C_1$-$C_8$-alkyl; $C_1$-$C_8$-alkyl substituted with CN; $C_5$-$C_{14}$-cycloalkyl, $C_5$-$C_{14}$-cycloalkyl substituted with CN or F; phenyl, phenyl substituted with F, CN, $C_1$-$C_8$-alkyl or $CF_3$; phenylene-$C_5$-$C_{14}$-cycloalkyl; phenylene-$C_5$-$C_{14}$-cycloalkyl substituted with F or CN; $C_5$-$C_{12}$-cycloalkylene-phenyl; or $C_5$-$C_{12}$-cycloalkylene-phenyl substituted with $C_1$-$C_8$-alkyl, $CF_3$, F or CN;
$R^{12}$, $R^{13}$, $R^{24}$, $R^{25}$, $R^{27}$, $R^{28}$, $R^{29}$, $R^{30}$, $R^{31}$ and $R^{32}$ are independently of one another H, $C_1$-$C_8$-alkyl; $C_5$-$C_{14}$-cycloalkyl; phenyl, phenyl substituted with $C_1$-$C_8$-alkyl; phenylene-$C_5$-$C_{14}$-cycloalkyl; $C_5$-$C_{12}$-cycloalkylene-phenyl; or $C_5$-$C_{12}$-cycloalkylene-phenyl substituted with $C_1$-$C_8$-alkyl;
or $R^{12}$ and $R^{13}$, $R^{24}$ and $R^{25}$, $R^{27}$ and $R^{28}$, $R^{29}$ and $R^{30}$, or $R^{31}$ and $R^{32}$ together are $C_3$-$C_6$-alkylene or $C_3$-$C_6$-alkylene interrupted by O, S and/or $NR^{41}$;
$R^{23}$, $R^{33}$ and $R^{41}$ are independently of one another H, $C_1$-$C_8$-alkyl, $C_5$-$C_6$-cycloalkyl or phenyl;
v is 0, 1 or 2; and
w is 0, 1, 2, 3 or 4.

More preferred group $Ar^4$ is a residue of

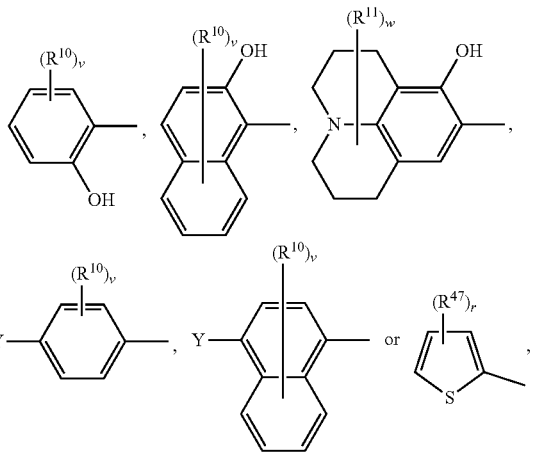

especially a group of

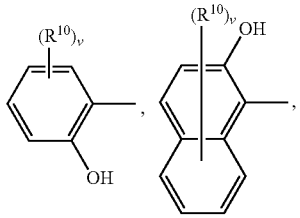

-continued

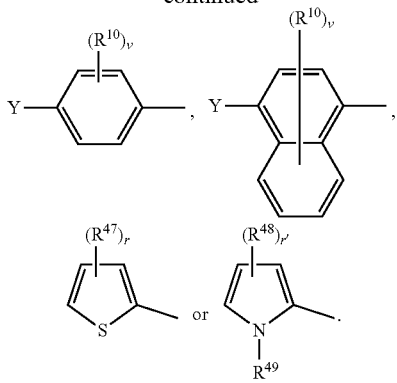

The thienyl group

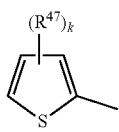

is preferably unsubstituted, a group of formula

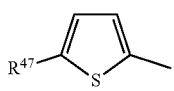

or a group of formula

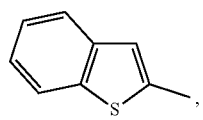

wherein
R$^{47}$ is C$_1$-C$_6$-alkyl, C$_1$-C$_6$-alkoxy, NR$^{12}$R$^{13}$, CO$_2$R$^{14}$ or NO$_2$;

R$^{14}$ is C$_1$-C$_8$-alkyl, C$_5$-C$_{14}$-cycloalkyl; phenyl; phenyl substituted with C$_1$-C$_8$-alkyl; phenylene-C$_1$-C$_{14}$-cycloalkyl; or C$_5$-C$_{12}$-cycloalkylene-phenyl;

R$^{12}$ and R$^{13}$ are independently of one another H, C$_1$-C$_8$-alkyl, C$_5$-C$_{14}$-cycloalkyl, phenyl; phenylene-C$_5$-C$_{14}$-cycloalkyl; or C$_5$-C$_{12}$-cycloalkylene-phenyl;

or R$^{12}$ and R$^{13}$ together are C$_5$-C$_6$-alkylene or C$_3$-C$_6$-alkylene interrupted by O or NR$^{41}$; and R$^{41}$ is H, C$_1$-C$_4$-alkyl, C$_5$-C$_6$-cycloalkyl or phenyl.

Especially, the group of formula

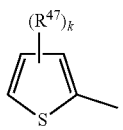

is unsubstituted or a group of formula

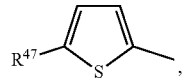

wherein
R$^{47}$ is C$_1$-C$_6$-alkyl, C$_1$-C$_6$-alkoxy, NR$^{12}$R$^{13}$ or NO$_2$;
R$^{12}$ and R$^{13}$ are independently of one another C$_1$-C$_6$-alkyl;
or R$^{12}$ and R$^{13}$ together with the N atom form a pyrrolidinyl ring, a piperidinyl ring, a morpholinyl ring or a piperazinyl ring or a N-substituted piperazinyl ring substituted with C$_1$-C$_4$-alkyl.

The group of formula

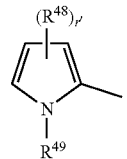

is preferably a group of formula

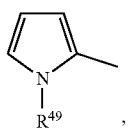

a group of formula

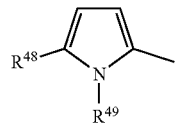

or a group of formula

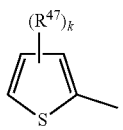

wherein
R$^{48}$ is C$_1$-C$_6$-alkyl, C$_1$-C$_6$-alkoxy, NR$^{12}$R$^{13}$, CO$_2$R$^{14}$ or NO$_2$;
R$^{14}$ is C$_1$-C$_8$-alkyl, C$_5$-C$_{14}$-cycloalkyl; phenyl; phenyl substituted with C$_1$-C$_8$-alkyl; phenylene-C$_5$-C$_{14}$-cycloalkyl; or C$_5$-C$_{12}$-cycloalkylene-phenyl;
R$^{12}$ and R$^{13}$ are independently of one another H, C$_1$-C$_8$-alkyl, C$_5$-C$_{14}$-cycloalkyl, phenyl; phenylene-C$_5$-C$_{14}$-cycloalkyl; or C$_5$-C$_{12}$-cycloalkylene-phenyl;
or R$^{12}$ and R$^{13}$ together are C$_5$-C$_6$-alkylene or C$_3$-C$_6$-alkylene interrupted by O or NR$^{41}$; and
R$^{41}$ and R$^{49}$ are H, C$_1$-C$_4$-alkyl, C$_5$-C$_6$-cycloalkyl or phenyl.

Especially, the group of formula

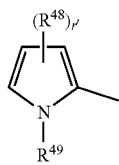

is a group of formula

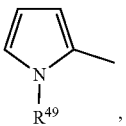

a group of formula

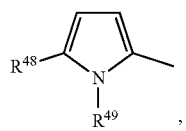

wherein $R^{48}$ is selected from $C_1$-$C_6$-alkyl, $C_1$-$C_6$-alkoxy, $NR^{12}R^{13}$ or $NO_2$;

$R^{12}$ and $R^{13}$ are independently of one another $C_1$-$C_6$-alkyl;

or $R^{12}$ and $R^{13}$ together with the N atom form a pyrrolidinyl ring, a piperidinyl ring, a morpholinyl ring or a piperazinyl ring or a N-substituted piperazinyl ring substituted with $C_1$-$C_4$-alkyl; and $R^{49}$ is H or $C_1$-$C_4$-alkyl.

The substituent Y within the group $Ar^4$ may be selected from H, $C_1$-$C_8$-alkyl; $CF_3$, $NR^{24}R^{25}$, F, CN, OH, $C_1$-$C_8$-alkoxy; $C_1$-$C_8$-alkylthio; $COOR^{26}$, phenyl; phenyl substituted with $C_1$-$C_8$-alkyl, $C_1$-$C_8$-alkoxy, $C_1$-$C_8$-alkylthio, F, CN or $NR^{27}R^{28}$; or $C_5$-$C_{14}$-cycloalkyl;

or Y and one adjacent H form together a group

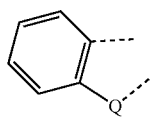

or a 5 to 7-membered heterocyclic ring containing Q,

Q is $NR^{33}$ or O;

said heterocyclic group is unsubstituted or substituted with $CH_3$;

$R^{26}$ is $C_1$-$C_8$-alkyl, $C_5$-$C_{14}$-cycloalkyl; phenyl; phenyl substituted with $C_1$-$C_8$-alkyl; phenylene-$C_5$-$C_{14}$-cycloalkyl; or $C_5$-$C_{12}$-cycloalkylene-phenyl;

$R^{24}$, $R^{25}$, $R^{27}$ and $R^{28}$ are independently of one another H, $C_1$-$C_8$-alkyl, C5-$C_{14}$-cycloalkyl, phenyl; phenylene-$C_5$-$C_{14}$-cycloalkyl; or $C_5$-$C_{12}$-cycloalkylene-phenyl;

or $R^{24}$ and $R^{25}$, or $R^{27}$ and $R^{28}$ together are $C_5$-$C_6$-alkylene or $C_3$-$C_6$-alkylene interrupted by O or $NR^{41}$; and $R^{33}$ and $R^{41}$ are independently of one another H, $C_1$-$C_4$-alkyl, $C_5$-$C_6$-cycloalkyl or phenyl.

The substituent Y is more preferably H, $C_1$-$C_8$-alkyl; $NR^{24}R^{25}$, F, CN, OH, $C_1$-$C_8$-alkoxy; $C_1$-$C_8$-alkylthio; $COOR^{26}$, phenyl; phenyl substituted with $C_1$-$C_8$-alkyl, $C_1$-$C_8$-alkoxy, $C_1$-$C_8$-alkylthio or $NR^{27}R^{28}$; or $C_5$-$C_{14}$-cycloalkyl;

or Y and one adjacent H form together a group

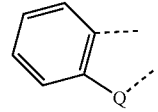

or a 5- to 6-membered heterocyclic ring containing 0,

Q is $NR^{33}$ or O;

said heterocyclic group is unsubstituted or substituted with $CH_3$;

$R^{26}$ is $C_1$-$C_8$-alkyl, $C_6$-$C_{12}$-cycloalkyl, phenyl, phenyl substituted with $C_1$-$C_8$-alkyl; phenylene-$C_6$-$C_{12}$-cycloalkyl; or $C_6$-$C_{12}$-cycloalkylene-phenyl;

$R^{24}$, $R^{25}$, $R^{27}$ and $R^{28}$ are independently of one another H, $C_1$-$C_8$-alkyl, $C_5$-$C_{14}$-cycloalkyl, phenyl; phenylene-$C_6$-$C_{12}$-cycloalkyl; or $C_6$-$C_{12}$-cycloalkylene-phenyl;

or $R^{24}$ and $R^{25}$, or $R^{27}$ and $R^{28}$ together are $C_5$-$C_6$-alkylene or $C_3$-$C_6$-alkylene interrupted by O or $NR^{41}$; and $R^{33}$ and $R^{41}$ are independently of one another H, $C_1$-$C_4$-alkyl, $C_5$-$C_6$-cycloalkyl or phenyl.

Most preferably, the substituent Y is H, $C_1$-$C_7$-alkyl; $C_1$-$C_7$-alkyl substituted with OH or $NH_2$; $NR^{24}R^{25}$, F, CN, OH, $C_1$-$C_6$-alkoxy; $COOR^{26}$, phenyl; phenyl substituted with $C_1$-$C_7$-alkyl, $C_1$-$C_6$-alkoxy, or $NR^{27}R^{28}$; or $C_5$-$C_6$-cycloalkyl;

or Y and one adjacent H form together a group

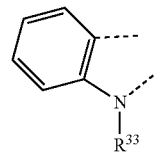

or a 5 to 6-membered heterocyclic ring containing Q,

Q is $NR^{33}$ or O;

said heterocyclic ring is unsubstituted or substituted with $CH_3$;

$R^{26}$ is $C_1$-$C_5$-alkyl; $C_6$-$C_{12}$-cycloalkyl; phenyl, phenyl substituted with $C_1$-$C_5$-alkyl; phenylene-$C_6$-$C_{12}$-cycloalkyl or $C_6$-$C_{12}$-cycloalkylene-phenyl;

$R^{24}$, $R^{25}$, $R^{27}$ and $R^{28}$ are independently of one another H or $C_1$-$C_5$-alkyl;

or $R^{24}$ and $R^{25}$, or $R^{27}$ and $R^{28}$ together are $C_5$-$C_6$-alkylene or $C_5$-$C_6$-alkylene interrupted by O, or $NR^{41}$; and $R^{33}$ and $R^{41}$ are independently of one another H, or $C_1$-$C_4$-alkyl.

The substituent $R^{10}$ within the group of $Ar^4$ may be selected from $C_1$-$C_8$-alkyl, $CF_3$, F, $C_1$-$C_8$-alkoxy, OH or CN, preferably $C_1$-$C_7$-alkyl, $CF_3$, F, Cl, Br, $C_1$-$C_6$-alkoxy, OH or CN.

The substituent $R^{11}$ within the group of $Ar^4$ may be selected $CH_3$ or $C_2H_5$.

The group of

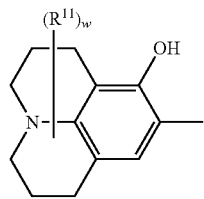

is preferably unsubstituted or a group of formula

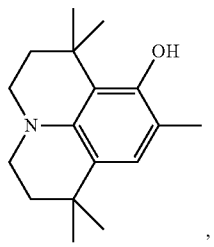 [SMILES: Cc1cc2c3c(c1O)C(C)(C)CCN3CCC2(C)C]

, more preferably a group of formula

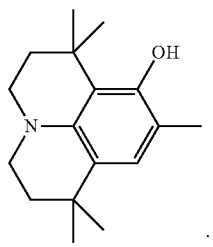 [SMILES: Cc1cc2c3c(c1O)C(C)(C)CCN3CCC2(C)C]

.

Preferably, the group L is a single bond or a group selected from

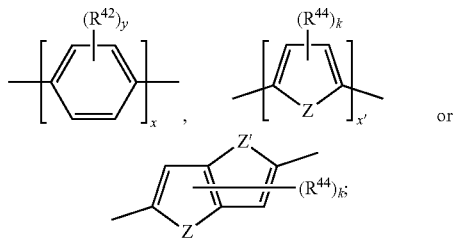

$R^{42}$ and $R^{44}$ are independently of one another and at each occurrence selected from $C_1$-$C_4$-alkyl, $CF_3$, $C_1$-$C_4$-alkoxy, F, OH, CN or $COOR^{45}$;
Z and Z' are independently of one another $NR^{46}$, O or S; especially S or $NR^{46}$, in particular S;
  or two adjacent groups of $R^{44}$ form a benzoannelated ring, said benzoannelated ring is unsubstituted or substituted with $R^{44}$;
$R^{45}$ is $CH_3$ or $C_2H_5$;
$R^{46}$ is H, $C_1$-$C_4$-alkyl, $C_5$-$C_6$-cycloalkyl or phenyl;
k and y are independently of one another 0, 1 or 2; and
x and x' are independently of one another 1 or 2.

More preferably, the group L is a group selected from

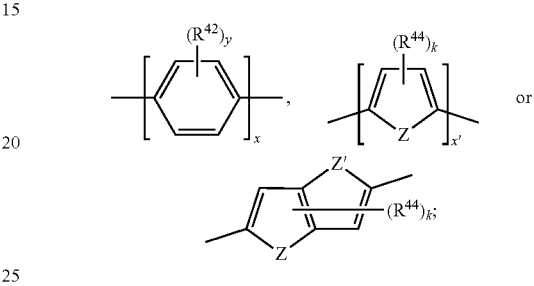

$R^{42}$ and $R^{44}$ are independently of one another and at each occurrence selected from $C_1$-$C_4$-alkyl, $CF_3$, $C_1$-$C_4$-alkoxy, F, OH, CN or $COOR^{45}$;
Z and Z' are independently of one another S or $NR^{46}$;
$R^{45}$ is $CH_3$ or $C_2H_5$;
$R^{46}$ is H or $C_1$-$C_4$-alkyl;
k and y are independently of one another 0, 1 or 2; and
x and x' are independently of one another 1 or 2.

Especially preferred is a group selected from

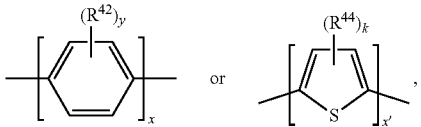

wherein
$R^{42}$ and $R^{44}$ are independently of one another and at each occurrence selected from $CH_3$ or $OCH_3$;
k and y are independently of one another 0, 1 or 2, in particular 0; and
x and x' are 1.

The compounds of formula (A) and (B) may comprise as groups $Ar^2$, $Ar^3$, $Ar^6$, $Ar^7$, $Ar^8$ and $Ar^9$ phenylene groups, naphthylene groups or phenylene and naphthylene groups.

Accordingly, in a preferred aspect, the invention relates to a compound having one of the following formulae (A1)

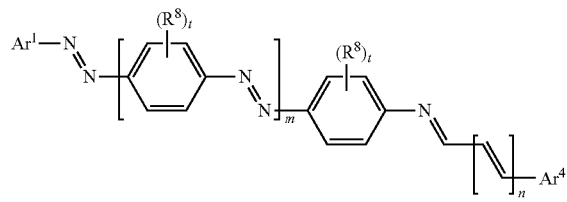

(A2)

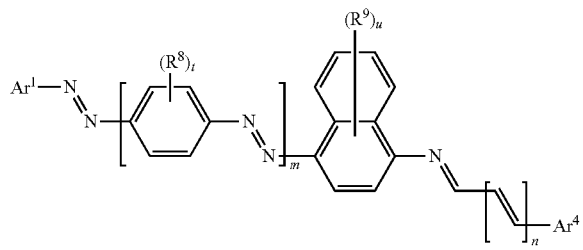

-continued
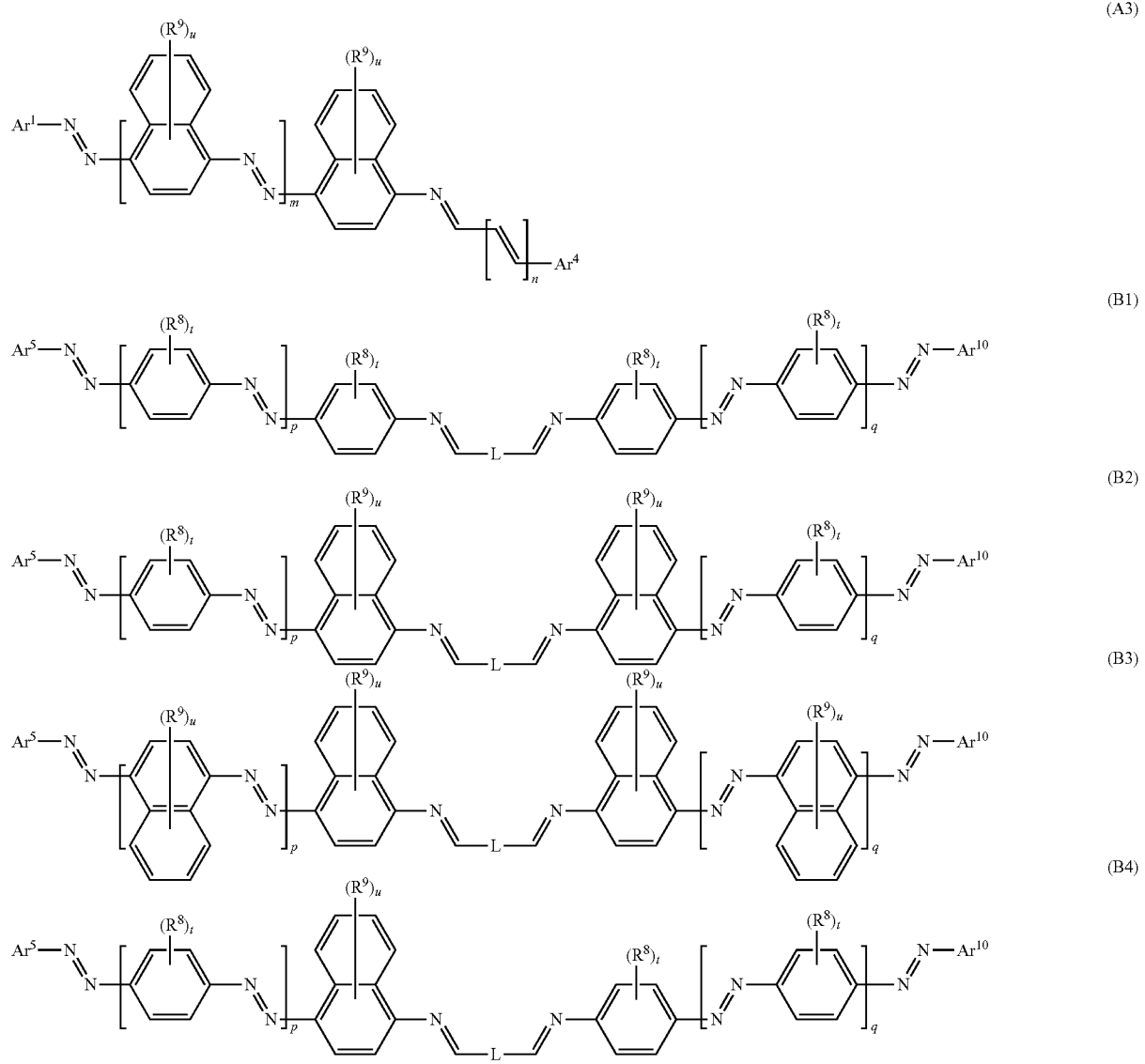
wherein
Ar¹, Ar⁵ and Ar¹⁰ are independently of one another a residue selected from the group consisting of
Ar⁴ is a residue of
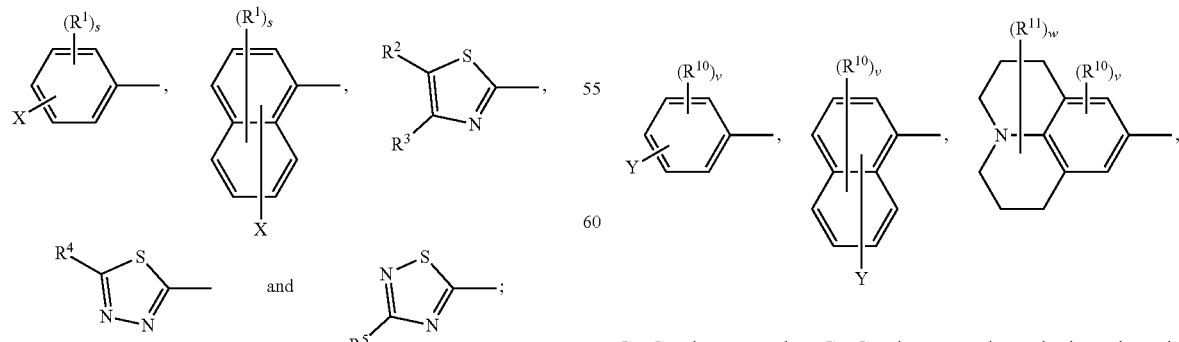
$C_2$-$C_{10}$-heteroaryl, $C_2$-$C_{10}$-heteroaryl substituted with $C_1$-$C_{12}$-alkyl, $C_1$-$C_{12}$-alkoxy, $C_1$-$C_{12}$-alkylthio, OH, halogen, $CF_3$, $NR^{12}R^{13}$, $CO_2R^{14}$, $COR^{15}$, $SO_2R^{16}$, $NO_2$ or CN;

X is $CF_3$, F, CN, $COOR^{17}$, $CONR^{18}R^{19}$, $SO_2R^{20}$ or

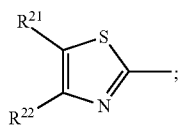

Y is H, $C_1$-$C_{12}$-alkyl; $C_1$-$C_{12}$-alkyl substituted with OH or $NH_2$ and/or interrupted with $NR^{23}$ or O; $CF_3$, $C_7$-$C_{12}$-aralkyl, $NR^{24}R^{25}$, F, CN, OH, $C_1$-$C_{12}$-alkoxy; $C_1$-$C_{12}$-alkylthio, $COOR^{26}$, $C_6$-$C_{12}$-aryl; $C_6$-$C_{12}$-aryl substituted with $C_1$-$C_{12}$-alkyl, $C_1$-$C_{12}$-alkoxy, $C_1$-$C_{12}$-alkylthio, CN, F, OH or $NR^{27}R^{28}$; $C_2$-$C_{10}$-heteroaryl, $C_2$-$C_{10}$-heteroaryl substituted with $C_1$-$C_{12}$-alkyl, $C_1$-$C_{12}$-alkoxy, $C_1$-$C_{12}$-alkylthio, OH, F, CN or $NR^{29}R^{30}$; $C_5$-$C_{18}$-cycloalkyl, or $C_5$-$C_{18}$-cycloalkyl substituted with $CF_3$, F, CN, OH, $C_1$-$C_{12}$-alkoxy, $C_1$-$C_{12}$-alkylthio or $NR^{31}R^{32}$ and/or interrupted by one or more O;

or Y and one adjacent H form together a group

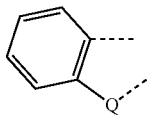

or a 5 to 7-membered heterocyclic ring containing one or two Q,

Q is $NR^{33}$, O or S;

said group

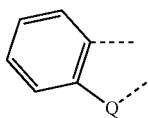

or heterocyclic ring is unsubstituted or substituted with $CH_3$;

$R^1$ is $C_1$-$C_4$-alkyl, $CF_3$, F, CN or $C_1$-$C_4$-alkoxy;

$R^2$, $R^3$, $R^4$, $R^5$, $R^{21}$ and $R^{22}$ are independently of one another and at each occurrence selected from H, F, $NO_2$, CN, $COOR^{34}$, $C_1$-$C_{12}$-alkyl; $C_1$-$C_{12}$-alkyl substituted with F or CN; $C_1$-$C_{12}$-alkoxy; $C_3$-$C_{12}$-cycloalkyl; $C_3$-$C_{12}$-cycloalkyl substituted with F or CN; phenyl; or phenyl substituted with F, CN, $C_1$-$C_8$-alkyl or $CF_3$;

or $R^2$ and $R^3$ together are butylene or form a benzoanellated ring, said n-butylene or benzoanellated ring is unsubstituted or substituted with $CH_3$, $C_2H_5$, CN, $OCH_3$, $OC_2H_5$, $NO_2$, F or $SO_2R^{39}$;

or $R^{21}$ and $R^{22}$ together are butylene, said butylene is unsubstituted or substituted with $CH_3$, $C_2H_5$, CN, $OCH_3$, $OC_2H_5$, $NO_2$, F or $SO_2R^{40}$;

$R^8$ and $R^9$ are independently of one another and at each occurrence $CH_3$, $CF_3$, F, CN or $OCH_3$;

$R^{10}$ is at each occurrence selected from $C_1$-$C_8$-alkyl, $CF_3$, F, $C_1$-$C_8$-alkoxy, OH or CN;

$R^{11}$ is at each occurrence $CH_3$ or $C_2H_5$;

$R^{14}$, $R^{15}$, $R^{16}$, $R^{17}$, $R^{20}$, $R^{26}$, $R^{34}$, $R^{39}$ and $R^{40}$ are independently of one another $C_1$-$C_8$-alkyl; $C_1$-$C_8$-alkyl substituted with CN; $C_5$-$C_{14}$-cycloalkyl, C5-$C_{14}$-cycloalkyl substituted with CN or F; phenyl, phenyl substituted with F, CN, $C_1$-$C_8$-alkyl or $CF_3$; phenylene-$C_5$-$C_{14}$-cycloalkyl; phenylene-$C_5$-$C_{14}$-cycloalkyl substituted with F or CN; $C_5$-$C_{12}$-cycloalkylene-phenyl; or $C_5$-$C_{12}$-cycloalkylene-phenyl substituted with $C_1$-$C_8$-alkyl, $CF_3$, F or CN;

$R^{12}$, $R^{13}$, $R^{18}$, $R^{19}$, $R^{24}$, $R^{25}$, $R^{27}$, $R^{28}$, $R^{29}$, $R^{30}$, $R^{31}$ and $R^{32}$ are independently of another H, $C_1$-$C_8$-alkyl; $C_5$-$C_{14}$-cycloalkyl; phenyl, phenyl substituted with $C_1$-$C_8$-alkyl; phenylene-$C_5$-$C_{14}$-cycloalkyl; $C_5$-$C_{12}$-cycloalkylene-phenyl; or $C_5$-$C_{12}$-cycloalkylene-phenyl substituted with $C_1$-$C_8$-alkyl;

or $R^{12}$ and $R^{13}$, $R^{18}$ and $R^{19}$, $R^{24}$ and $R^{25}$, $R^{27}$ and $R^{28}$, $R^{29}$ and $R^{30}$, or $R^{31}$ and $R^{32}$ together are $C_3$-$C_6$-alkylene or $C_3$-$C_6$-alkylene interrupted by O, S and/or $NR^{41}$;

$R^{23}$, $R^{33}$ and $R^{41}$ are independently of one another H, $C_1$-$C_8$-alkyl, $C_5$-$C_6$-cycloalkyl or phenyl;

L is a single bond or a group selected from

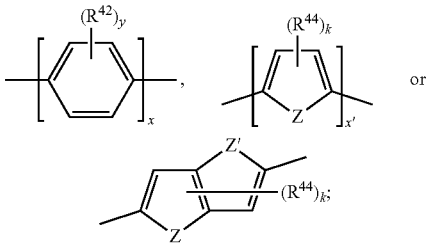

$R^{42}$ and $R^{44}$ are independently of one another and at each occurrence selected from $C_1$-$C_4$-alkyl, $CF_3$, $C_1$-$C_4$-alkoxy, F, OH, CN or $COOR^{45}$;

Z and Z' are independently of one another $NR^{46}$, O or S;

or two adjacent groups of $R^{44}$ form a benzoannelated ring, said benzoannelated ring is unsubstituted or substituted with $R^{44}$;

$R^{45}$ is $CH_3$ or $C_2H_5$;

$R^{46}$ is H, $C_1$-$C_4$-alkyl, $C_5$-$C_6$-cycloalkyl or phenyl;

m, n, p and q are independently of one another 0 or 1, with the proviso that the sum m+n≥1;

k, s, t, u, v and y are independently of one another 0, 1 or 2;

w is 0, 1, 2, 3 or 4; and x and x' are independently of one another 1 or 2.

The compounds of formula (A1), (A2) or (A3) are preferred, wherein n is 0 and m is 1.

The groups $Ar^1$, $Ar^5$ and $Ar^{10}$ may be selected from various aromatic or heteroaromatic groups.

Preferably, they are selected from groups having electron-withdrawing functionality.

Accordingly, a compound of formula (A), (B) or of formula (A1), (A2), (A3), (B1), (B2), (B3) or (B4) is preferred, wherein $Ar^1$, $Ar^5$ and $Ar^{10}$ are independently of one another a residue selected from the group consisting of

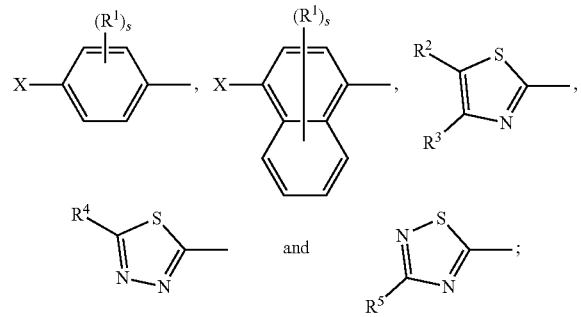

Ar⁴ is a residue of

[chemical structures: (R¹⁰)ᵥ-substituted phenyl with two OH; naphthyl with OH and (R¹⁰)ᵥ; bicyclic N-containing ring with OH and (R¹¹)w; Y-substituted phenyl with (R¹⁰)ᵥ; Y-substituted naphthyl with (R¹⁰)ᵥ; thiophene with (R⁴⁷)ᵣ; or pyrrole with (R⁴⁸)ᵣ' and R⁴⁹];

X is $CF_3$, F, CN, $COOR^{17}$, $CONR^{18}R^{19}$, $SO_2R^{20}$ or

[thiazole structure with $R^{21}$ and $R^{22}$];

Y is H, $C_1$-$C_8$-alkyl; $CF_3$, $NR^{24}R^{25}$, F, CN, OH, $C_1$-$C_8$-alkoxy; $C_1$-$C_8$-alkylthio; $COOR^{26}$, phenyl; phenyl substituted with $C_1$-$C_8$-alkyl, $C_1$-$C_8$-alkoxy, $C_1$-$C_8$-alkylthio, F, CN or $NR^{27}R^{28}$; or $C_5$-$C_{14}$-cycloalkyl;

or Y and one adjacent H form together a group

[fused phenyl ring with Q]

or a 5- to 7-membered heterocyclic ring containing one or two Q,

Q is $NR^{33}$ or O;

said group

[fused phenyl ring with Q]

or heterocyclic group is unsubstituted or substituted with $CH_3$;

$R^1$ is $CH_3$, $CF_3$, F or CN;

$R^2$, $R^3$, $R^4$, $R^5$, $R^{21}$ and $R^{22}$ are independently of one another and at each occurrence selected from H, F, CN, $COOR^{34}$, $C_1$-$C_8$-alkyl, cyclohexyl or phenyl;

or $R^2$ and $R^3$ together form a benzoanellated ring, said benzoanellated ring is unsubstituted or substituted with $CH_3$, $C_2H_5$ or CN;

$R^{10}$ is at each occurrence selected from $C_1$-$C_8$-alkyl, $CF_3$, F, $C_1$-$C_8$-alkoxy, OH or CN;

$R^{11}$ is at each occurrence $CH_3$ or $C_2H_5$;

$R^{14}$, $R^{17}$, $R^{20}$, $R^{26}$ and $R^{34}$ are independently of one another $C_1$-$C_8$-alkyl, $C_5$-$C_{14}$-cycloalkyl; phenyl; phenyl substituted with $C_1$-$C_8$-alkyl; phenylene-$C_5$-$C_{14}$-cycloalkyl; or $C_5$-$C_{12}$-cycloalkylene-phenyl;

$R^{12}$, $R^{13}$, $R^{18}$, $R^{19}$, $R^{24}$, $R^{25}$, $R^{27}$ and $R^{28}$ are independently of one another H, $C_1$-$C_8$-alkyl, $C_5$-$C_{14}$-cycloalkyl, phenyl; phenylene-$C_5$-$C_{14}$-cycloalkyl; or $C_5$-$C_{12}$-cycloalkylene-phenyl;

or $R^{12}$ and $R^{13}$, $R^{18}$ and $R^{19}$, $R^{24}$ and $R^{25}$, or $R^{27}$ and $R^{28}$ together are C5-C6-alkylene or $C_3$-$C_6$-alkylene interrupted by O or $NR^{41}$;

$R^{33}$, $R^{41}$ and $R^{49}$ are independently of one another H, $C_1$-$C_4$-alkyl, $C_5$-$C_8$-cycloalkyl or phenyl;

$R^{47}$ and $R^{48}$ are independently of one another and in each occurrence selected from $C_1$-$C_8$-alkyl, $C_1$-$C_8$-alkoxy, $C_1$-$C_8$-alkylthio, OH, F, $CF_3$, $NR^{12}R^{13}$, $CO_2R^{14}$ or $NO_2$;

or two adjacent groups of $R^{47}$ or $R^{48}$ form a benzoannelated ring, said benzoannelated ring is unsubstituted or substituted with $C_1$-$C_8$-alkyl, $C_1$-$C_8$-alkoxy, $C_1$-$C_8$-alkylthio, OH, F, $CF_3$, $NR^{12}R^{13}$, $CO_2R^{14}$ or $NO_2$;

r and r' are 0, 1 or 2;

s is 0 or 1;

v is 0, 1 or 2; and w is 0, 2 or 4.

The divalent group L may be a direct bond, an arylene group or heteroarylene group, preferably an arylene group or heteroarylene group.

Accordingly, a compound of formula (A) or (B) is preferred, wherein

L is a group selected from

[phenylene with (R⁴²)ᵧ, subscript x; heteroarylene with (R⁴⁴)ₖ and Z, subscript x'; or bicyclic heteroarylene with Z, Z' and (R⁴⁴)ₖ];

$R^{42}$ and $R^{44}$ are independently of one another and at each occurrence selected from $C_1$-$C_4$-alkyl, $CF_3$, $C_1$-$C_4$-alkoxy, F, OH, CN or $COOR^{45}$;

Z and Z' are independently of one another S or $NR^{46}$;

$R^{45}$ is $CH_3$ or $C_2H_5$;

$R^{46}$ is H or $C_1$-$C_4$-alkyl;

k and y are independently of one another 0, 1 or 2; and x and x' are 1 or 2.

More preferred is a compound of formula (A1), (A2), (A3), (B1), (B2), (B3) or (B4), wherein L is a group selected from

[phenylene with (R⁴²)ᵧ, subscript x; or heteroarylene with (R⁴⁴)ₖ and Z, subscript x']

-continued

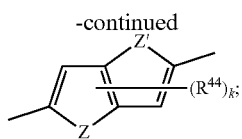

$R^{42}$ and $R^{44}$ are independently of one another and at each occurrence selected from $C_1$-$C_4$-alkyl, $CF_3$, $C_1$-$C_4$-alkoxy, F, OH, CN or $COOR^{45}$;

Z and Z' are S;
$R^{45}$ is $CH_3$ or $C_2H_5$;
k and y are independently of one another 0, 1 or 2; and
x and x' are 1 or 2.

The compounds of formula (A1), (A2) or (A3) are preferred, wherein n is 0 and m is 1.

Accordingly, a preferred compound of formula (A) or (B) is a compound of formula (A1-1), (A2-1), (A3-1), (B1-1), (B1-2), (B2-1), (B2-2), (B3-1) or (B4-1) having one of the following formulae (A1-1)

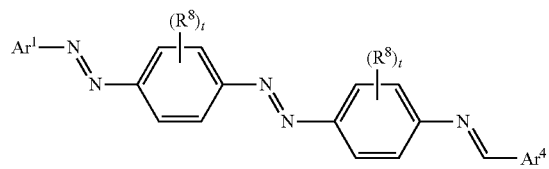

(A2-1)

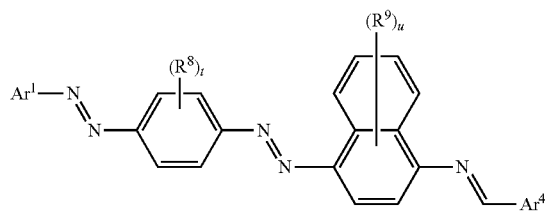

(A3-1)

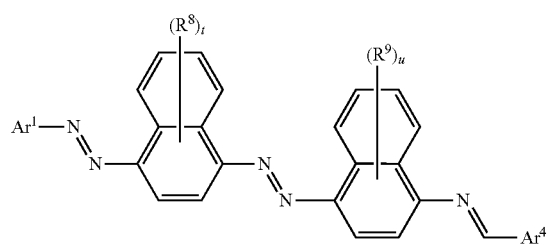

(B1-1)

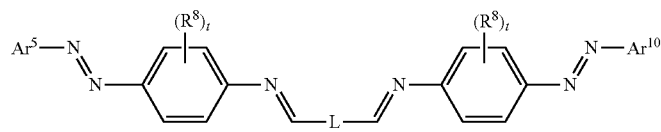

(B1-2)

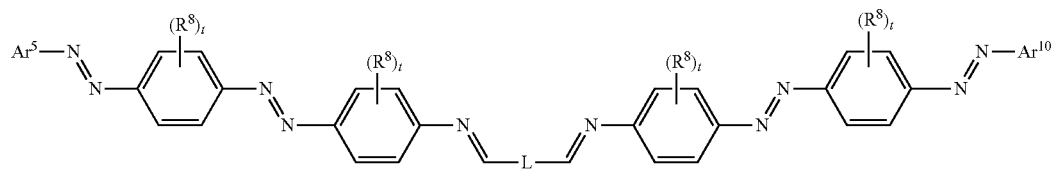

(B2-1)

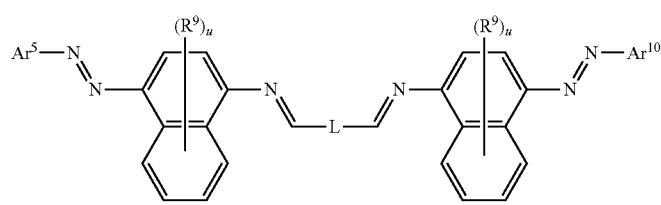

(B2-2)

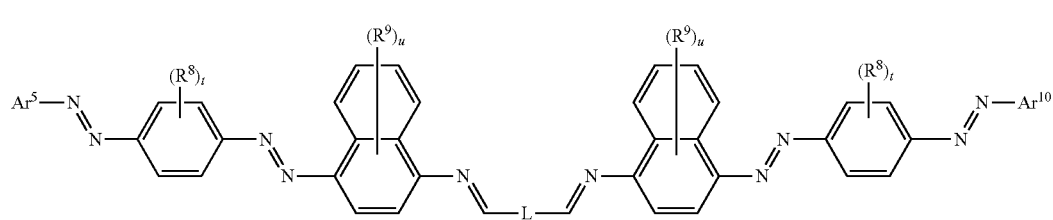

-continued

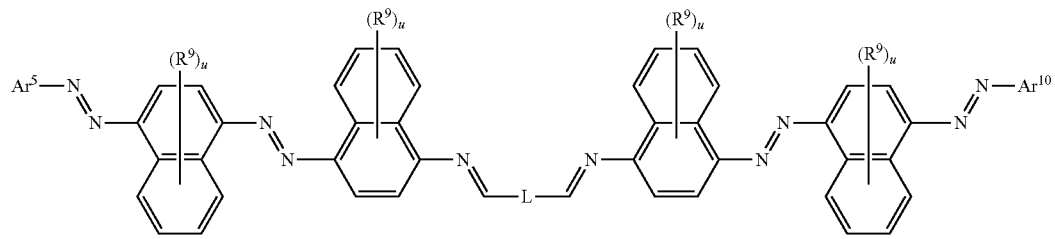
(B3-1)

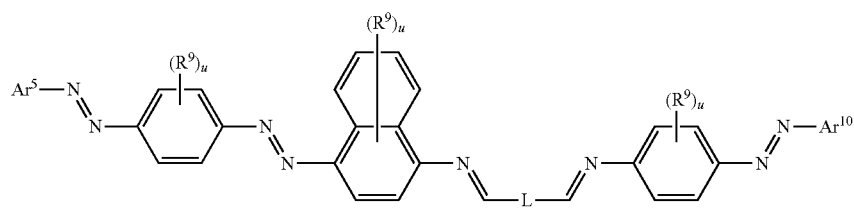
(B4-1)

wherein

Ar$^1$, Ar$^5$ and Ar$^{10}$ are independently of one another a residue selected from the group consisting of

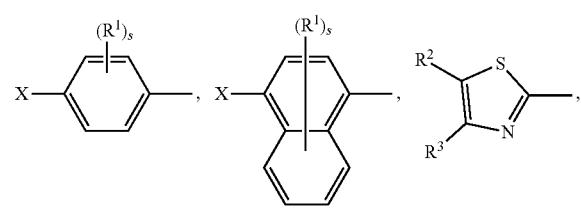

Ar$^4$ is a residue of

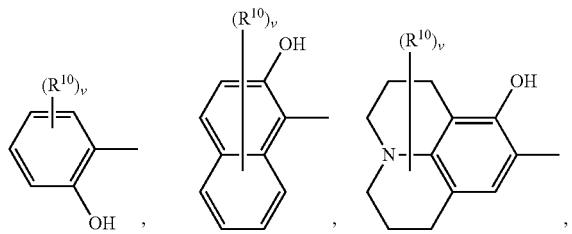

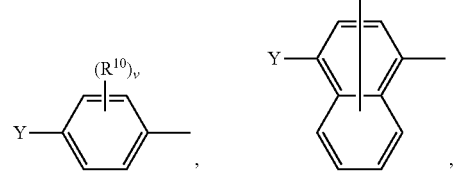

-continued

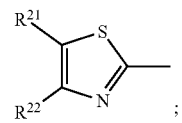

X is CF$_3$, F, CN, COOR$^{17}$, CONR$^{18}$R$^{19}$, SO$_2$R$^{20}$ or

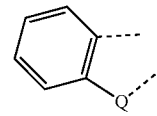

Y is H, C$_1$-C$_8$-alkyl; NR$^{24}$R$^{25}$, F, CN, OH, C$_1$-C$_8$-alkoxy; C$_1$-C$_8$-alkylthio; COOR$^{26}$, phenyl; phenyl substituted with C$_1$-C$_8$-alkyl, C$_1$-C$_8$-alkoxy, C$_1$-C$_8$-alkylthio, or NR$^{27}$R$^{28}$; or C$_5$-C$_{14}$-cycloalkyl;

or Y and one adjacent H form together a group

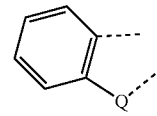

or a 5 to 6-membered heterocyclic ring containing one or two Q,

Q is NR$^{33}$ or O;

said group

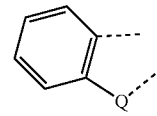

or heterocyclic group is unsubstituted or substituted with CH$_3$;

$R^1$ is $CH_3$, $CF_3$, F or CN;

$R^2$, $R^3$, $R^4$, $R^5$, $R^{21}$ and $R^{22}$ are independently of one another and at each occurrence selected from H, F, CN, $CO_2R^{34}$, $C_1$-$C_8$-alkyl or phenyl;

or $R^2$ and $R^3$ together form a benzoanellated ring, said benzoanellated ring is unsubstituted or substituted with $CH_3$, $C_2H_5$ or CN;

$R^8$ and $R^9$ are independently of one another and at each occurrence $CH_3$;

$R^{10}$ is at each occurrence selected from $C_1$-$C_8$-alkyl, $CF_3$, F, $C_1$-$C_8$-alkoxy, OH or CN;

$R^{11}$ is at each occurrence $CH_3$ or $C_2H_5$;

$R^{14}$, $R^{17}$, $R^{20}$, $R^{26}$ and $R^{34}$ are independently of one another $C_1$-$C_8$-alkyl, $C_6$-$C_{12}$-cycloalkyl, phenyl, phenyl substituted with $C_1$-$C_8$-alkyl; phenylene-$C_6$-$C_{12}$-cycloalkyl; or$C_6$-$C_{12}$-cycloalkylene-phenyl;

$R^{12}$, $R^{13}$, $R^{18}$, $R^{19}$, $R^{24}$, $R^{25}$, $R^{27}$ and $R^{28}$ are independently of one another H, $C_1$-$C_8$-alkyl, C5-C14-cycloalkyl, phenyl; phenylene-$C_6$-$C_{12}$-cycloalkyl; or $C_6$-$C_{12}$-cycloalkylene-phenyl;

or $R^{12}$ and $R^{13}$, $R^{18}$ and $R^{19}$, $R^{24}$ and $R^{25}$, or $R^{27}$ and $R^{28}$ together are C5-C6-alkylene or C3-C6-alkylene interrupted by O or $NR^{41}$;

$R^{33}$, $R^{41}$ and $R^{49}$ are independently of one another H, $C_1$-$C_4$-alkyl, $C_5$-$C_6$-cycloalkyl or phenyl;

L is a group selected from

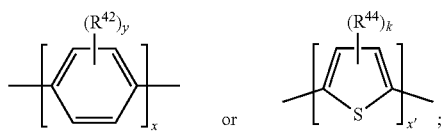

$R^{42}$ and $R^{44}$ are independently of one another and at each occurrence selected from $CH_3$ or $OCH_3$;

$R^{47}$ and $R^{48}$ are independently of one another and at each occurrence selected from $C_1$-$C_6$-alkyl, $C_1$-$C_6$-alkoxy, $NR^{12}R^{13}$, $CO_2R^{14}$ or $NO_2$;

k, t, v and y are independently of one another 0, 1 or 2;

x and x' are 1;

r, r', s and u are independently of another 0 or 1; and w is 0, 2 or 4.

In particular, the compound of formula (A) or (B), preferably the compounds of formula (A1), (A2), (A3), (B1), (B2), (B3) or (B4), more preferably the compounds of formula (A1-1), (A2-1), (A3-1), (B1-1), (B1-2), (B2-1), (B2-2), (B3-1) or (B4-1), comprises a p-substituted aryl group or a thiazolyl group as $Ar^1$, $Ar^5$ and $Ar^{10}$.

Especially preferred are compounds of formula (B1-1), (B1-2), (B2-1), (B2-2) or (B3-1), where $Ar^5$ and $Ar^{10}$ are identical.

Accordingly, a compound of formula (A1-1), (A2-1), (A3-1), (B1-1), (B1-2), (B2-1), (B2-2), (B3-1) or (B4-1) is more preferred, wherein $Ar^1$, $Ar^5$ and $Ar^{10}$ are independently of one another a residue selected from the group consisting of

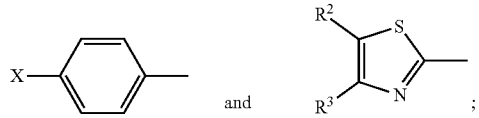

and $Ar^5$ and $Ar^{10}$ are identical;

$Ar^4$ is a residue of

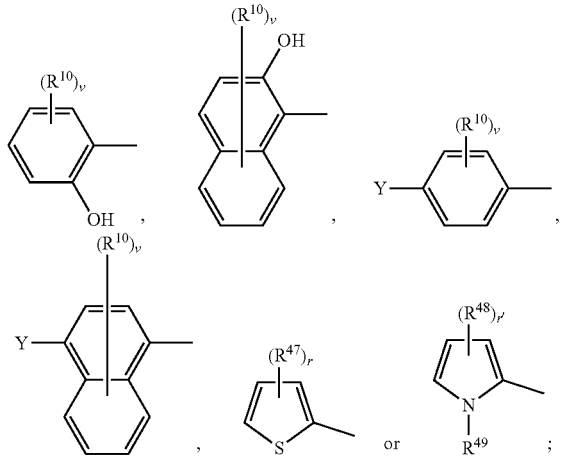

X is $CF_3$, F, CN or $COOR^{17}$;

$R^2$ and $R^3$ are independently of one another H, F, $C_1$-$C_7$-alkyl or $CF_3$;

or $R^2$ and $R^3$ together form a benzoanellated ring, said benzoanellated ring is unsubstituted or substituted with $CH_3$, $C_2H_5$ or CN;

$R^{10}$ is $C_1$-$C_7$-alkyl, $CF_3$, F, Cl, Br, $C_1$-$C_6$-alkoxy, OH or CN;

Y is H, $C_1$-$C_7$-alkyl; $C_1$-$C_7$-alkyl substituted with OH or $NH_2$; $NR^{24}R^{25}$, F, CN, OH, $C_1$-$C_6$-alkoxy; $COOR^{26}$, phenyl; phenyl substituted with $C_1$-$C_7$-alkyl, $C_1$-$C_6$-alkoxy, or $NR^{27}R^{28}$; or $C_5$-$C_6$-cycloalkyl;

or Y and one adjacent H form together a group

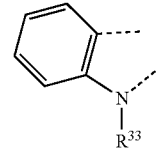

or a 5 to 6-membered heterocyclic ring containing one or two Q,

Q is $NR^{33}$ or O;

said group

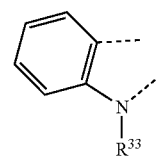

or heterocyclic ring is unsubstituted or substituted with $CH_3$;

$R^{14}$, $R^{17}$ and $R^{26}$ are independently of one another $C_1$-$C_8$-alkyl; $C_6$-$C_{12}$-cycloalkyl; phenyl, phenyl substituted with $C_1$-$C_8$-alkyl; phenylene-$C_6$-$C_{12}$-cycloalkyl or $C_6$-$C_{12}$-cycloalkylene-phenyl;

$R^{12}$, $R^{13}$, $R^{24}$, $R^{25}$, $R^{27}$ and $R^{28}$ are independently of one another H or $C_1$-$C_5$-alkyl;

or $R^{12}$ and $R^{13}$, $R^{24}$ and $R^{25}$, or $R^{27}$ and $R^{28}$ together are $C_5$-$C_6$-alkylene or $C_5$-$C_6$-alkylene interrupted by O, or $NR^{41}$;

$R^{33}$, $R^{41}$ and $R^{49}$ are independently of one another H or $C_1$-$C_4$-alkyl;

$R^{47}$ and $R^{48}$ are independently of one another and at each occurrence selected from $C_1$-$C_6$-alkyl, $C_1$-$C_6$-alkoxy, $NR^{12}R^{13}$, $CO_2R^{14}$ or $NO_2$;

L is a group selected from

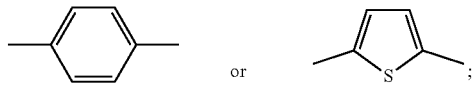

v is 0, 1 or 2; and r and r' are 0 or 1.

The compounds of formula (A) and (B) according to the invention may be prepared by condensation of amino group substituted azo compounds with aldehydes and, if desired, further purified in analogy to known methods, especially in the field of azo dye chemistry.

Accordingly, in a further aspect, the invention relates to a process for preparing a compound of formula (A) or (B), as defined in any aspect herein-before, —in case of a compound of formula (A)—
by condensation of an amino-substituted azo compound of formula (A-A) and an aldehyde of formula (A-B):

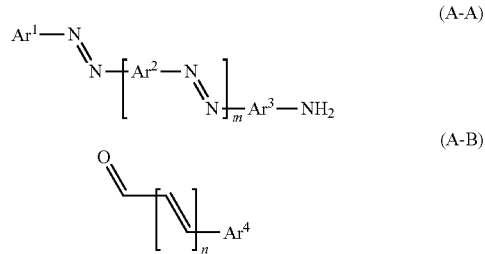

—case of a compound of formula (B)—
by condensation of an amino-substituted azo compound of formula (B-A) and a dialdehyde of formula (B-B):

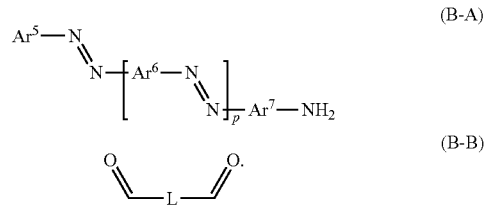

The residues and symbols in compounds (A-A), (A-B), (B-A) and (B-B) have been described before in the definition of compounds (A) and (B).

Suitable condensation conditions are known in the art, e.g., described in reference texts like Enamines—Synthesis, Structures and Reactions, publ. A. G. Cook, Marcel Dekker, New-York (1969) or P. W. Hickmott, Tetrahedron 38, 1975-2050; 3363-3446 (1982).

Usually, equimolar amounts of the compounds of formula (A-A) and formula (A-B) are reacted at an elevated temperature, optionally under acidic catalysis, in a solvent to form the compound of formula (A). The amount of (A-B) may vary from equimolar to an excess in order to ensure completeness of the reaction. The compound of formula (B) is usually prepared by reacting one equivalent of the dialdehyde of formula (B-B) with two equivalents of a compound of formula (B-A).

The temperature may be in the range of from 40 to 180° C., preferably at 70 to 160° C. Suitable solvents may be alcohols, like ethanol, n-propanol or butanol, solvents which allow azeotropic distillation of water, like toluene, o-dichlorobenzene or xylene, or polar aprotic solvents like N,N-dimethylformamide. Examples of suitable catalysts are acetic acid, p-toluenesulfonic acid, methanesulfonic acid or formic acid. The water formed during reaction is usually eliminated by a water separator, using water absorbers like suitable molecular sieves or by azeotropic distillation.

The azo compounds (A-A) and (A-B) are commercially available and/or may be prepared as described in U.S. Pat. No. 4,565,424 (see, e.g., col. 9-10) or in the example part of WO 2011/157614 A1. Further, they may be prepared according to methods described in "Dichroic Dyes for Liquid Crystal Display" by A. V. Ivashchenko, published by CRC, 1994.

The aldehydes (A-B) and (B-B) are commercially available or prepared as known in the art.

The compounds of formulae (A) and (B) thus obtained may be isolated and purified by conventional methods known by a person skilled in the art.

The compounds of formulae (A) and (B) of the invention are characterized by a high dichroic ratio. Preferably, the dichroic ratio of a azo-azomethine dye of formula (A) or (B) (parallel-extinction/perpendicular-extinction) measured at room temperature (i.e., 25° C.) is ≥7.5 in the liquid crystal material MLC2132, preferably ≥8, more preferably ≥10 as a 2% solution (wt %) in a thin film cell of 5 µm cell gap in the nematic liquid crystal mixture MLC2132 which is commercially available from Merck KGaA, Germany.

The compounds of formulae (A) and (B) are further characterized by a good solubility in a liquid crystal material. The solubility (at room temperature (i.e., 25° C.)) of the compounds of formulae (A) and (B) in standard liquid crystal mixtures, for example, in MLC2132, is preferably ≥0.1 wt %, more preferably ≥0.2 wt %, most preferably ≥0.3 wt %, based on the total amount of the liquid crystal mixture. The mixture of two or more compounds of formula (A) and (B) may have higher solubilities in liquid crystal materials.

The compound of formula (A) or (B) may be used as single dichroic dye.

The compound of formula (A) or (B) may also be used as a mixture comprising at least one of a compound of formula (A) and/or (B). Thus, a dichroic dye mixture may comprise at least one compound of formula (A) or may comprise at least one of compound of formula (B) or may comprise at least one of a compound of formula (A) and at least one of a compound of formula (B).

Optionally, the dichroic dye mixture may comprise a further dichroic dye, which is different from a compound of formula (A) or (B).

Accordingly, in a further aspect the invention relates to a dichroic dye mixture comprising one or more compounds of formula (A) or (B), as defined in any aspect herein, and optionally one or more further dichroic dyes.

The dichroic dye mixture usually contains one or more compounds of formula (A) and/or (B), preferably 1, 2, 3, 4 or 5 of the compounds of formula (A) and/or (B). The dichroic dye mixture may also contain one or more further dichroic dyes, which are different from the compounds of formula (A) or (B), preferably 1, 2, 3, 4 or 5 further dichroic dyes.

Generally, a dichroic dye mixture is used to achieve a certain color. The further dichroic dyes may be selected from any known dichroic dye, for example, a dichroic azo dye, a dichroic anthraquinone dye, or a dichroic azomethine dye which is different from a compound of formula (A) or (B).

A dichroic dye mixture is either a dichroic dye mixture of a certain color shade or black dichroic dye mixture.

A dichroic dye mixture is preferably a dichroic dye mixture of a certain color shade.

Alternatively, a dichroic dye mixture is preferably a black dichroic dye mixture. Usually, at least two or three dyes are required to achieve the desired black color, for example, by mixing a yellow, blue and red dye or a magenta, cyan and yellow dye or a violet, green-blue and orange dye. For example, a black dichroic dye mixture may comprise a yellow dye having an absorption maximum of 400-500 nm, a magenta dye having an absorption maximum of 500-580 and a cyan dye having an absorption maximum of 580-700 nm.

In particular, the dye mixture comprises a compound of formula (A) and/or (B) and a blue dichroic dye, for example an azo dye or an anthraquinone dye, preferably an azo dye. It was found that such dichroic dye mixture may have a better light stability compared to dichroic dye mixture based on azo dyes.

Generally, the compound of formula (A) or (B) or the dichroic dye mixture is compounded with liquid crystal material (LC material) forming a liquid crystal composition.

Usually, the compounds of formula (A) or (B) or the dichroic dye mixture are usually dissolvable in the LC material following known techniques such as formation a pre-solution of one or more of the dyes in a solvent, especially a solvent of high vapor pressure such as lower alkyl ethers, hydrocarbons, or halohydrocarbons such as dichloromethane, mixing the pre-solution with the LC material and removing the solvent under reduced pressure and/or heating. Generally, the LC material is commercially available. The application of the dyes in the liquid crystal material, types of liquid crystal material, assembly of liquid crystal cells and testing methods are known in the art. Some are described, for example, in U.S. Pat. No. 4,565,424 (see e.g. col. 13-18).

The compounds of formula (A) and/or (B) or the present dichroic dye mixture may be present in the liquid crystal composition in an amount of 0.01 to 10 wt %, preferably 0.05 to 7 wt %, more preferably 0.1 to 5 wt %.

Accordingly, in a further aspect, the invention relates to a liquid crystal composition comprising a liquid crystal material and at least one compound of formula (A) and/or (B), as defined in any aspect herein, or a dichroic dye mixture, as defined in any aspect herein-before.

The LC material in the present liquid crystal composition generally comprises a single compound or a plurality of different compounds.

Usually the LC material of the present liquid crystal composition comprises at least one compound in form of a molecule having an elongated shape, which is significantly longer in one spatial direction than in the two other spatial directions.

More preferably, the present liquid crystal composition comprises a LC material comprising at least one compound which contains structural elements based on 1,4-phenylenes, and/or 1,4-cyclohexylenes, preferably 2 to 20 compounds, particularly preferably 2 to 18, more preferably 2, 3, 4, 5, 6, 7, 8, 9, 10, 11, 12, 13, 14, 15 or 16 compounds containing structural elements based on 1,4-phenylenes and and/or 1,4-cyclohexylenes.

Suitable compounds useful as LC material of the liquid crystal composition are known in the art. Suitable LC materials are, for example, described in EP 1352943 A1, EP 3048159 A1 or EP 2725083 A2. Further suitable are, for example, the liquid crystal mixtures commercially available from Merck KGaA, Germany with the tradename Licristal® or Licrivision®.

The liquid crystal composition of the present invention comprises at least one compound of formula (A) or (B), as defined in any aspect herein-before, and a liquid crystal material. Further compounds may be present in addition to the compounds mentioned before in the liquid crystal composition, for example, solvents, chiral dopants, surfactants, stabilizers, like antifungal or antibacterial agents or sterilizers, anti-cissing agents, non-liquid crystalline polymerizable monomers, non-liquid-crystalline binder polymer, polymerizable LC dye monomers, photoinitiators, UV light absorbers or radical scavengers.

Depending on the end-use a suitable LC material may be selected from one skilled in the art. Various phases, like smectic or nematic phases, are known to give an anisotropic effect.

The compounds of formula (A) and (B), the dichroic dye mixture or the liquid crystal composition of the invention may be used in various applications, for example, as guest in guest-host LC application media, forming a light absorption anisotropic element.

Accordingly, in a further aspect the invention relates to a light absorption anisotropic element comprising a compound of formula (A) or (B), as defined in any aspect herein, or a dichroic dye mixture, as defined in any aspect herein, or a liquid crystal composition, as defined in any aspect herein.

The term "light absorption anisotropic element" used herein is a dichroic dye-containing polarizing element having anisotropy in electromagnetism properties in any two directions selected from total three directions of the thickness direction and any two orthogonal directions on the inner surface of the dichroic dye layer. Examples of the electromagnetism property include optical properties such as absorption and reflection, and electrical properties such as resistance and capacity.

The process for manufacturing a light absorption anisotropic element of the invention generally includes a) a step of dissolving a compound of formula (A) or (B) or a dichroic dye mixture of the invention in a LC material to form a liquid crystal layer comprising a LC composition, and b) a step of providing a means for aligning the compound of formula (A) or (B) or a dichroic dye mixture in said layer.

For example, the step of aligning may be made by an electrical field or by means of an orientation layer by stretching, rubbing or exposing to polarized light.

Thus, the compound of formula (A) or (B) or the dichroic dye mixture or the liquid crystal composition may be used for applications, wherein the compound of formula (A) or (B) or the dichroic dye mixture is fixed in a polymeric matrix, generally formed by polymerizable LC material or for applications, which are switchable optical devices comprising a compound of formula (A) or (B) or the dichroic dye mixture and a LC material.

In the first case, the compound of formula (A) or (B) or the dichroic dye mixture may be used as part of the light absorption anisotropic element for static anisotropic films, which are generally based on polymerizable liquid crystal materials with various applications. Examples are stretched polymer films, coatable polarizers, retarder films, security features, for example in bank notes, credit cards or identification cards, or features for brand protection and the like.

Stretched polymer films are films in which the polymers are all aligned in the same direction.

Coatable polarizers are, for example, in-cell polarizers or polarizing films for liquid crystal displays (LCD) or organic light emitting diodes (OLED).

Such films are usually formed by using polymerizable LC materials, for example, LC molecules containing one or two alkyl(oxy)acrylate groups on one or both ends, such as compounds of formula Alkyl-O-[LC]-O—$(CH_2)_n$—O—CO—C(R)=$CH_2$, wherein [LC] stands for the mesogenic part of the molecule, Alkyl is an alkyl group, for example of 1 to 12 carbon atoms, R is H or methyl, n is an integer of 1 to 12.

Accordingly, in a further aspect the invention relates to an optically anisotropic film comprising a compound of formula (A) or (B), as defined in any aspect herein, or a dichroic dye mixture, as defined in any aspect herein, or a liquid crystal composition, as defined in any aspect herein.

In a preferred aspect the invention relates to optically anisotropic film, which optically anisotropic film is a stretched polymer film, a coatable polarizer, a retarder film, a security feature or a feature for brand protection.

Alternatively, the compound of formula (A) or (B) or the dichroic dye mixture or the liquid crystal composition may be used for switchable optical devices.

Accordingly, in a further aspect the invention relates to a switchable optical device comprising a compound of formula (A) or (B), as defined in any aspect herein, or a dichroic dye mixture, as defined in any aspect herein, or a liquid crystal composition, as defined in any aspect herein. Preferably, the invention relates to a switchable optical device comprising a compound of formula (A) or (B), as defined in any aspect herein, or a dichroic dye mixture, as defined in any aspect herein.

A switchable optical device may be, for example, a polymer dispersed liquid crystal (PDLC) system, a reversed PDLC system, a polymer network liquid crystal (PNLC) system and the like. A switchable optical device may also be a light shutter for smart windows, a transmissive display or a reflective display, preferably using a black dichroic dye mixture. A switchable optical device may also be a light shutter for decoration, a transmissive display or a reflective display, preferably using a single dichroic dye or a colored dichroic dye mixture. A colored dichroic dye mixture as used herein is not a black dichroic dye mixture. Reflective displays may be used in electronic shelf labels.

The liquid crystal composition containing the compound of formula (A) or (B), resp., are generally present in a switchable layer of the switchable optical device. The liquid crystal composition may be present in pure form or in form of a polymer-dispersed liquid crystal layer.

Suitable polymers for dispersing the liquid crystal mixture according to the present invention are known by a person skilled in the art, for example, polyacrylates, polymethacrylates and related copolymers, or polyurethanes.

Suitable structures of switchable optical devices are known in the art, for example, TN (twisted nematic) switchable elements (for example, described in DE 3022818 A1), STN (super twisted nematic) switchable elements (for example, described in EP 0260450 A1) and VA (vertically aligned) switchable elements.

Further suitable structures of switchable optical devices are liquid crystal-polymer composites like PDLC (polymer dispersed liquid crystal) systems or reversed PDLC systems, as described, for example, by M. Schadt et al., Jpn. J. Appl. Phys., 34, 1995, pp. 3240-3249, or by Paul S. Drzaic, Pure & Applied Chem., 68(7), 1996, pp. 1435-1440, or PNLC (polymer network liquid crystal) systems, as described, for example, by J. Sun, S.-T. Wu, Polym. Phys., 52 (3), 2014, pp. 183-192.

The switchable optical device may be used in/as windows (smart windows), for example, in architectural glass or sunroofs, in displays, switchable optical elements or mirrors with variable transmission.

In a preferred embodiment, the smart window should be switchable from transparent to black or grey and vice versa. Therefore, dichroic dyes with different absorption bands are mixed to achieve an absorption of almost the complete spectrum of the visible light or of major part of sun light.

Such smart windows are useful in several applications, for example, in buildings, furniture, cars, trains, planes and ships, as well as in facades, skylights, glass roofs, stair treads, glass bridges, canopies, railings, car glazing and train glazing, ophthalmologic lenses, sunglasses, sport glasses or 3D-glasses.

Accordingly, in a preferred aspect the invention relates to a switchable optical device, which switchable optical device is a polymer dispersed liquid crystal system, a reversed polymer dispersed liquid crystal system, a polymer network liquid crystal system, a light shutter for smart windows, a transmissive display, a reflective display or a light shutter for decoration.

The compounds of formula (A) or (B) are dichroic dyes based on azo-azomethine structure. They are characterized by a sufficiently high dichroic ratio as well as by a high compatibility, e.g., a high solubility and a good durability, especially a high lightfastness, in liquid crystal compositions. They show very broad absorption spectra and high extinction leading to need of less amount of dichroic dyes.

Further, the azo-azomethine dyes of formulae (A) and (B) are characterized by a high purity, high photostability and electric resistivity. They are easily available by using aldehydes as building blocks which do not require azo units.

LC compositions containing a dichroic dye mixture of the invention, preferably a black dichroic dye mixture containing a further blue dichroic dye, show a good durability like a high light stability.

Thus, the dichroic dyes are well suited for applications of light absorption anisotropic elements as well as for use for smart windows.

The definitions and preferences given for the compound of formula (A) or (B), as mentioned herein-before, apply in any combination as well as in any combination for the other aspects of the invention.

The present invention will now be explained in more detail with reference to the following examples. These examples should not be construed as limited. Unless otherwise stated, "%" is always % by weight (wt %).

EXAMPLES

The following azo precursors were used to prepare Examples 1 to 35.

Azo precursor I of formula (I): prepared according to Example 6a of WO 2011/157614 A1.

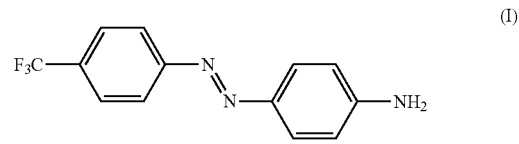 [SMILES: Nc1ccc(/N=N/c2ccc(C(F)(F)F)cc2)cc1]

Azo precursor II of formula (II): prepared according to Example 6b of WO 2011/157614 A1

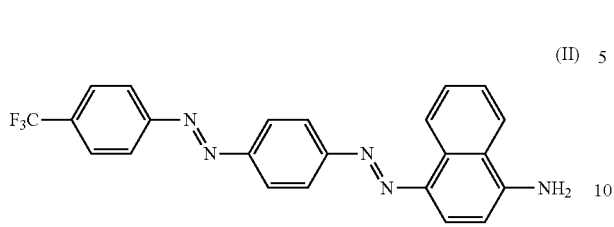

Azo precursor IV of formula (IV): prepared according to Example 4a of WO 2011/157614 A1

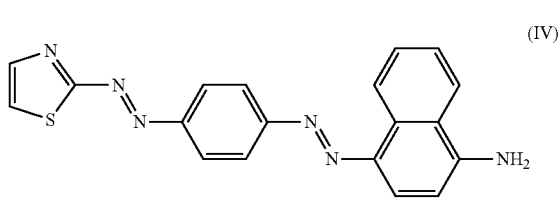 [SMILES: Nc1ccc(/N=N/c2ccc(/N=N/c3nccs3)cc2)c2ccccc12]

Azo precursor VI of formula (VI): prepared according to Example 3a of WO 2011/157614 A1

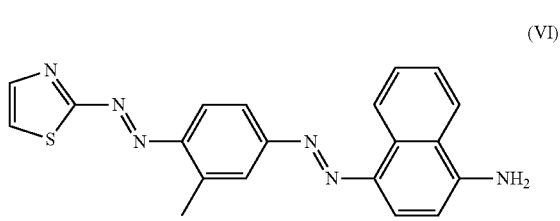 [SMILES: Cc1cc(/N=N/c2ccc(N)c3ccccc23)ccc1/N=N/c1nccs1]

Azo precursor VII of formula (VII): prepared according to Example 9a of WO 2011/157614 A1

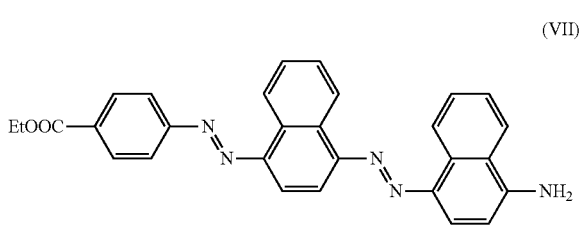 [SMILES: CCOC(=O)c1ccc(/N=N/c2ccc(/N=N/c3ccc(N)c4ccccc34)c3ccccc23)cc1]

Synthesis Example 1: Azo Precursor III 1.1 g (5 mmol) of 4-[(E)-(4-aminophenyl)azo]benzonitrile (prepared as described in Macromol. Chem. Phys. 2007, pp. 208) were dissolved in 25 ml of N-methylpyrrolidone (NMP). The solution was cooled to 5-10° C., followed by adding dropwise 1.54 g (48 mmol) of nitrosyl sulfuric acid (40%). The resulting disazo solution was stirred at 10° C. for one hour. 0.71 g (5 mmol) of 1-naphthylamine were dissolved in 25 ml of methanol and cooled to 5° C., followed by adding the disazo solution in one portion. The resulting mixture was stirred at 5° C. for one hour. After one hour, 1.3 ml of 1N sodium hydroxide solution was added. The obtained dark violet precipitate of formula (III) was filtered-off and washed with water and methanol. Yield 1.35 g (72%).

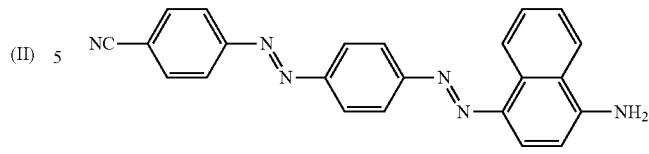

Synthesis Example 2: Azo Precursor V a) 36.0 g of 4-aminobenzonitrile (0.30 mol) were dissolved in 150 ml of methanol, followed by adding 450 ml of 2N HCl. The yellow solution was cooled to 5° C., followed by slowly adding 76 ml of 4N of sodium nitrite solution in water during 38 min under stirring. The resulting suspension was stirred at 5° C. for 3 hours and then slowly added to a cooled (5° C.) solution of 36.4 g (0.30 mol) of 2,5-dimethylaniline in 250 ml of isopropanol, while 350 ml of isopropanol were added. The resulting mixture was stirred overnight at slowly rising temperature (5° C. up to room temperature (RT)). The red-violet suspension was filtered, the residue was dispersed in 800 ml of water, and sodium hydroxide solution (30%) was added until the pH rises to 8-9. The mixture was filtered, and the filter cake was dried (50° C./200 mbar) to obtain an orange solid product of formula (Va). Yield 58 g (77%).

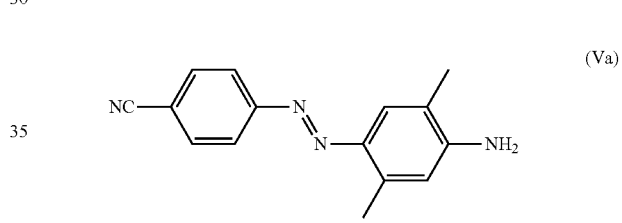

b) 30.5 g (0.12 mol) of the product of step a) were dissolved in 300 ml of NMP, the resulting red solution was cooled to −2° C., followed by adding 38 g of nitrosylsulfuric acid within 25 min at −2° C. and stirring for further 90 min. The resulting red-orange suspension was added during 15 min to a cooled (5° C.) solution of 17 g (0.12 mol) of 1-naphthylamin in 100 ml of NMP and 100 ml of 2N HCl. The resulting suspension was diluted by adding further 250 ml of NMP and was stirred under slowly rising temperature (5° C.—RT) overnight. 600 g of ice were added, the precipitate was filtered off after 1 hour of stirring, followed by washing with concentrated brine. The residue was dispersed in 1500 ml of water, the pH was adjusted with 30% aqueous NaOH to 9-9.5. The precipitate was filtered and dried to obtain a dark violet solid of azo precursor V of formula (Vb). Yield 28 g (58%).

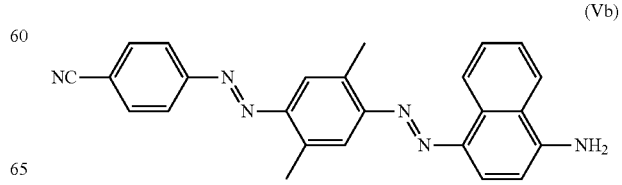

Synthesis Example 3: azo precursor VIII a) 12.0 g of 4-amino-cyano-benzene (0.1 mol) were dispersed in 300 ml of 1N HCl and cooled to 5° C., followed by slowly adding of 26 ml of 4N sodium nitrite solution in water during 26 min while stirring. The bright yellow dispersion was stirred for 2 hours at 5° C., excess of nitrite was destroyed by adding sulfaminic acid. The resulting solution was slowly added to a solution of 21.5 g of anilino-methansulfonate (0.1 mol) in water and 25 g of sodium bicarbonate at 5° C. under stirring for 10 min. The resulting orange suspension was stirred for 2 hours at 5° C., for 17 hours at RT and then filtered. The precipitate was dispersed in 1 L of water at 70° C., followed by adding 100 ml of 30% aqueous NaOH while the temperature was risen to 80° C. After 30 min the suspension was cooled to 40° C., filtered and the precipitate was washed with water and dried (200 mbar/50° C.) to obtain an orange product of formula (VIIIa). Yield 17.1 g (77%).

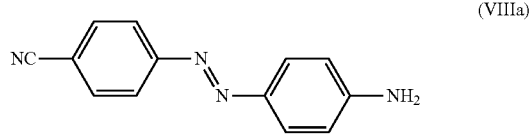 [SMILES: N#Cc1ccc(/N=N/c2ccc(N)cc2)cc1]
(VIIIa)

b) 10.3 g of compound of formula (VIIIa) (46 mmol) were dissolved in 270 ml of tetrahydrofurane (THF). The orange solution was cooled to 5° C., followed by adding 10 ml of 50% tetrafluoroboric acid in water and 8.5 ml of tert-butylnitrite (within 1 min) and stirring for 2 hours at 10-15° C. The resulting suspension was filtered, and the violet residue was washed twice with 100 ml of tetrabutyl methyl ether each to obtain the corresponding diazonium tetrafluoroborate.

c) 12.5 g of sodium acetate trihydrate (92 mmol) and 3.7 g of m-toluidine (35 mmol) were dissolved in 150 ml of methanol and cooled to 5° C. 7.77 g (35 mmol, 1 eq) of the product of step b) were added, and the resulting suspension was stirred for 3 hours at 5° C. The suspension was filtered, and the residue was washed with methanol/water (1:1) and dried to obtain 7.6 g of a brownish solid of azo precursor VIII of formula (VIIIc).

(VIIIc)

Example 1

4.19 g (10 mmol) of azo precursor II were suspended in a mixture of 29.7 ml of n-propanol and 2.1 ml of acetic acid, followed by adding 5.32 g of diethylamino-benzaldehyde (30 mmol) and 13.34 g of activated molecular sieves (Aldrich UOP type 8-12 mesh, 4 Å). The mixture was refluxed for 48 hours and then cooled to RT. The solids were filtered off and washed with 10 ml of n-propanol. The residue was suspended in THF to dissolve the product, the solids were filtered off and washed with THF. The filtrate was evaporated to obtain a dark red solid of formula (1) after drying. Yield 1.15 g (20%).

$^1$H-NMR (400 MHz, CDCl$_3$): δ=1.28 (t, CH$_3$, 6H), 3.50 (q, CH$_2$, 4H), 6.79 (d, Ar—H, 2H), 7.16 (d, Aryl-H, 1H), 7.63 (m, Aryl-H, 2H), 7.74 (m, Aryl-H, 2H), 7.88 (dd, Aryl-H, 4H), 8.04 (d, Aryl-H, 1H), 8.09 (d, Aryl-H, 2H), 8.20 (m, Aryl-H, 4H), 8.45 (s, N=C$\underline{H}$, 1H), 8.51 (d, Aryl-H, 1H), 9.06 (d, Aryl-H, 1H).

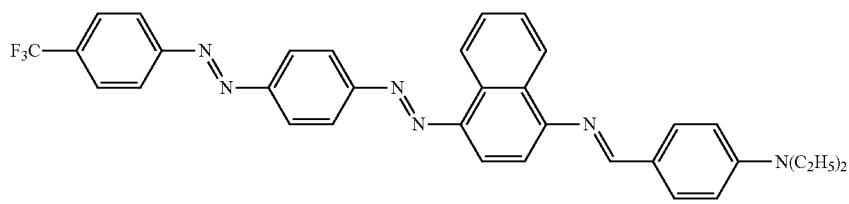
(1)

Example 2

2.21 g (5 mmol) of azo precursor II were suspended in a mixture of 15.6 ml n-propanol and 1.1 ml of acetic acid, followed by adding 2.82 g of 4-biphenylaldehyde (10 mmol) and 7.02 g of activated molecular sieves (4 Å). The mixture was refluxed for 24 hours and then cooled to RT.

The solids were filtered off and washed with n-propanol. The residue was suspended in THF to dissolve the product, the solids were filtered off and washed with THF. The filtrate was evaporated to obtain an orange solid of formula (2) after drying the product (50° C., 200 mbar). Yield 1.60 g (55%).

$^1$H-NMR (400 MHz, CDCl$_3$): δ=7.21 (d, Aryl-H, 1H), 7.42-7.47 (m, Aryl-H, 1H), 7.53 (m, Aryl-H, 2H), 7.65-7.78 (m, Aryl-H, 4H), 7.83 (t, Aryl-H, 4H), 8.4 (d, Aryl-H, 1H), 8.10 (dd, Aryl-H, 2H), 8.15-8.26 (m, Aryl-H, 6H), 8.48 (d, Aryl-H, 1H), 8.67 (s, C$\underline{H}$=N, 1H), 9.08 (d, Aryl-H, 1H).

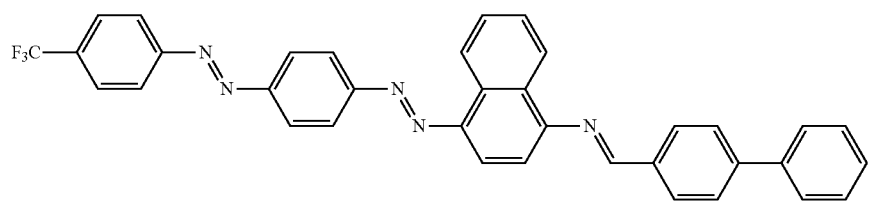

(2)

Example 3

4.19 g (10 mmol) of azo precursor II were suspended in a mixture of 31.2 ml of n-propanol and 2.2 ml of acetic acid, followed by adding 1.34 g of 4-cyanobenzaldehyde (10 mmol) and 14.04 g of activated molecular sieves (4 Å). The mixture was refluxed for 48 hours and then cooled to RT. The solids were filtered off and washed with n-propanol, the residue was suspended in THF to dissolve the product, the solids were filtered off and washed with THF. The filtrate was evaporated to obtain an orange solid of formula (3) after drying the product at 50° C. and 200 mbar. Yield 3.12 g (59%).

$^1$H-NMR (400 MHz, CDCl$_3$): δ=7.22 (d, Aryl-H, 1H), 7.69 (m, Aryl-H, 1H), 7.79 (m, Aryl-H, 1H), 7.83-7.88 (m, Aryl-H, 4H), 8.02 (d, Aryl-H, 1H), 8.10 (d, Aryl-H, 2H), 8.17-8.27 (m, Aryl-H, 5H), 8.43 (d, Aryl-H, 1H), 8.68 (s, N=C$\underline{H}$, 1H), 9.08 (d, Aryl-H, 1H).

Example 4

1.23 g (2.14 mmol) of azo precursor II were dissolved in 25 ml of toluene, followed by adding 0.32 g (2.14 mmol) of 4-ethoxy-benzaldehyde and 3 g of activated molecular sieves (4 Å). The resulting mixture was refluxed under N$_2$ for 30 hours. After cooling to RT, the mixture was filtered, and the residue was washed with 20 ml of toluene. The filtrate was evaporated, the residue was stirred in 30 ml of methanol and stirred at 58° C. for 30 min. The mixture was filtered while hot, and the residue was washed with 30 ml of methanol. The residue was suspended in dichloromethane to dissolve the product and filtered. The dichloromethane filtrate was evaporated to obtain a product of formula (4) after drying (80° C./125 mbar).

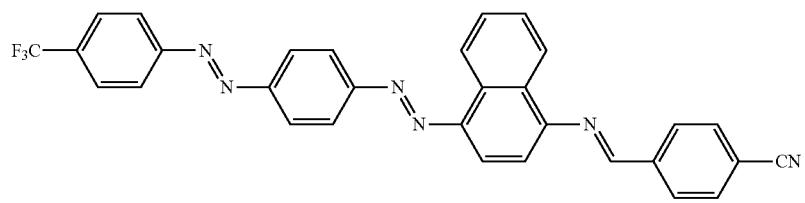

(3)

MALDI-TOF-MS (pos. mode): 552.4

$^1$H-NMR (400 MHz, CDCl$_3$): δ=1.51 (t, 3H, CH$_3$), 4.18 (q, 2H, CH$_2$), 7.06 (d, 2H, Aryl-H), 7.17 (d, 1H, Aryl), 7.65 (m, 1H, Aryl-H), 7.76 (m, 1H, Aryl-H), 7.84 (d, 2H, Aryl-H), 8.02 (m, 3H, Aryl-H), 8.09 (m, 2H, Aryl-H), 8.17 (m, 2H, Aryl-H), 8.23 (m, 2H, Aryl-H), 8.46 (d, 1H, Aryl-H), 8.54 (s, 1H, C$\underline{H}$=N), 9.06 (d, 1H, Aryl-H).

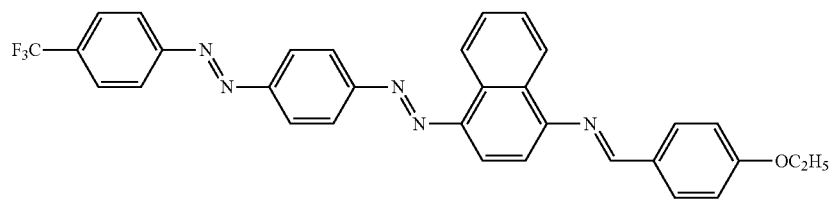

(4)

Example 5

1.23 g (2.14 mmol) of azo precursor II were dissolved in 25 ml of toluene, followed by adding 0.32 g (2.14 mmol) of piperonal and 1 g of activated molecular sieves (4 Å). The red mixture was refluxed under N$_2$ for 30 hours. After cooling to RT, the mixture was filtered and washed with 80 ml of toluene. The filtrate was evaporated, and the residue was purified by flash chromatography using heptane/ethylacetate (5:1) as eluent to obtain a red-orange solid of formula (5) after drying (95° C./125 mbar).

MALDI-TOF-MS (neg.): 551.3

$^1$H-NMR (400 MHz, CDCl$_3$): δ=6.10 (m, 2H, OCH$_2$), 6.97 and 7.18 (d, each 1H, Aryl-H), 7.40 (m, 1H, Aryl-H), 7.66 (m, 1H, Aryl-H), 7.76 and 7.84 (m, each 2H, Aryl-H), 8.0-8.25 (m, 7H, Aryl-H), 8.46 (m, 1H, Aryl-H), 8.49 (s, 1H, CH=N), 9.08 (d, 1H, Aryl-H).

followed by adding 0.68 g of terephthaldehyde (5 mmol). The mixture was refluxed for 48 hours, cooled to RT and filtered. The precipitate was washed with n-propanol and 5 ml THF and dried (50° C./200 mbar) to obtain an orange-red solid of formula (7). Yield 1.29 g (55%).

$^1$H-NMR (400 MHz, CDCl$_3$): δ=7.23 (d, 2H, Aryl-H), 7.69 (m, 2H, Aryl-H), 7.79 (m, 2H, Aryl-H), 7.85 (d, 4H, Aryl-H), 8.03 (d, 2H, Aryl-H), 8.09 (d, 8H, Aryl-H), 8.18 (d, 4H, Aryl-H), 8.24-8.28 (m, 8H, Aryl-H), 8.46 (d, 2H, Aryl-H), 8.72 (s, 2H, Aryl-H), 9.08 (d, 2H, Aryl-H), 10.17 (s, 2H, CH=N).

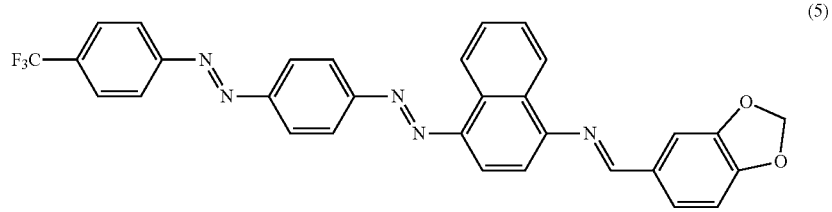 [SMILES: FC(F)(F)c1ccc(/N=N/c2ccc(/N=N/c3ccc(/N=C/c4ccc5c(c4)OCO5)c4ccccc34)cc2)cc1]

(5)

Example 6

1.50 g (5.7 mmol) of azo precursor I were dissolved in 50 ml of toluene, followed by adding 0.38 g (2.8 mmol) of terephthalaldehyde and 3 g of activated molecular sieves (4 Å). The resulting mixture was heated to 110° C. under N$_2$ for 30 hours. After cooling to RT, the red mixture was filtered, and the residue was washed with toluene and ethyl acetate. The residue containing the molecular sieves was stirred in dichloromethane, the mixture was filtered off and washed with dichloromethane, and the combined dichloromethane filtrates were evaporated to obtain a dark solid of formula (6) after drying (95° C./125 mbar).

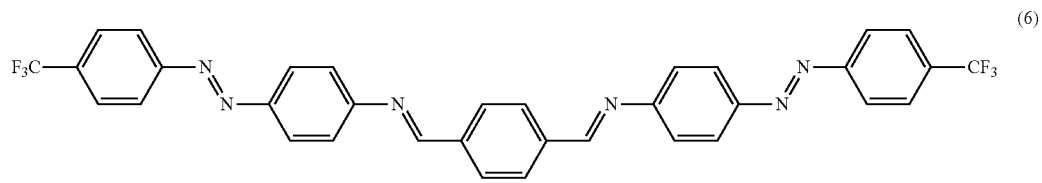

(6)

Example 7

2.21 g (5 mmol) of azo precursor II were suspended in a mixture of 15.6 ml of n-propanol and 1.1 ml of acetic acid,

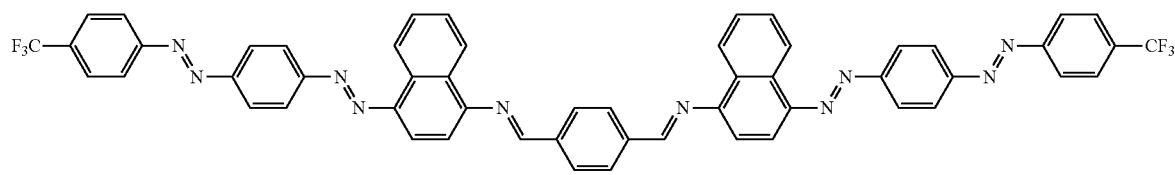

(7)

Example 8

17.66 g (42 mmol) of azo precursor II were suspended in a mixture of 124.9 ml of n-propanol and 8.9 ml of acetic acid, followed by adding 9.97 g of salicylaldehyde (80 mmol) and 56.16 g of activated molecular sieves (4 Å). The mixture was refluxed for 24 hours, further 4.98 g of salicylaldehyde (40 mmol) were added, followed by refluxing for further 24 hours. The mixture was cooled to RT, the solids were filtered off and washed with 10 ml of n-propanol. The residue was suspended in THF, the solids were filtered off and washed with THF. The filtrate was evaporated to obtain a dark red solid of formula (8) after drying (50° C./200 mbar). Yield 12.9 g (62%).

$^1$H-NMR (400 MHz, CDCl$_3$): δ=7.05 (t, Aryl-H, 1H), 7.16 (d, Aryl-H, 1H), 7.33 (d, Aryl-H, 1H), 7.47-7.55 (m, Aryl-H, 2H), 7.68-7.74 (m, Aryl-H, 1H), 7.77-7.82 (m, Aryl-H, 1H), 7.85 (d, Aryl-H, 1H), 8.04 (d, Aryl-H, 1H), 8.10 (d, Aryl-H, 1H), 8.19 (d, Aryl-H, 2H), 8.26 (d, Aryl-H, 2H), 8.39 (d, Aryl-H, 1H), 8.80 (s, N=C<u>H</u>, 1H), 9.10 (d, Aryl-H, 1H), 13.14 (broad, OH, 1H).

Example 10

0.25 g (0.6 mmol) of azo precursor II were dissolved in 15 ml of DMF, followed by adding 0.09 g (0.6 mmol) of 2-hydroxy-3-ethoxy-benzaldehyde and 1 g of activated molecular sieves (4 Å). The red mixture was stirred at 130° C. under N$_2$ for 4 hours. 0.09 g (0.6 mmol) of 2-hydroxy-3-ethoxy-benzaldehyde were added. Stirring at 130° C. was continued for 17 hours. After separating the molecular sieves by filtration, the solvent was removed by distillation to dryness. The product was purified by flash chromatography over silica gel using heptane/ethylacetate (4:1) as eluent to obtain a dark solid of formula (10) after drying (95° C./125 mbar). Yield 66 mg (20%).

MALDI-TOF-MS (pos.) 554.4

$^1$H-NMR (400 MHz, CDCl$_3$): δ=4.03 (s, 3H, OCH$_3$), 7.0 (m, 1H, Aryl-H), 7.12 (m, 1H, Aryl-H), 7.15 (m, 1H, Aryl-H), 7.38 (m, 1H, Aryl-H), 7.7-7.9 (m, 4H, Aryl-H), 8.0-8.3 (m, 7H, Aryl-H), 8.41 (m, 1H, Aryl-H), 8.82 (s, 1H, CH=N), 9.1 (m, 1H, Aryl-H), 13.67 (s, 1H, OH).

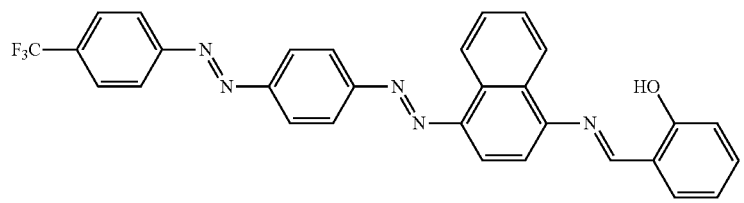

(8)

Example 9

0.50 g (1.19 mmol) of azo precursor II were dissolved in 20 ml of dimethyl formamide (DMF), followed by adding 0.14 g (1.02 mmol) of 4-methyl-2-hydroxy-benzaldehyde and 3 g of activated molecular sieves (4 Å). The red mixture was stirred at 140° C. under N$_2$ for 48 hours. After separating the molecular sieves by filtration, the solvent was removed by distillation to dryness.

The product was purified by flash chromatography over silica gel using heptane/ethylacetate (4:1) as eluent to obtain a red-brown powder of formula (9) after drying (95° C./125 mbar). Yield 0.58 g (91%). The NMR spectrum indicates a mixture of cis and trans imine.

MALDI-TOF-MS (pos.): 538.4

1H-NMR (400 MHz, CDCl$_3$): δ=2.45 (s, 3H, Ar—C<u>H</u>$_3$), 7.2-7.4 (m, 2H, Aryl-H), 7.68-7.82 (m, 2H, Aryl-H), 7.85 (d, 2H, Aryl-H), 8.0-8.4 (m, 8H, Aryl-H), 8.76 and 8.81 (2s, 1H, CH=N), 9.09 (m, 1H, Aryl-H).

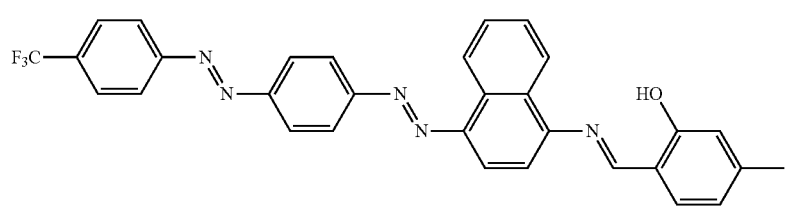

(9)

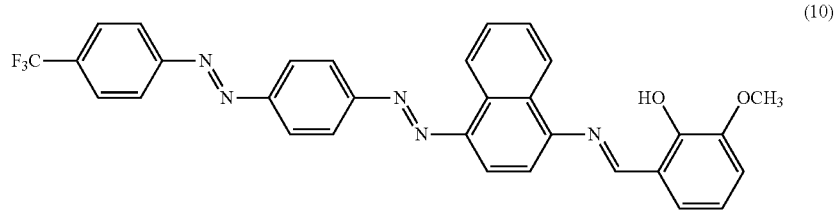 [SMILES: COc1cccc(/C=N/c2ccc(/N=N/c3ccc(/N=N/c4ccc(C(F)(F)F)cc4)cc3)c3ccccc23)c1O]

(10)

Example 11

4.98 g (10 mmol) of azo precursor II were suspended in a mixture of 35.3 ml of n-propanol and 2.5 ml of acetic acid, followed by adding 3.51 g of 2-hydroxy-1-naphthaldehyde (20 mmol) and 15.84 g of activated molecular sieves (4 Å). The mixture was refluxed for 17 hours and then cooled to RT, the solids were filtered off and washed with n-propanol. The residue was suspended in THF to dissolve the product, the solids were filtered off and washed with THF. The filtrate was evaporated yielding 0.66 g of black crystals of formula (11) after drying (50° C./200 mbar).

$^1$H-NMR (300 MHz, CDCl$_3$): δ=7.26 ppm (d, Aryl-H, 1H), 7.44 (t, Aryl-H, 1H), 7.51 (d, Aryl-H, 1H), 7.59-7.64 (m, Aryl-H, 1H), 7.73-7.86 (m, Aryl-H, 6H), 7.95 (d, Aryl-H, 1H), 8.09 (d, Aryl-H, 1H), 8.11 (d, Aryl-H, 2H), 8.19 (m, Aryl-H, 2H), 8.24 (m, Aryl-H, 3H), 8.46/8.49 (2s, C$\underline{H}$=N, 1H), 9.12 (m, Aryl-H, 1H), 9.63 (s, OH, 1H).

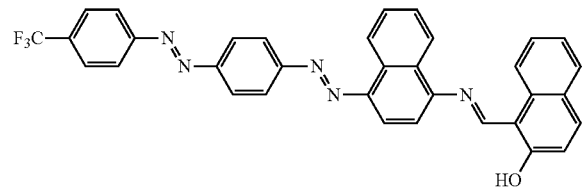

(11)

Example 12

0.65 g (17 mmol) of azo precursor III were suspended under stirring in 20 ml of anhydrous DMF, followed by adding 210 mg (17 mmol) of salicylaldehyde. The mixture was heated to 120° C. for 48 hours. Then 0.11 ml of methane-sulfonic acid were added. The mixture was filtrated, the filtrate was evaporated, and the crude product was purified by chromatography over silica gel using heptane/acetylacetate (gradient from ratio 9:1 to 1:1) to obtain a dark solid of formula (12) after drying. Yield 15 mg (19%).

MALDI-TOF-MS (neg.) 479.2 $^1$H-NMR (400 MHz, CDCl$_3$): δ=7.0-8.4 (m, 17H, Aryl-H), 8.81 (s, 1H, CH=N), 9.1 (m, 1H, Aryl-H), 13.13 (s, 1H, OH).

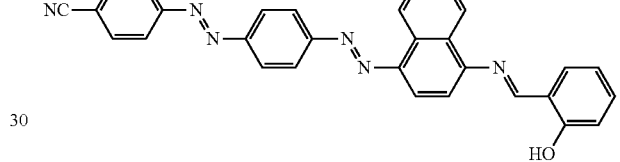

(12)

Example 13

4.19 g (10 mmol) of azo precursor II were suspended in a mixture of 31.2 ml of n-propanol and 2.2 ml of acetic acid, followed by adding 3.86 g of 4-(diethylamino)-salicylaldehyde (20 mmol) and 14.04 g of molecular sieves (3 Å). The mixture was refluxed for 24 hours and then cooled to RT. The solids were filtered off and washed with 10 ml of n-propanol, the residue was suspended in THF to dissolve the product, and the solids were removed by filtration. The filtrate was evaporated to obtain a dark solid of formula (13) after drying. Yield 4.57 g (77%).

$^1$H-NMR (400 MHz, CDCl$_3$): δ=1.28 (t, CH$_3$; 6H), 3.48 (q, CH$_2$, 4H), 6.33 (m, aryl-H, 2H), 7.31 (s, aryl-H, 1H), 7.67 (m, aryl-H, 1H), 7.76 (m, aryl-H, 1H), 7.85 (d, aryl-H, 2H), 8.05 (d, aryl-H, 2H), 8.10 (d, aryl-H, 2H), 8.18 (m, aryl-H, 2H), 8.24 (m, aryl-H, 2H), 8.45 (d, aryl-H, 1H), 8.61 (s, C$\underline{H}$=N, 1H), 9.09 (d, aryl-H, 1H), 13.74 (s, OH, 1H).

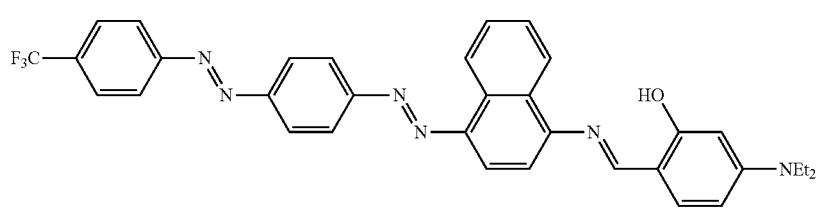

(13)

Example 14

2.21 g (5 mmol) of azo precursor II were suspended in a mixture of 15.6 ml of n-propanol and 1.1 ml of acetic acid, followed by adding 1.65 g of 5-nitro-2-thiophenecarboxaldehyde (10 mmol) and 7.02 g of activated molecular sieves (4 Å). The mixture was refluxed for 24 hours and then cooled to RT, the solids were filtered off and washed with n-propanol. The residue was suspended in THF to dissolve the product, the solids were filtered off and washed with THF. The filtrate was evaporated to obtain a solid product of formula (14) after drying (50° C./200 mbar). Yield 1.85 g (66%).

1H-NMR (400 MHz, CDCl$_3$): δ=7.29 (d, 1H, Aryl-H), 7.52 (d, Aryl-H, 1H), 7.69-7.82 (m, Aryl-H, 2H), 7.85 (d, Aryl-H, 2H), 7.98-8.01 (m, Aryl-H, 2H), 8.09 (d, Aryl-H, 2H), 8.17-8.26 (m, Aryl-H, 4H), 8.47 (d, Aryl-H, 1H), 8.74 (s, C$\underline{H}$=N, 1H), 9.06 (d, Aryl-H, 1H).

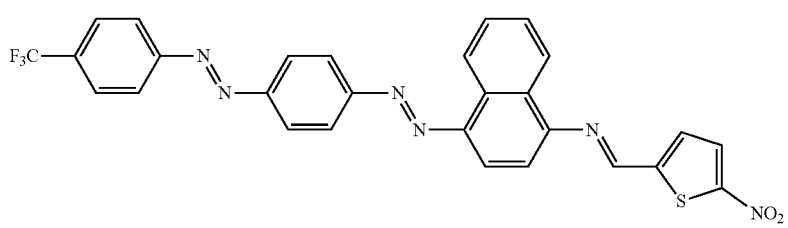

(14)

Example 15

2.21 g (5 mmol) of azo precursor II were suspended in a mixture of 15.6 ml of n-propanol and 1.1 ml of acetic acid, followed by adding 1.12 g of 2-thiophenecarboxaldehyde (10 mmol) and 7.02 g of activated molecular sieves (4 Å). The mixture was refluxed for 24 hours and then cooled to RT, the solids were filtered off and washed with n-propanol. The residue was suspended in THF to dissolve the product, the solids were filtered off and washed with THF. The filtrate was evaporated to obtain a red solid of formula (15) after drying (50° C./200 mbar).

Yield 1.92 g (75%). 1H-NMR (400 MHz, CDCl$_3$): δ=7.21 (d, Aryl-H, 1H), 7.23 (t, Aryl-H, 1H), 7.62-7.70 (m, Aryl-H, 3h), 7.74-7.79 (m, Aryl-H, 1H), 7.85 (d, Aryl-H, 2H), 8.01 (d, Aryl-H, 2H), 8.16-8.25 (m, Aryl-H, 4H), 8.48 (d, Aryl-H, 1H), 8.75 (s, C$\underline{H}$=N, 1H), 9.05 (d, Aryl-H, 1H).

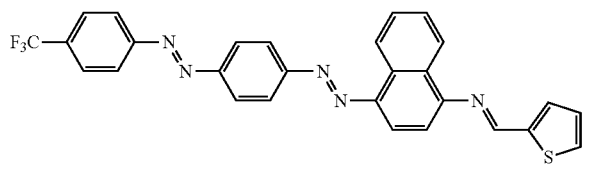

(15)

Example 16

3.99 g (10 mmol) of azo precursor IV were suspended in a mixture of 28.3 ml of n-propanol and 2.0 ml of acetic acid, followed by adding 2.17 g of salicylaldehyde (20 mmol) and 12.70 g of activated molecular sieves (4 Å). The mixture was refluxed for 17 hours and then cooled to RT, the solids were filtered off and washed with n-propanol. The residue was suspended in THF to dissolve the product, the solids were filtered off and washed with THF. The filtrate was evaporated to obtain a dark solid of formula (16) after drying (50° C./200 mbar). Yield 3.03 g (63%).

1H-NMR (400 MHz, CDCl$_3$): δ=7.04 (dt, Aryl-H, 1H), 7.15 (d, Aryl-H, 1H), 7.33 (d, Aryl-H, 1H), 7.47-7.54 (m, Aryl-H, 3H), 7.68-7.82 (m, Aryl-H, 2H), 8.03 (d, Aryl-H, 1H), 8.13 (d, Aryl-H, 1H), 8.24 (s, Aryl-H, 3H), 8.37 (d, Aryl-H, 1H), 8.80 (s, Aryl-H, 1H), 9.08 (d, Aryl-H, 1H), 13.12 (s, C$\underline{H}$=N, 1H).

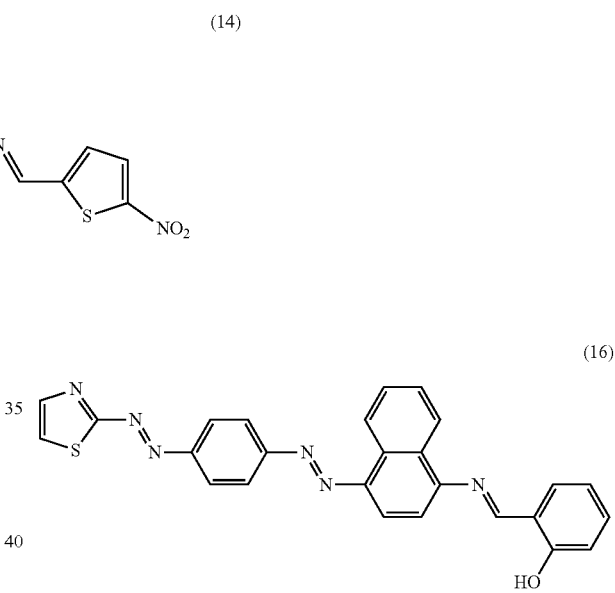

(16)

Example 17

3.99 g (10 mmol) of azo precursor IV were suspended in a mixture of 28.3 ml of n-propanol and 2.0 ml of acetic acid, followed by adding 3.94 g of 4-diethylamino-salicylaldehyde (20 mmol) and 12.70 g of activated molecular sieves (4 Å). The mixture was refluxed for 16 hours and then cooled to RT, the solids were filtered off and washed with n-propanol. The residue was suspended in THF to dissolve the product, the solids were filtered off and washed with THF. The filtrate was evaporated to obtain a dark solid of formula (17) after drying (50° C./200 mbar). Yield 3.46 g (65%).

1H-NMR (400 MHz, CDCl$_3$): δ=1.27 ppm (t, CH$_3$, 6H), 3.47 (q, CH$_2$, 4H), 6.29-6.36 (m, Aryl-H, 2H), 7.26-7.30 (m, Aryl-H, 2H), 7.49 (d, Aryl-H, 1H), 7.64-7.79 (m, Aryl-H, 2H), 8.04 (d, Aryl-H, 1H), 8.11 (d, Aryl-H, 1H), 8.23 (s, Aryl-H, 3H), 8.44 (dd, Aryl-H, 1H), 8.59 (s, Aryl-H, 1H), 9.07 (d, Aryl-H, 1H), 13.74 (s, CH=N, 1H).

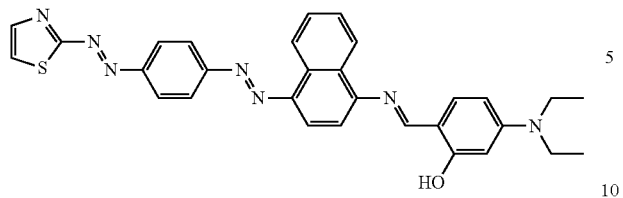

(17)

Example 18

0.42 g (10 mmol) azo precursor III were suspended under stirring in 20 ml toluene. To this suspension, 280 mg (10 mmol) of 8-hydroxy-1,1,7,7-tetramethyljulolidine-9-carboxaldehyde and 180 mg of p-toluenesulfonic acid were added. The reaction mixture was heated to 120° C. and stirred at that temperature for 48 hours. The reaction mixture was cooled to 20° C. The product was isolated by filtration. The filtrate was evaporated to dryness under vacuum. The residue was dissolved in 20 ml of dichloromethane, followed by dropwise adding 10 ml of heptane. The precipitate was filtered off, and a dark orange oil of formula (18) was obtained.

LC-MS: 674.3

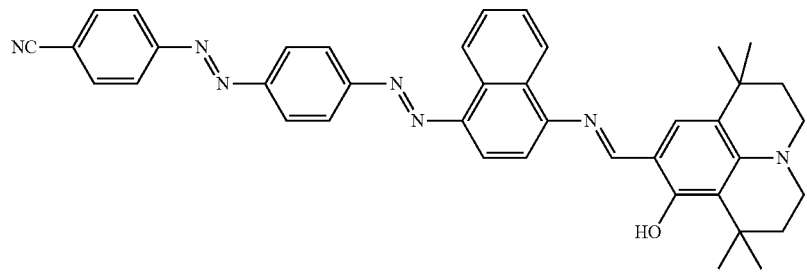

(18)

Example 19

1.63 g (2.82 mmol) of azo precursor II and 0.75 g (2.82 mmol) of azo precursor I were suspended in 30 ml of toluene, followed by adding 0.38 g (2.82 mmol) of terephthaldehyde, 0.05 g of p-toluene-sulfonic acid. The mixture was refluxed for 24 hours, then additional 0.20 g of azo precursor II were added, and refluxing was continued for further 40 hours. The mixture was filtered, and the filtrate was evaporated. The residue was dissolved in ethylacetate, filtered, and the filtrate was evaporated. The residue was dissolved in chloroform, filtered and the filtrate was again evaporated yielding 1.50 g (58%) of an orange solid of a mixture containing mainly the product of formula (19) after drying (50° C./200 mbar).

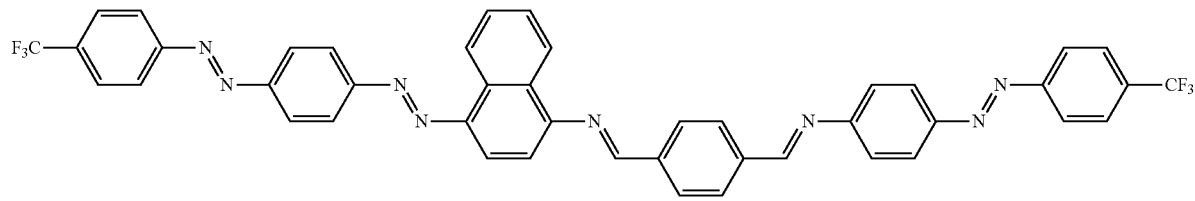

(19)

Example 20

4.26 g (10 mmol) of azo precursor V were suspended in a mixture of 30.1 of ml n-propanol and 2.2 ml of acetic acid, followed by adding 2.49 g of salicylaldehyde (20 mmol) and 13.54 g of activated molecular sieves (4 Å). The mixture was refluxed for 16 hours and then cooled to RT, the solids were filtered off and washed with n-propanol. The residue was suspended in THF to dissolve the product THF, the solids were filtered off and washed with THF. The filtrate was evaporated yielding 0.47 g (10%) of a dark solid of formula (20) after drying (50° C./200 mbar).

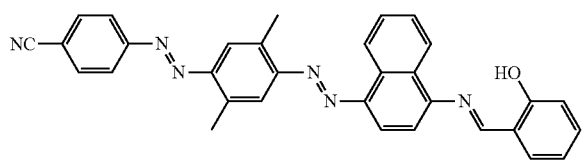

(20)

Example 21

4.98 g (10 mmol) of azo precursor II were suspended in a mixture of 35.3 ml of n-propanol and 2.5 ml of acetic acid, followed by adding 2.23 g of N-methyl-2-pyrrolecarboxaldehyde (20 mmol) and 15.84 g of activated molecular sieves (4 Å). The mixture was refluxed for 36 hours, further 1.1 g (10 mmol) of N-methyl-2-pyrrolecarboxaldehyde were added, and refluxing was continued for further 20 hours. After cooling to RT, the solids were filtered off and washed with n-propanol. The residue was suspended in THF to dissolve the product, the solids were filtered off and washed with THF. The filtrate was evaporated yielding 5.07 g of a dark solid of formula (21) after drying (50° C./200 mbar).

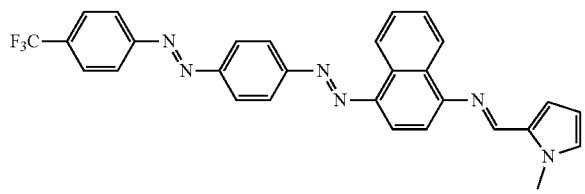

(21)

Example 22

3.94 g (10 mmol) of azo precursor VI were suspended in a mixture of 27.9 ml n-propanol and 2.0 ml acetic acid, followed by adding 3.94 g of 4-diethylamino-salicylaldehyde (20 mmol) and 12.53 g of activated molecular sieves (4 Å). The mixture was refluxed for 16 hours and then cooled to RT, the solids were filtered off and washed with n-propanol. The residue was suspended in THF to dissolve the product, the solids were filtered off and washed with THF. The filtrate was evaporated yielding 1.87 g (34%) of a dark solid of formula (22) after drying (50° C./200 mbar).

$^1$H-NMR (300 MHz, CDCl$_3$): δ=1.27 (t, CH$_3$, 6H), 2.88 (s, CH$_3$, 3H), 3.48 (q, CH$_2$, 4H), 6.28-6.39 (m, Aryl-H, 2H), 7.27 (d, Aryl-H, 1H), 7.46 (d, Aryl-H, 1H), 7.64-7.69 (m, Aryl-H, 1H), 7.73-7.79 (m, Aryl-H, 1H), 7.90-8.04 (m, Aryl-H, 4H), 8.07 (d, Aryl-H, 1H), 8.10 (d, Aryl-H, 1H), 8.43 (dd, Aryl-H, 1H), 8.58 (s, CH=N, 1H), 13.78 (br, OH, 1H).

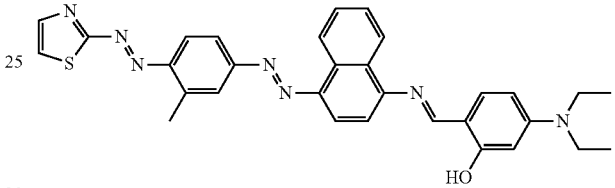

(22)

Example 23

1.00 g (2 mmol) of azo precursor VII were suspended in a mixture of 7.1 ml of n-propanol and 0.5 ml of acetic acid, followed by 0.5 g of salicylaldehyde (4 mmol) and 3.17 g of activated molecular sieves (4 Å). The mixture was refluxed for 16 hours and then cooled to RT, the solids were filtered off and washed with n-propanol. The residue was suspended in THF to dissolve the product, the solids were filtered off and washed with THF. The filtrate was evaporated yielding 0.48 g (50%) of a dark solid of formula (23) after drying (50° C./200 mbar).

$^1$H-NMR (300 MHz, CDCl$_3$): δ=1.46 (t, CH$_3$, 3H), 4.49 (q, CH$_2$, 2H), 7.05 (t, Aryl-H, 1H), 7.16 (d, Aryl-H, 1H), 7.36 (d, Aryl-H, 1H), 7.48-7.56 (m, Aryl-H, 2H), 7.69-7.85 (m, Aryl-H, 4H), 8.03 (d, (Aryl-H, 1H), 8.12-8.17 (m, Aryl-H, 4H), 8.29 (d, Aryl-H, 2H), 8.40 (d, Aryl-H, 1H), 8.82 (s, CH=N, 1H), 9.08-9.11 (m, Aryl-H, 1H), 9.18 (d, Aryl-H, 2H), 13.16 (s, OH, 1H).

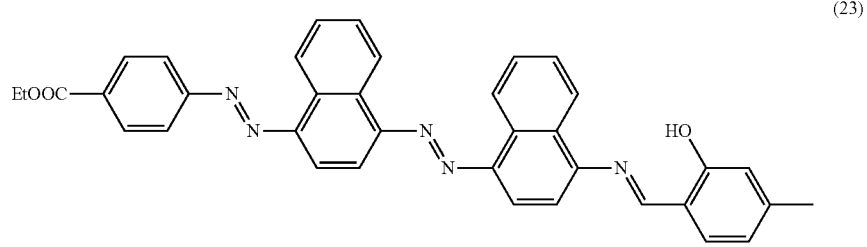 [SMILES: CCOC(=O)c1ccc(/N=N/c2ccc(/N=N/c3ccc(/N=C/c4ccc(C)cc4O)c4ccccc34)c3ccccc23)cc1]

(23)

Example 24

1.00 g (2 mmol) of azo precursor VII were suspended in a mixture of 7.1 ml of n-propanol and 0.5 ml of acetic acid, followed by adding 0.79 g of 4-diethylamino-salicylaldehyde (4 mmol) and 3.17 g of activated molecular sieves (4 Å). The mixture was refluxed for 16 hours and then cooled to RT, the solids were filtered off and washed with n-propanol. The residue was suspended in THF to dissolve the product, the solids were filtered off and washed with THF. The filtrate was evaporated yielding 0.87 g (67%) of a dark solid of formula (24) after drying (50° C./200 mbar).

$^1$H-NMR (300 MHz, CDCl$_3$): δ=1.30 (t, CH$_3$, 6H), 1.48 (t, CH$_3$, 3H), 3.49 (q, CH$_2$, 4H), 4.45 (q, CH$_2$, 2H), 6.31 (s, Aryl-H, 1H), 7.30 (t, Aryl-H, 1H), 7.65-7.70 (m, Aryl-H, 1H), 7.75-7.83 (m, Aryl-H, 3H), 8.02-8.17 (m, Aryl-H, 4H), 8.44 (d, Aryl-H, 1H), 8.59 (s, CH=N, 1H), 9.05-9.09 (m, Aryl-H, 1H), 9.14-9.20 (m, Aryl-H, 2H), 13.77 (br., OH, 1H).

Example 26

1.20 g (2 mmol) of azo precursor IV were suspended in a mixture of 8.5 ml of n-propanol and 0.6 ml of acetic acid, followed by adding 0.99 g of 5-nitro-2-thiophenecarboxaldehyde (6 mmol) and 3.81 g of activated molecular sieves (4 Å). The mixture was refluxed for 16 hours and then cooled to RT, the solids were filtered off and extracted with n-propanol by means of a Soxhlet extractor. The residue was suspended in THF to dissolve the product, the solids were filtered off and washed with THF. The filtrate was evaporated yielding 0.20 g (13%) of a dark solid of formula (26) after drying (50° C./200 mbar).

$^1$H-NMR (300 MHz, CDCl$_3$): δ=7.52 (m, Aryl-H, 2H), 7.69-7.83 (m, Aryl-H, 2H), 8.00 (s, Aryl-H, 1H), 8.01 (d, Aryl-H, 1H), 8.13 (d, Aryl-H, 1H), 8.25 (s, Aryl-H, 4H), 8.47 (d, Aryl-H, 1H), 8.74 (s, CH=N, 1H), 9.06 (d, Aryl-H, 1H).

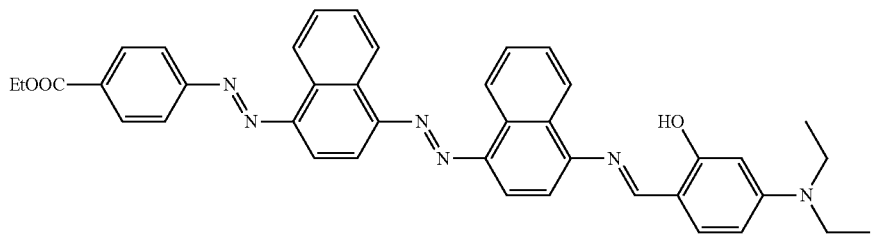

(24)

Example 25

4.41 g (10 mmol) of azo precursor II were suspended in a mixture of 31.2 ml of n-propanol and 2.2 ml of acetic acid, followed by adding 1.42 g of 2,5-thiophenedicarboxaldehyde (10 mmol). The mixture was refluxed for 16 hours, then additional 2.20 g (5 mmol) of azo precursor II were added and the mixture was refluxed for further 20 hours. After cooling to RT, the precipitate was filtered off, washed with n-propanol and the residue was dried (50° C./200 mbar) to obtain 6.27 g of red crystals containing a 25:75% mixture of compound of formula (25a) and (25b) (confirmed by $^1$H-NMR).

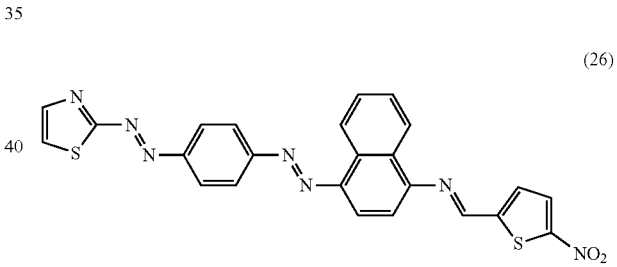

(26)

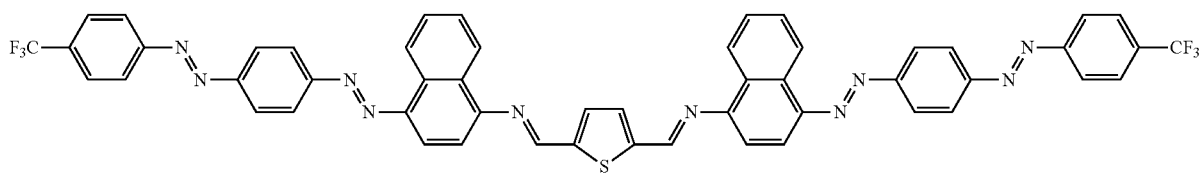

(25a)

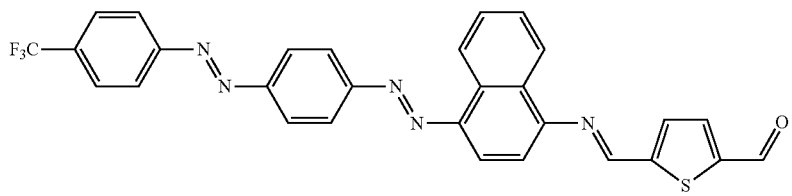

(25b)

Example 27

2.00 g (5 mmol) of azo precursor IV were suspended in a mixture of 14.1 ml of n-propanol and 1.0 ml acetic acid, followed by adding 1.34 g of 5-cyanobenzaldehyde (10 mmol) and 6.35 g of activated molecular sieves (4 Å). The mixture was refluxed for 16 hours and then cooled to RT. The solids were filtered off and washed with n-propanol. The residue was suspended in THF to dissolve the product, the solids were filtered off and washed with THF. The filtrate was evaporated yielding 0.70 g (=29%) of a dark solid of formula (27) after drying (50° C./200 mbar).

$^1$H-NMR (300 MHz, CDCl$_3$): δ=7.22 (d, Aryl-H, 1H), 7.52 (d, Aryl-H, 1H), 7.66-7.71 (m, Aryl-H, 1H), 7.76-7.82 (m, Aryl-H, 1H), 7.87 (d, Aryl-H, 2H), 8.03 (d, Aryl-H, 1H), 8.13 (d, Aryl-H, 1H), 8.20 (d, Aryl-H, 2H), 8.25 (s, Aryl-H, 3H), 8.43 (d, Aryl-H, 1H), 8.68 (s, C$\underline{H}$=N, 1H), 9.08 (d, Aryl-H, 1H).

(27)

Example 28

0.85 g (2.5 mmol) of azo precursor VIII were suspended in a mixture of 6.3 ml n-propanol and 0.5 ml acetic acid, followed by adding 0.62 g of 4-(diethylamino)-salicylaldehyde (3.2 mmol) and 2.85 g of activated molecular sieves (4Δ). The mixture was refluxed for 17 hours and then cooled to RT. The solids were filtered off and washed with n-propanol. The residue was suspended in THF to dissolve the product, the solids were filtered off and washed with THF. The filtrate was evaporated yielding 0.58 g (45%) of black crystals of formula (28) after drying (50° C./200 mbar).

$^1$H-NMR (300 MHz, CDCl$_3$): 1.25 (t, CH$_3$, 6H), 2.83 (s, CH$_3$, 3H), 3.44 (q, CH$_2$, 4H), 6.23 (s, Aryl-H, 1H), 6.30 (d, Aryl-H, 1H), 7.16-7.25 (m, Aryl-H, 2H), 7.41 (d, Aryl-H, 1H), 7.82-7.88 (m, Aryl-H, 3H), 7.99-8.08 (m, Aryl-H, 4H), 8.12 (m, Aryl-H, 2H), 8.52 (s, CH=N, 1H), 13.5 (br, OH, 1H).

(28)

Example 29

1.25 g (2.55 mmol) of azo precursor II were suspended in a mixture of 8.8 ml of n-propanol and 0.6 ml acetic acid, followed by adding 0.56 g of benzothiazole-2-carboxaldehyde (5 mmol) and 3.96 g of activated molecular sieves (4 Å). The mixture was refluxed for 24 hours and then cooled to RT, the solids were filtered off and washed with n-propanol. The residue was suspended in THF to dissolve the product, the solids were filtered off and washed with THF.

The filtrate was evaporated yielding 1.04 g (81%) of dark crystals of formula (29) after drying (50° C./200 mbar).

$^1$H-NMR (300 MHz, CDCl$_3$): δ=7.38 (d, Aryl-H, 1H), 7.54-7.64 (m, Aryl-H, 2H), 7.71-7.81 (m, Aryl-H, 2H), 7.85 (d, Aryl-H, 2H), 8.02-8.11 (m, Aryl-H, 4H), 8.17-8.27 (m, Aryl-H, 5H), 8.54 (d, Aryl-H, 1H), 9.00 (s, C$\underline{H}$=N, 1H), 9.08 (d, Aryl-H, 1H).

(29)

Example 30

0.75 g (1.5 mmol) of azo precursor II were suspended in a mixture of 5.3 ml n-propanol and 0.4 ml acetic acid, followed by adding 0.67 g of 9-formyl-8-hydroxyjulolidine (3 mmol) and 2.38 g of activated molecular sieves (4 Å). The mixture was refluxed for 16 hours and then cooled to RT, the solids were filtered off and washed with n-propanol. The residue was suspended in THF to dissolve the product, the solids were filtered off and washed with THF. The filtrate was evaporated yielding dark crystals of formula (30) after drying (50° C./200 mbar).

$^{1}$H-NMR (300 MHz, CDCl$_{3}$): δ=1.93-2.08 (m, CH$_{2}$, 4H), 2.68-2.78 (m, CH$_{2}$, 3H), 2.85 (t, CH$_{2}$, 1H), 3.27-3.34 (m, CH$_{2}$, 4H), 6.87 (d, Aryl-H, 1H), 7.26 (d, Aryl-H, 1H), 7.66 (m, Aryl-H, 1H), 7.75 (m, Aryl-H, 1H), 7.84 (d, Aryl-H, 2H), 8.02-8.10 (m, Aryl-H, 3H), 8.15-8.24 (m, Aryl-H, 4H), 8.47 (d, Aryl-H, 1H), 8.53 (s, C$\underline{H}$=N, 1H), 9.07 (d, Aryl-H, 1H), 9.40 (s, OH, 0.3H), 11.82 (s, OH, 0.25H), 13.39 (br., OH, 0.45H).

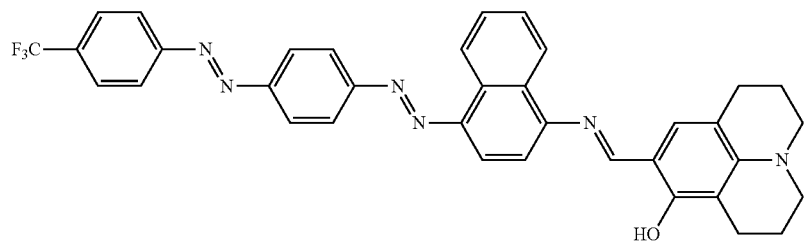

(30)

Example 31

2.21 g (5 mmol) of azo precursor II were suspended in a mixture of 17.6 ml n-propanol and 1.3 ml of acetic acid, followed by 2.09 g of 2-formyl-5-phenyl-phenol (10 mmol) and 7.93 g of activated molecular sieves (4 Å). The mixture was refluxed for 40 hours and then cooled to RT.

The solids were filtered off and washed with n-propanol. The residue was suspended in THF to dissolve the product, the solids were filtered off and washed with THF. The filtrate was evaporated yielding 2.24 g (75%) of a black solid of formula (31) after drying (50° C./200 mbar).

$^{1}$H-NMR (300 MHz, CDCl$_{3}$): δ=7.34-7.39 (m, Aryl-H, 2H), 7.45-7.61 (m, Aryl-H, 5H), 7.72 (m, Aryl-H, 3H), 7.78-7.86 (m, Aryl-H, 3H), 8.05 (d, Aryl-H, 1H), 8.10 (d, Aryl-H, 2H), 8.17-8.27 (m, Aryl-H, 4H), 8.41 (d, Aryl-H, 1H), 8.84 (s, C$\underline{H}$=N, 1H), 9.10 (d, Aryl-H, 1H), 13.25 (br., OH, 1H).

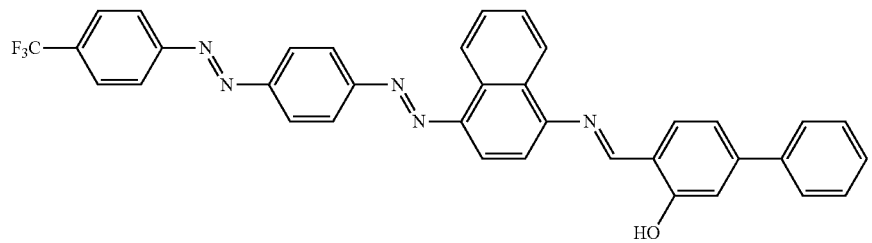

(31)

Example 32

1.23 g (2.14 mmol) of azo precursor II were suspended in 25 ml of toluene, followed by adding 0.44 g (2.14 mmol) of 4-(hexyloxy)-benzaldehyde and 1.0 g of activated molecular sieves (3 Å). The mixture was refluxed for 24 hours. The mixture was filtered, and the filtrate was evaporated. The residue was dissolved in dichloromethane, filtered and the filtrate was evaporated yielding an orange solid of formula (32) after drying.

LC-MS (pos.) 584.1

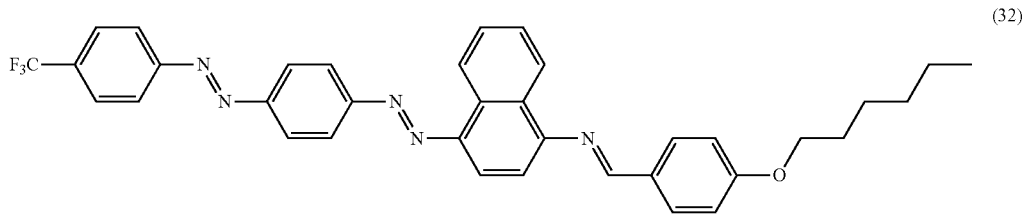 [SMILES: CCCCCCOc1ccc(/C=N/c2ccc(/N=N/c3ccc(/N=N/c4ccc(C(F)(F)F)cc4)cc3)c3ccccc23)cc1]

(32)

Example 33

1.23 g (2.14 mmol) of azo precursor II were suspended in 25 ml of toluene, followed by adding 0.32 g (2.14 mmol) of 4-dimethylamino-benzaldehyde and 3.0 g of activated molecular sieves (3 Å). The mixture was refluxed for 30 hours. The mixture was filtered, and the filtrate was evaporated. The residue was mixed in 30 ml of methanol and stirred for 30 min at 58° C. The dispersion was filtered hot and washed with methanol. The residue was dissolved in dichloromethane, filtered and the filtrate was evaporated yielding an orange solid of formula (33) after drying.

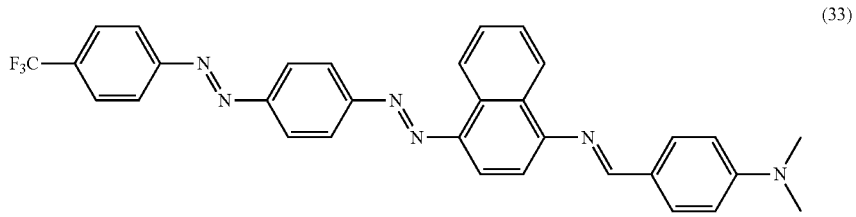 [SMILES: CN(C)c1ccc(/C=N/c2ccc(/N=N/c3ccc(/N=N/c4ccc(C(F)(F)F)cc4)cc3)c3ccccc23)cc1]

(33)

Example 34

0.42 g (1.0 mmol) of azo precursor II were suspended in 20 ml of toluene, followed by adding 0.21 g (1.0 mmol) of 4-dimethylamino-1-naphthaldehyde, 0.18 g of p-toluene-sulfonic acid and 3.0 g of activated molecular sieves (4 Å). The mixture was refluxed for 72 hours. The mixture was filtered, and the filtrate was evaporated. The residue was mixed with a mixture of 20 ml of heptane-ethylacetate (8:2) and stirred for 30 min. The dispersion was filtered, the filtrate was evaporated yielding a dark solid of formula (34) after drying.

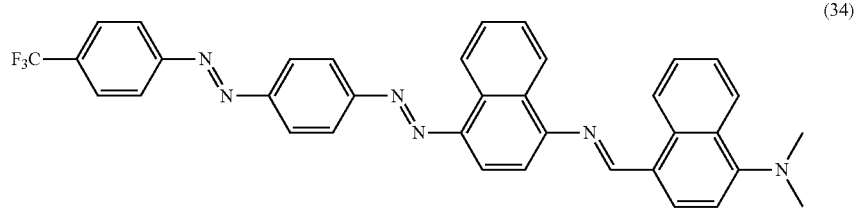 [SMILES: CN(C)c1ccc(/C=N/c2ccc(/N=N/c3ccc(/N=N/c4ccc(C(F)(F)F)cc4)cc3)c3ccccc23)c2ccccc12]

(34)

Example 35

0.63 g (1.5 mmol) of azo precursor II were suspended in 30 ml of toluene, followed by adding 0.21 g (1.5 mmol) of 2-methoxy-benzaldehyde and 3.0 g of activated molecular sieves (4 Å). The mixture was refluxed for 72 hours and filtered. The filtrate was evaporated. The residue was mixed in 30 ml of methanol and stirred for 1 hour at RT. The dispersion was filtered and washed with methanol yielding a dark solid of formula (35) after drying (50° C./200 mbar).

$^1$H-NMR (300 MHz, CDCl$_3$): δ=3.97 ppm (s, CH$_3$, 3H), 7.05 (d, Aryl-H, 1H), 7.14-7.20 (m, Aryl-H, 2H), 7.55 (t, Aryl-H, 1H), 7.65 (t, Aryl-H, 1H), 7.75 (t, Aryl-H, 1H), 7.84 (d, Aryl-H, 2H), 8.03 (d, Aryl-H, 1H), 8.09 (d, Aryl-H, 2H), 8.18 (d, Aryl-H, 2H), 8.24, Aryl-H, 2H), 8.40 (dd, Aryl-H, 1H), 8.46 (d, Aryl-H, 1H), 9.07 (d, Aryl-H, 1H), 9.09 (s, C$\underline{H}$=N, 1H).

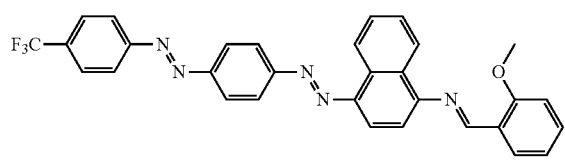

(35)

Application in LC Material

Dichroic ratio: Dichroic ratios of the dyes were measured in MLC-2132 (Merck KGaA) as nematic liquid crystalline mixture in LC cells made of glass plates with anti-parallel rubbed orientation layers (polyimide) and transparent, electrically conductive layers (ITO) attached with a distance of 5 μm (Linkam Scientific Instruments, UK).

The percentage of dye as indicated was mixed in around 100 mg of MLC-2132 and 2 ml of dichloromethane. The mixture was treated with ultrasound for 10 min to ensure full dissolution.

After evaporation of the solvent, the residual mixture was heated to 130° C. on a heating plate (Präzitherm, 20-250° C., Harry Gestigkeit GmbH, Düsseldorf, Germany), which is above the clearing point of the liquid crystalline material. The LC cells were heated to 230° C. on a heating plate (Präzitherm, 20-250° C., Harry Gestigkeit GmbH, Düsseldorf, Germany) to ensure full crosslinking of the adhesives used. After cooling to 130° C. the LC cell was filled with the heated LC-dye mixture as mentioned above and cooled subsequently to RT.

The filled LC cells were measured using an Agilent 8453 UV-Vis-spectrophotometer, which is attached with a polarizer. Two measurements were made, one with the polarizer in parallel to the polarization of the LC cell, one with the polarizer oriented perpendicularly to the polarization of the LC cell. The dichroic ratio is calculated by the ratio of parallel (A$_\parallel$) and perpendicular (A$_\perp$) absorbance at the maximum absorbance in the perpendicular state: DR=A$_\parallel$/A$_\perp$. The dichroic ratios are listed in Table 1.

Light fastness: For lightfastness measurement the filled LC cells made as mentioned above were irradiated using an Atlas suntester (Atlas Material Testing Technology GmbH, Germany), with a power of 450 W/m$^2$ attached with a UV cutoff filter repeatedly for 40 hours. The fading of the extinction of the dyes was measured after each 40 hours-cycle. Fading duration of the dyes were extra- or interpolated to a residual 50% extinction, which indicates the duration of irradiation after which the dye-LC-mixture exhibits a residual 50% extinction. The fading durations are listed in Table 1. Acceptable fading times are usually 160 hours or longer.

TABLE 1

| Ex. | Conc. wt % | Absorption max | Maximum absorbance | Dichroic ratio | Lightfastness |
|---|---|---|---|---|---|
| 1 | 2 | 517 | 1.02 | 13.6 | 190 |
| 2 | 2.1 | 463 | 1.34 | 14.9 | 400 |
| 3 | 1.9 | 460 | 0.74 | 16.8 | 210 |
| 4 | 3 | 474 | 1.93 | 12.8 | 530 |
| 5 | 3 | 469 | 1.31 | 15.1 | 560 |
| 7 | 0.2 | 476 | 0.12 | 12.0 | |
| 8 | 2 | 455 | 1.52 | 13.4 | 1290 |
| 9 | 3 | 462 | 1.37 | 13.5 | 600 |
| 10 | 3 | 456 | 1.54 | 14.4 | 480 |
| 11 | 2 | 482 | 0.96 | 12.0 | 860 |
| 13 | 2.1 | 524 | 1.55 | 15.5 | 370 |
| 14 | 2 | 485 | 1.01 | 11.2 | 500 |
| 15 | 2 | 464 | 1.08 | 9.8 | |
| 16 | 1.8 | 470 | 1.36 | 10.4 | |
| 17 | 1.9 | 551 | 1.71 | 12.1 | |
| 19 | 3 | 456 | 1.02 | 15.9 | 390 |
| 23 | 2 | 503 | 1.21 | 9.9 | |
| 25 | 2 | 488 | 1.55 | 15.5 | |
| 27 | 1.9 | 480 | 1.32 | 11.0 | |
| 28 | 2 | 482 | 0.91 | 11.4 | |
| 29 | 2 | 466 | 0.79 | 8.0 | |
| 30 | 2.2 | 553 | 0.59 | 11.8 | |
| 31 | 2.1 | 462 | 0.65 | 10.8 | 670 |
| 32 | 3 | 466 | 0.88 | 14.3 | |
| 33 | 3 | 504 | 1.44 | 10.1 | |
| 34 | 3 | 497 | 0.63 | 8.9 | |
| 35 | 3 | 475 | 0.88 | 8.1 | |

Example 36 to 38

Black mixtures of dichroic dyes in liquid crystalline material MLC-2132 were made as described herein-before for the single compounds with the exception that various amounts of single compounds were used according to the following list. The amounts are mentioned as wt %.

Blue disazo dye=Example 6c, as described in WO 11/157614 A1

Red bisazo dye=Example 10b, as described in WO 11/157614 A1

Yellow bisazo dye=Example 31, as described in WO 11/157614 A1

| Dichroic dye | Comparative Ex. 1 | Ex. 36 | Ex. 37 | Ex. 38 |
|---|---|---|---|---|
| Blue trisazo dye | 1.7 | 1.4 | 1.6 | 1.6 |
| Red bisazo dye | 0.2 | — | 0.2 | — |
| Yellow bisazo dye | 1.0 | — | — | 1.0 |
| Example 3 | — | 1.2 | 1.2 | — |
| Example 1 | — | 0.3 | — | 0.4 |

Figure 2:
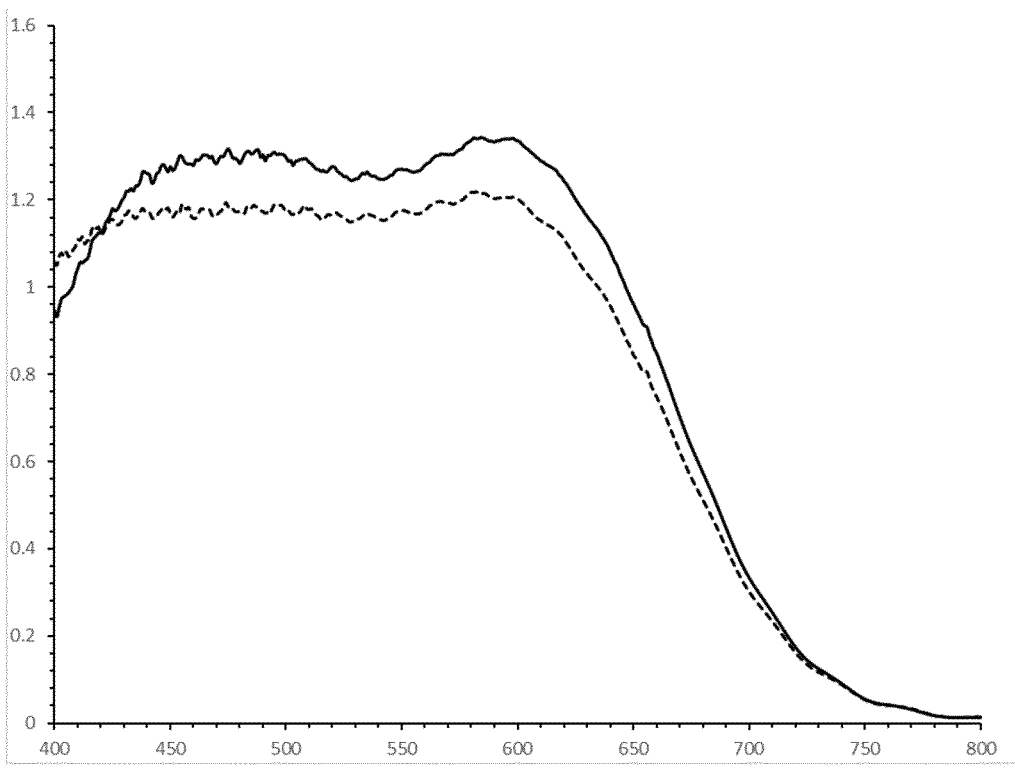
FIG. 2 is a graph showing the absorption spectra in visual range of Example 37 in a LC cell and after 240 hours of irradiation (continuous line: initial absorption spectrum; dashed line: after 240 hours).
Figure 3:
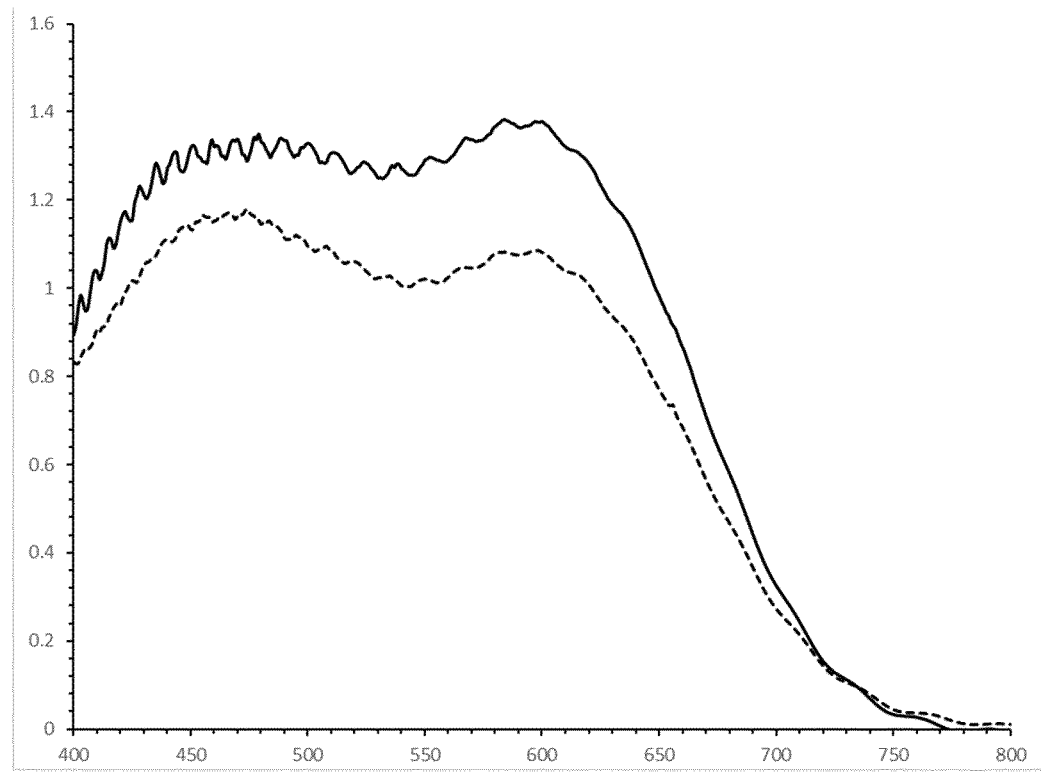
FIG. 3 is a graph showing the absorption spectra in visual range of Example 38 in a LC cell and after 240 hours of irradiation (continuous line: initial absorption spectrum; dashed line: after 240 hours).
Figure 4:
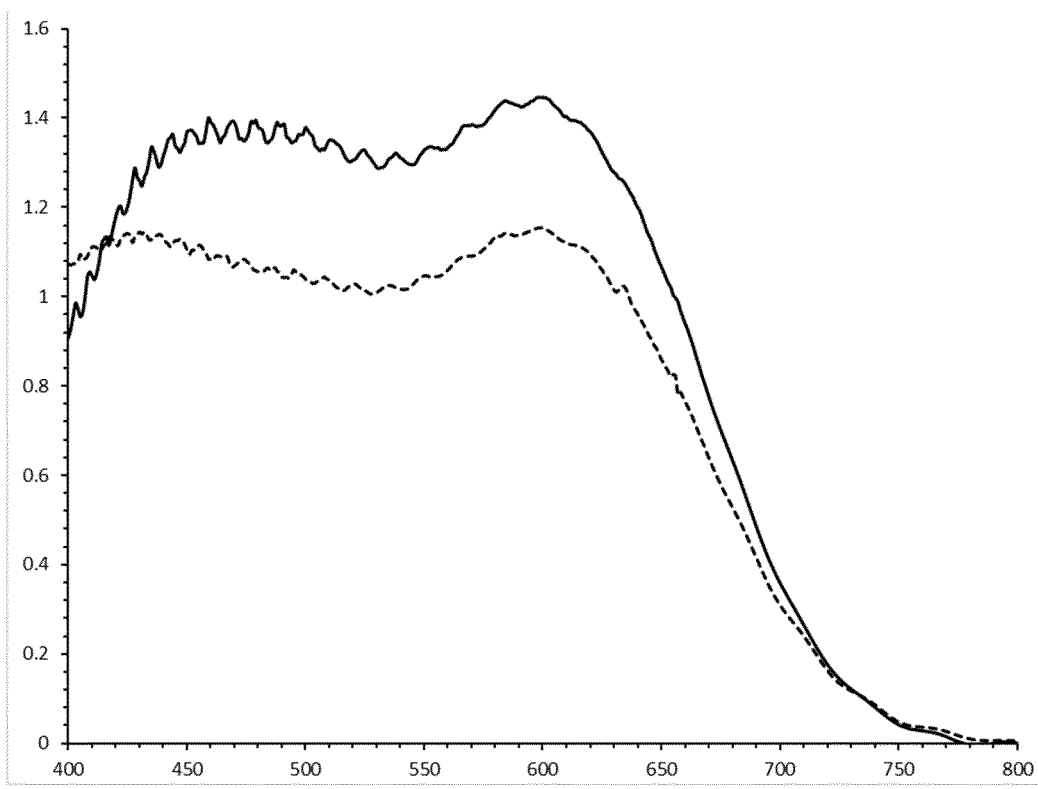
FIG. 4 is a graph showing the absorption spectra in visual range of Comparative Example 1 in a LC cell and after 240 hours of irradiation (continuous line: initial absorption spectrum; dashed line: after 240 hours).

FIG. 1 to 3 demonstrate that the light fastness can be improved when using a black dichroic mixture containing at least one azomethine dye of the invention, compared to a dichroic dye mixture of the prior art (see FIG. 4).

The invention claimed is:

1. A compound of formula (A)

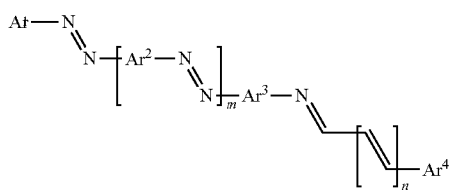

wherein

Ar$^1$ is a residue selected from the group consisting of

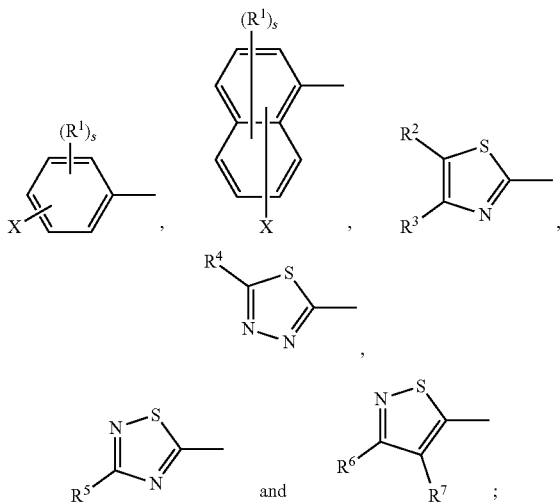

Ar$^2$ and Ar$^3$ are independently of one another and at each occurrence selected from

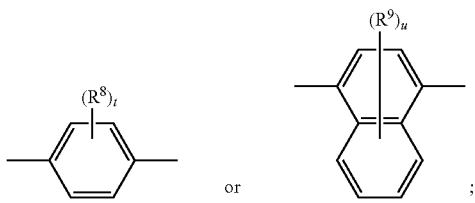

Ar$^4$ is a residue of

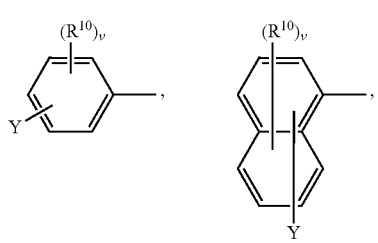

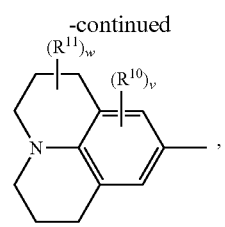

C$_2$-C$_{10}$-heteroaryl, C$_2$-C$_{10}$-heteroaryl substituted with C$_1$-C$_{12}$-alkyl, C$_1$-C$_{12}$-alkoxy, C$^1$-C$^{12}$-alkylthio, OH, halogen, C$_1$-C$_4$-haloalkyl, NR$^{12}$R$^{13}$, CO$_2$R$^{14}$, COR$^{15}$, SO$_2$R$^{16}$, NO$_2$ or CN;

X is C$_1$-C$_6$-haloalkyl, CN, COOR$^{17}$,

Y is H, C$_1$-C$_{12}$-alkyl; C$_1$-C$_{12}$-alkyl substituted with OH or NH$_2$ and/or interrupted with NR$^{23}$, O or S; C$_1$-C$_{12}$-haloalkyl, C$_7$-C$_{12}$-aralkyl; NR$^{24}$R$^{25}$, halogen, CN, OH, C$_1$-C$_{12}$-alkoxy; C$_2$-C$_{12}$-alkoxy interrupted with O; C$_1$-C$_{12}$-alkylthio; COOR$^{26}$, C$_6$-C$_{12}$-aryl; C$_6$-C$_{12}$-aryl substituted with C$_1$-C$_{12}$-alkyl, C$_1$-C$_{12}$-alkoxy, C$_1$-C$_{12}$-alkylthio, CN, halogen, OH or NR$^{27}$R$^{28}$; C$_2$-C$_{10}$-heteroaryl, C$_2$-C$_{10}$-heteroaryl substituted with C$_1$-C$_{12}$-alkyl, C$_1$-C$_{12}$-alkoxy, C$_1$-C$_{12}$-alkylthio, OH, halogen, CN or NR$^{29}$R$^{30}$; C$_3$-C$_{18}$-cycloalkyl, or C$_3$-C$_{18}$-cycloalkyl substituted with C$_1$-C$_{12}$-haloalkyl, halogen, CN, OH, C$_1$-C$_{12}$-alkoxy, C$_1$-C$_{12}$-alkylthio or NR$^{31}$R$^{32}$ and/or interrupted by one or more O;

or Y and one adjacent H form together a group

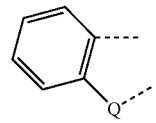

or a 5 to 7-membered heterocyclic ring containing one or two Q,

Q is NR$^{33}$, O or S;

said group

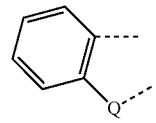

or heterocyclic ring is unsubstituted or substituted with C$_1$-C$_4$alkyl;

R$^1$ is C$_1$-C$_{12}$-alkyl, C$_1$-C$_{12}$-haloalkyl, halogen, CN, C$_1$-C$_{12}$-alkoxy or C$_2$-C$_{12}$-alkoxy interrupted with O;

R$^2$, R$^3$, R$^4$, R$^5$, R$^6$, and R$^7$ are independently of one another and at each occurrence selected from H, halogen, OCF$_3$, NO$_2$, CN, formyl, COOR$^{34}$, COR$^{35}$, SO$_2$R$^{36}$, CONR$^{37}$R$^{38}$, C$_1$-C$_{12}$-alkyl; C$_1$-C$_{12}$-alkyl substituted with halogen or CN; C$_1$-C$_{12}$-alkoxy; C$_2$-C$_{12}$-alkoxy interrupted with O; C$_3$-C$_{12}$-cycloalkyl; C$_3$-C$_{12}$-cycloalkyl substituted with halogen or CN and/or interrupted by one or more O; phenyl; or phenyl substituted with halogen, CN, C$_1$-C$_8$-alkyl or C$_1$-C$_8$-haloalkyl;

or R$^2$ and R$^3$, or R$^6$ and R$^7$ together are C$_3$-C$_4$-alkylene or form a benzoanellated ring, said alkylene or benzoanellated ring is unsubstituted or substituted with C$_1$-C$_4$-alkyl, CN, C$_1$-C$_4$-alkoxy, NO$_2$, halogen, or SO$_2$R$^{39}$;

$R^8$ and $R^9$ are independently of one another and at each occurrence selected from $C_1$-$C_4$-alkyl, $C_1$-$C_4$-haloalkyl, halogen, CN or $C_1$-$C_4$-alkoxy;

$R^{10}$ is at each occurrence selected from $C_1$-$C_{12}$-alkyl, $C_1$-$C_4$-haloalkyl, $C_1$-$C_{12}$-alkoxy, OH, halogen or CN;

$R^{11}$ is at each occurrence $C_1$-$C_4$-alkyl;

$R^{14}$, $R^{15}$, $R^{16}$, $R^{17}$, $R^{26}$, $R^{34}$, $R^{35}$, $R^{36}$, $R^{39}$ and $R^{40}$ are independently of one another $C_1$-$C_{12}$-alkyl; $C_1$-$C_{12}$-alkyl substituted with CN or OH; $C_1$-$C_{12}$-haloalkyl; $C_3$-$C_{18}$-cycloalkyl, $C_3$-$C_{12}$-cycloalkyl substituted with $C_1$-$C_{12}$-haloalkyl, CN, OH or halogen and/or interrupted by one or more O; $C_6$-$C_{12}$-aryl, $C_6$-$C_{12}$-aryl substituted with halogen, CN, OH, $C_1$-$C_{12}$-alkyl or $C_1$-$C_{12}$-haloalkyl; phenylene-$C_3$-$C_{18}$-cycloalkyl; phenylene-$C_3$-$C_{18}$-cycloalkyl substituted with halogen, CN or OH; $C_3$-$C_{12}$-cycloalkylene-phenyl; or $C_3$-$C_{12}$-cycloalkylene-phenyl substituted with $C_1$-$C_{12}$-alkyl, $C_1$-$C_{12}$-haloalkyl, halogen, CN or OH;

$R^{12}$, $R^{13}$, $R^{24}$, $R^{25}$, $R^{27}$, $R^{28}$, $R^{29}$, $R^{30}$, $R^{31}$, $R^{32}$, $R^{37}$ or $R^{38}$ are independently of one another H, $C_1$-$C_{12}$-alkyl; $C_3$-$C_{14}$-cycloalkyl; $C_6$-$C_{12}$-aryl; $C_6$-$C_{12}$-aryl substituted with halogen, CN, OH, $C_1$-$C_{12}$-alkyl or $C_1$-$C_{12}$-haloalkyl; phenylene-$C_3$-$C_{18}$-cycloalkyl; phenylene-$C_3$-$C_{18}$-cycloalkyl substituted with halogen, CN or OH; $C_3$-$C_{12}$-cycloalkylene-phenyl; or $C_3$-$C_{12}$-cycloalkylene-phenyl substituted with $C_1$-$C_{12}$-alkyl, $C_1$-$C_{12}$-haloalkyl, halogen, CN or OH;

or $R^{12}$ and $R^{13}$, $R^{24}$ and $R^{25}$, $R^{27}$ and $R^{28}$, $R^{29}$ and $R^{30}$, $R^{31}$ and $R^{32}$, or $R^{37}$ and $R^{38}$ together are $C_2$-$C_{12}$-alkylene or $C_2$-$C_{12}$-alkylene interrupted by O, S and/or $NR^{41}$;

$R^{23}$, $R^{33}$ and $R^{41}$ are independently of one another H, $C_1$-$C_{12}$-alkyl, $C_3$-$C_{12}$-cycloalkyl, phenyl or phenyl substituted with $C_1$-$C_6$-alkyl, or CN;

m and n are independently of one another 0 or 1, with the proviso that the sum m+n≥1;

s, t, u and v, are independently of one another 0, 1 or 2; and w is 0, 1, 2, 3 or 4.

2. The compound according to claim 1, having one of the following formulae

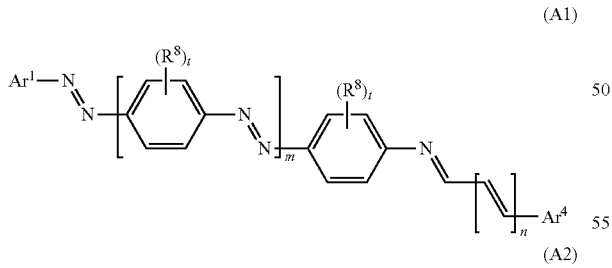

(A1)

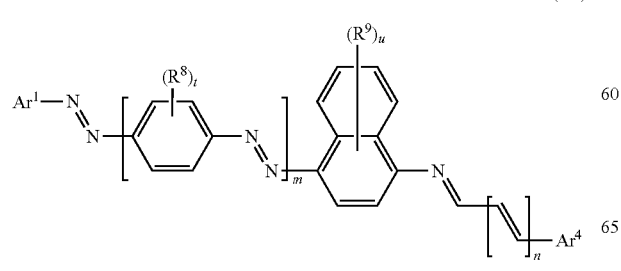

(A2)

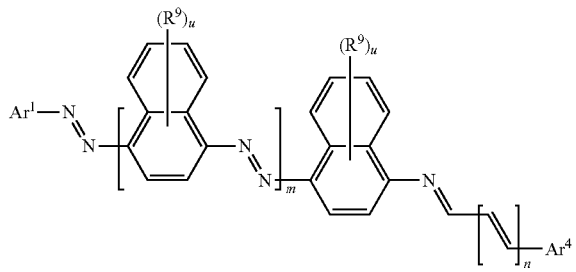

(A3)

wherein
$Ar^1$ is a residue selected from the group consisting of

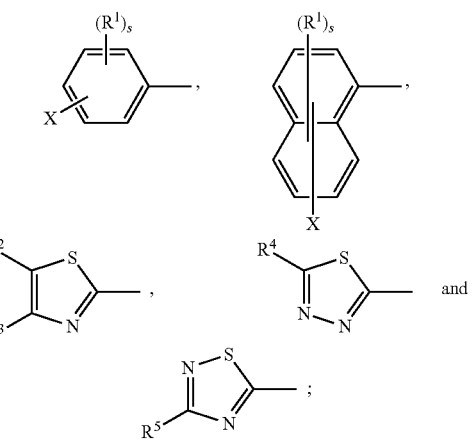

Ar4 is a residue of

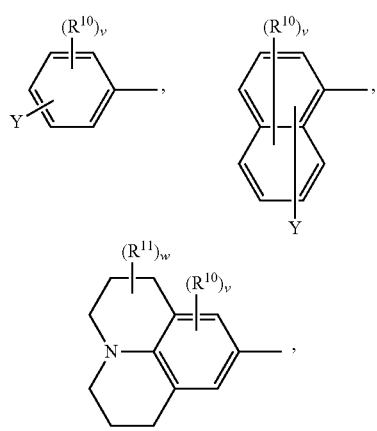

$C_2$-$C_{10}$-heteroaryl, $C_2$-$C_{10}$-heteroaryl substituted with $C_1$-$C_{12}$-alkyl, $C_1$-$C_{12}$-alkoxy, $C_1$-$C_{12}$-alkylthio, OH, halogen, $CF_3$, $NR^{12}R^{13}$, $CO_2R^{14}$, $COR^{15}$, $SO_2R^{16}$, $NO_2$ or CN;

X is $CF_3$, CN, or $COOR^{17}$

Y is H, $C_1$-$C_{12}$-alkyl; $C_1$-$C_{12}$-alkyl substituted with OH or $NH_2$ and/or interrupted with $NR^{23}$ or O; $CF_3$, $C_7$-$C_{12}$-aralkyl, $NR^{24}R^{25}$, F, CN, OH, $C_1$-$C_{12}$-alkoxy; $C_1$-$C_{12}$-alkylthio, $COOR^{26}$, $C_6$-$C_{12}$-aryl; $C_6$-$C_{12}$-aryl substituted with $C_1$-$C_{12}$-alkyl, $C_1$-$C_{12}$-alkoxy, $C_1$-$C_{12}$-alkylthio, CN, F, OH or $NR^{27}R^{28}$, $C_2$-$C_{10}$-heteroaryl, $C_2$-$C_{10}$-heteroaryl substituted with $C_1$-$C_{12}$-alkyl, $C_1$-$C_{12}$-alkoxy, $C_1$-$C_{12}$-alkylthio, OH, F, CN or $NR^{29}R^{30}$; $C_5$-$C_{18}$-cycloalkyl, or $C_5$-$C_{18}$-cycloalkyl substituted with $CF_3$, F, CN, OH, $C_1$-$C_{12}$-alkoxy, $C_1$-$C_{12}$-alkylthio or $NR^{31}R^{32}$ and/or interrupted by one or more O;

or Y and one adjacent H form together a group

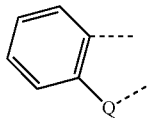

or a 5 to 7-membered heterocyclic ring containing one or two Q,

Q is $NR^{33}$, O or S;

said group

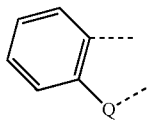

or heterocyclic ring is unsubstituted or substituted with $CH_3$;

$R^1$ is $C_1$-$C_4$-alkyl, $CF_3$, F, CN or $C_1$-$C_4$-alkoxy;

$R^2$, $R^3$, $R^4$, and $R^5$ are independently of one another and at each occurrence selected from H, F, $NO_2$, CN, $COOR^{34}$, $C_1$-$C_{12}$-alkyl; $C_1$-$C_{12}$-alkyl substituted with F or CN; $C_1$-$C_{12}$-alkoxy; $C_3$-$C_{12}$-cycloalkyl; $C_3$-$C_{12}$-cycloalkyl substituted with F or CN; phenyl; or phenyl substituted with F, CN, $C_1$-$C_8$-alkyl or $CF_3$;

or $R_2$ and $R_3$ together are butylene or form a benzoanellated ring, said n-butylene or benzoanellated ring is unsubstituted or substituted with $CH_3$, $C_2H_5$, CN, $OCH_3$, $OC_2H_5$, $NO_2$, F or $SO_2R^{39}$;

$R^8$ and $R^9$ are independently of one another and at each occurrence $CH_3$, $CF_3$, F, CN or $OCH_3$;

$R^{10}$ is at each occurrence selected from $C_1$-$C_8$-alkyl, $CF_3$, F, $C_1$-$C_8$-alkoxy, OH or CN;

$R^{11}$ is at each occurrence $CH_3$ or $C_2H_5$;

$R^{14}$, $R^{15}$, $R^{16}$, $R^{17}$, $R^{26}$, $R^{34}$, $R^{39}$ and $R^{40}$ are independently of one another $C_1$-$C_8$-alkyl; $C_1$-$C_8$-alkyl substituted with CN; $C_5$-$C_{14}$-cycloalkyl, $C_5$-$C_{14}$-cycloalkyl substituted with CN or F; phenyl, phenyl substituted with F, CN, $C_1$-$C_8$-alkyl or $CF_3$, phenylene-$C_5$-$C_{14}$-cycloalkyl; phenylene-$C_5$-$C_{14}$-cycloalkyl substituted with F or CN; $C_5$-$C_{12}$-cycloalkylene-phenyl; or $C_5$-$C_{12}$-cycloalkylene-phenyl substituted with $C_1$-$C_8$-alkyl, $CF_3$, F or CN;

$R^{12}$, $R^{13}$, $R^{24}$, $R^{25}$, $R^{27}$, $R^{28}$, $R^{29}$, $R^{31}$ and $R^{32}$ are independently of another H, $C_1$-$C_8$-alkyl; $C_5$-$C_{14}$-cycloalkyl; phenyl, phenyl substituted with $C_1$-$C_8$-alkyl; phenylene-$C_5$-$C_{14}$-cycloalkyl; $C_5$-$C_{12}$-cycloalkylene-phenyl; or $C_5$-$C_{12}$-cycloalkylene-phenyl substituted with $C_1$-$C_8$-alkyl;

or $R^{12}$ and $R^{13}$, $R^{24}$ and $R^{25}$, $R^{27}$ and $R^{28}$, $R^{29}$ and $R^{30}$, or $R^{31}$ and $R^{32}$ together are $C_3$-$C_6$-alkylene or $C_3$-$C_6$-alkylene interrupted by O, S and/or $NR^{41}$;

$R^{23}$, $R^{33}$ and $R^{41}$ are independently of one another H, $C_1$-$C_8$-alkyl, $C_5$-$C_6$-cycloalkyl or phenyl;

m and n are independently of one another 0 or 1,
with the proviso that the sum m+n≥1;

s, t, u, and v are independently of one another 0, 1 or 2; and w is 0, 1, 2, 3 or 4.

3. The compound according to claim 1, wherein $Ar^1$ is a residue selected from the group consisting of

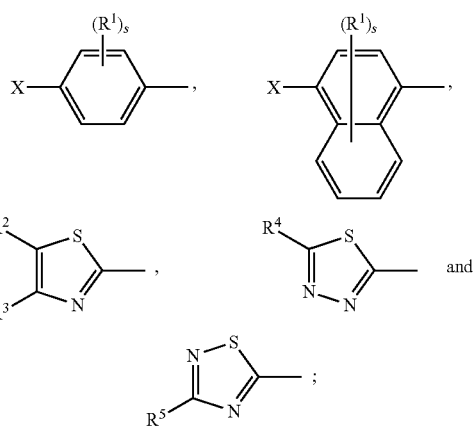

$Ar^4$ is a residue of

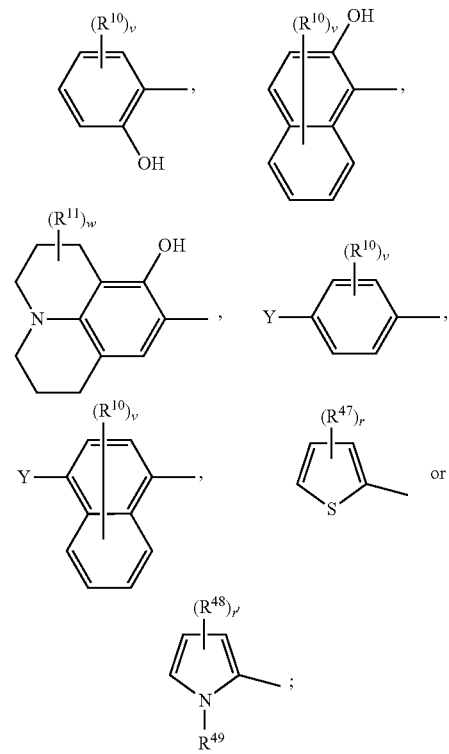

X is $CF_3$, CN, or $COOR^{17}$;

Y is H, $C_1$-$C_8$-alkyl; $CF_3$, $NR^{24}R^{25}$, F, CN, OH, $C_1$-$C_8$-alkoxy; $C_1$-$C_8$-alkylthio; $COOR^{26}$, phenyl; phenyl substituted with $C_1$-$C_8$-alkyl, $C_1$-$C_8$-alkoxy, $C_1$-$C_8$-alkylthio, F, CN or $NR^{27}R^{28}$, or $C_5$-$C_{14}$-cycloalkyl;

or Y and one adjacent H form together a group

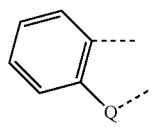

or a 5- to 7-membered heterocyclic ring containing one or two Q,

Q is $NR^{33}$ or O;

said group

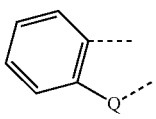

or heterocyclic group is unsubstituted or substituted with $CH_3$;

$R^1$ is $CH_3$, $CF_3$, F or CN;

$R^2$, $R^3$, $R^4$, and $R^5$ are independently of one another and at each occurrence selected from H, F, CN, $COOR^{34}$, $C_1$-$C_8$-alkyl, cyclohexyl or phenyl;

or $R^2$ and $R^3$ together form a benzoanellated ring, said benzoanellated ring is unsubstituted or substituted with $CH_3$, $C_2H_5$ or CN;

$R^{10}$ is at each occurrence selected from $C_1$-$C_8$-alkyl, $CF_3$, F, $C_1$-$C_8$-alkoxy, OH or CN;

$R^{11}$ is at each occurrence $CH_3$ or $C_2H_5$;

$R^{14}$, $R^{17}$, $R^{26}$ and $R^{34}$ are independently of one another $C_1$-$C_8$-alkyl, $C_5$-$C_{14}$-cycloalkyl; phenyl; phenyl substituted with $C_1$-$C_8$-alkyl; phenylene-$C_5$-$C_{14}$-cycloalkyl; or $C_5$-$C_{12}$-cycloalkylene-phenyl;

$R^{12}$, $R^{13}$, $R^{24}$, $R^{25}$, $R^{27}$ and $R^{28}$ are independently of one another H, $C_1$-$C_8$-alkyl, $C_5$-$C_{14}$-cycloalkyl, phenyl; phenylene-$C_5$-$C_{14}$-cycloalkyl; or $C_5$-$C_{12}$-cycloalkylene-phenyl;

or $R^{12}$, and $R^{13}$, $R^{24}$ and $R^{25}$, or $R^{27}$ and $R^{28}$ together are $C^5$-$C^6$-alkylene or $C_3$-$C_6$-alkylene interrupted by O or $NR^{41}$, $R^{33}$, $R^{41}$ and $R^{49}$ are independently of one another H, $C_1$-$C_4$-alkyl, $C_5$-$C_6$-cycloalkyl or phenyl;

$R^{47}$ and $R^{48}$ are independently of one another and in each occurrence selected from $C_1$-$C_8$-alkyl, $C_1$-$C_8$-alkoxy, $C_1$-$C_8$-alkylthio, OH, F, $CF_3$, $NR^{12}R^{13}$, $CO_2R^{14}$ or $NO_2$;

or two adjacent groups of $R^{47}$ or $R^{48}$ form a benzoannelated ring, said benzoannelated ring is unsubstituted or substituted with $C_1$-$C_8$-alkyl, $C_1$-$C_8$-alkoxy, $C_1$-$C_8$-alkylthio, OH, F, $CF_3$, $NR^{12}R^{13}$, $CO_2R^{14}$ or $NO_2$;

r and r' are 0, 1 or 2;

s is 0 or 1;

v is 0, 1 or 2; and w is 0, 2 or 4.

4. The compound according to claim 1, having one of the following formulae

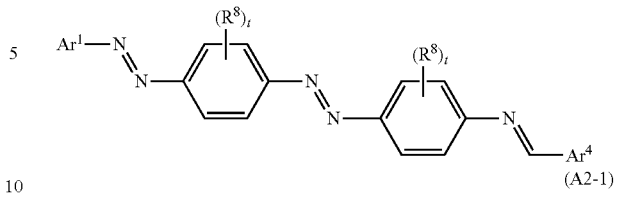
(A1-1)

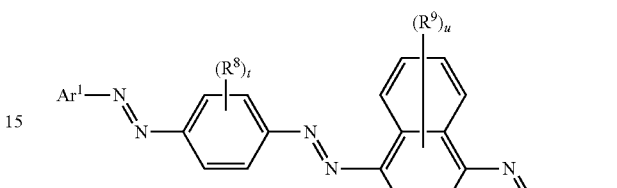
(A2-1)

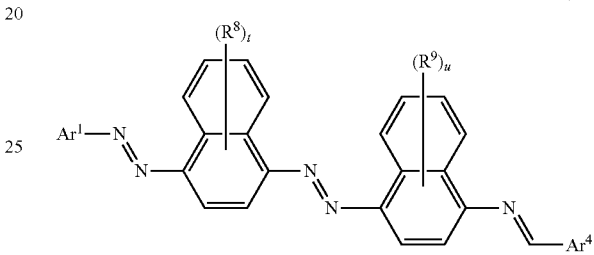
(A3-1)

wherein $Ar^1$ is a residue selected from the group consisting of

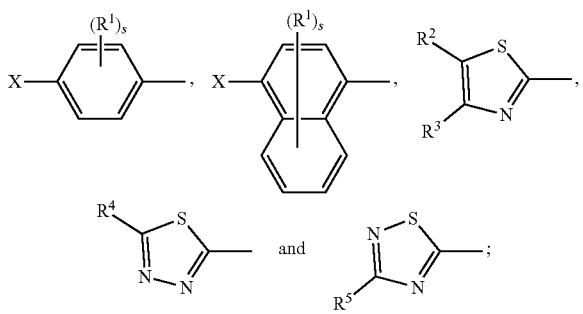

$Ar^4$ is a residue of

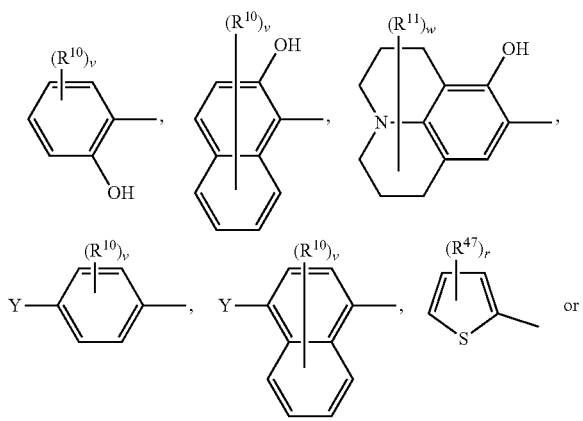

-continued

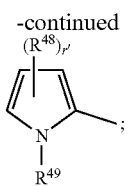

X is CF$_3$, CN, or COOR$^{17}$;
Y is H, C$_1$-C$_8$-alkyl; NR$^{24}$R$^{25}$, F, CN, OH, C$_1$-C$_8$-alkoxy; C$_1$-C$_8$-alkylthio; COOR$^{26}$, phenyl; phenyl substituted with C$_1$-C$_8$-alkyl, C$_1$-C$_8$-alkoxy, C$_1$-C$_8$-alkylthio, or NR$^{27}$R$^{28}$, or C$_5$-C$_{14}$-cycloalkyl;
or Y and one adjacent H form together a group

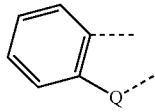

or a 5 to 6-membered heterocyclic ring containing one or two Q,
Q is NR$^{33}$ or O;
said group

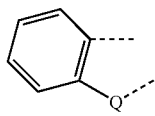

or heterocyclic group is unsubstituted or substituted with CH$_3$;
R$^1$ is CH$_3$, CF$_3$, F or CN;
R$^2$, R$^3$, R$^4$, and R$^5$ are independently of one another and at each occurrence selected from H, F, CN, CO$_2$R$^{34}$, C$_1$-C$_8$-alkyl or phenyl;
or R$^2$ and R$^3$ together form a benzoanellated ring, said benzoanellated ring is unsubstituted or substituted with CH$_3$, C$_2$H$_5$ or CN;
R$^8$ and R$^9$ are independently of one another and at each occurrence CH$_3$;
R$^{10}$ is at each occurrence selected from C$_1$-C$_8$-alkyl, CF$_3$, F, C$_1$-C$_8$-alkoxy, OH or CN;
R$^{11}$ is at each occurrence CH$_3$ or C$_2$H$_5$;
R$^{14}$, R$^{17}$, R$^{26}$ and R$^{34}$ are independently of one another C$_1$-C$_5$-alkyl, C$_6$-C$_{12}$-cycloalkyl, phenyl, phenyl substituted with C$_1$-C$_5$-alkyl; phenylene-C$_6$-C$_{12}$-cycloalkyl; or C$_6$-C$_{12}$-cycloalkylene-phenyl;
R$^{12}$, R$^{13}$, R$^{24}$, R$^{25}$, R$^{27}$ and R$^{28}$ are independently of one another H, C$_1$-C$_8$-alkyl, C$_5$-C$_{14}$-cycloalkyl, phenyl; phenylene-C$_6$-C$_{12}$-cycloalkyl; or C$_6$-C$_{12}$-cycloalkylene-phenyl;
or R$^{12}$ and R$^{13}$, R$^{24}$ and R$^{25}$, or R$^{27}$ and R$^{28}$ together are C$_5$-C$_6$-alkylene or C$_3$-C$_6$-alkylene interrupted by O or NR$^{41}$;
R$^{33}$, R$^{41}$ and R$^{49}$ are independently of one another H, C$_1$-C$_4$-alkyl, C$_5$-C$_6$-cycloalkyl or phenyl;
R$^{47}$ and R$^{48}$ are independently of one another and at each occurrence selected from C$_1$-C$_6$-alkyl, C$_1$-C$_6$-alkoxy, NR$^{12}$R$^{13}$, CO$_2$R$^{14}$ or NO$_2$;
t and v are independently of one another 0, 1 or 2;
r, r', s and u are independently of another 0 or 1; and
w is 0, 2 or 4.

5. The compound according to claim 1, wherein
Ar$^1$ is a residue selected from the group consisting of

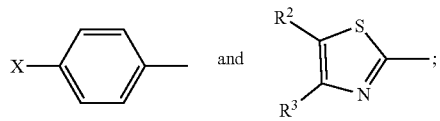

Ar$^4$ is a residue of

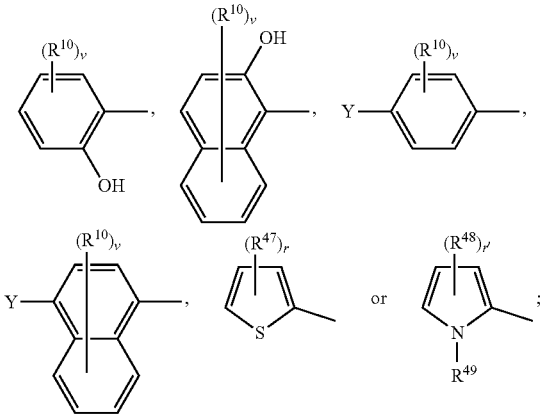

X is CF$_3$, CN or COOR$^{17}$;
R$^2$ and R$^3$ are independently of one another H, F, C$_1$-C$_7$-alkyl or CF$_3$;
r R$^2$ and R$^3$ together form a benzoanellated ring, said benzoanellated ring is unsubstituted or substituted with CH$_3$, C$_2$H$_5$ or CN;
R$^{10}$ is C$_1$-C$_7$-alkyl, CF$_3$, F, Cl, Br, C$_1$-C$_6$-alkoxy, OH or CN;
Y is H, C$_1$-C$_7$-alkyl; C$_1$-C$_7$-alkyl substituted with OH or NH$_2$; NR$^{24}$R$^{25}$, F, CN, OH, C$_1$-C$_6$-alkoxy; COOR$^{26}$, phenyl; phenyl substituted with C$_1$-C$_7$-alkyl, C$_1$-C$_6$-alkoxy, or NR$^{27}$R$^{28}$, or C$_5$-C$_6$-cycloalkyl;
or Y and one adjacent H form together a group

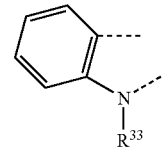

or a 5 to 6-membered heterocyclic ring containing one or two Q,
Q is NR$^{33}$ or O;
said group

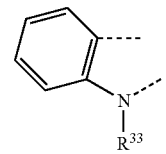

or heterocyclic ring is unsubstituted or substituted with CH$_3$;
R$^{14}$, R$^{17}$ and R$^{26}$ are independently of one another C$_1$-C$_5$-alkyl; C$_6$-C$_{12}$-cycloalkyl; phenyl, phenyl substituted with C₁-C₅-alkyl; phenylene-C₆-C₁₂-cycloalkyl or C₆-C₁₂-cycloalkylene-phenyl;

$R^{12}, R^{13}, R^{24}, R^{25}, R^{27}$ and $R^{28}$ are independently of one another H or $C_1$-$C_5$-alkyl;

or $R^{12}$ and $R^{13}$, $R^{24}$ and $R^{25}$, or $R^{27}$ and $R^{28}$ together are $C_5$-$C_6$-alkylene or $C_5$-$C_6$-alkylene interrupted by O, or $NR^{41}$;

$R^{33}$, $R^{41}$ and $R^{49}$ are independently of one another H or $C_1$-$C_4$-alkyl;

$R^{47}$ and $R^{48}$ are independently of one another and at each occurrence selected from $C_1$-$C_6$-alkyl, $C_1$-$C_6$-alkoxy, $NR^{12}R^{13}$, $CO_2R^{14}$ or $NO_2$;

v is 0, 1 or 2; and r and r' are 0 or 1.

6. A dichroic dye mixture comprising one or more compounds of formula (A), as defined in claim 1, and one or more further dichroic dyes.

7. The dichroic dye mixture according to claim 6, which mixture is a black mixture.

8. A liquid crystal composition comprising a liquid crystal material and at least one compound of formula (A), as defined in claim 1.

9. A light absorption anisotropic element comprising one or more compounds of formula (A), as defined in claim 1.

10. A switchable optical device comprising one or more compounds of formula (A), as defined in claim 1.

11. The switchable optical device according to claim 10, which switchable optical device is a polymer dispersed liquid crystal system, a reversed polymer dispersed liquid crystal system, a polymer network liquid crystal system, a light shutter for smart windows, a transmissive display, a reflective display or a light shutter for decoration.

12. An optically anisotropic film comprising one or more compounds of formula (A), as defined in claim 1.

13. The optically anisotropic film according to claim 12, which optically anisotropic film is a stretched polymer film, a coatable polarizer, a retarder film, a security feature or a feature for brand protection.

14. A process for preparing a compound of formula (A)

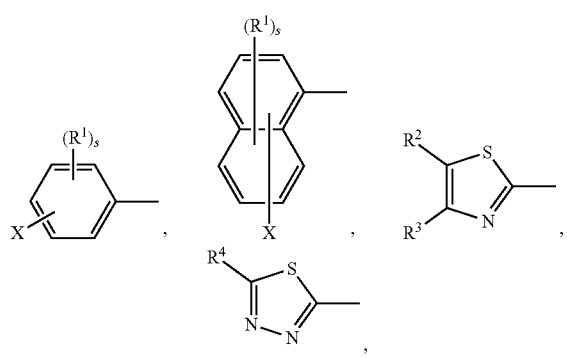

wherein $Ar^1$ is a residue selected from the group consisting of

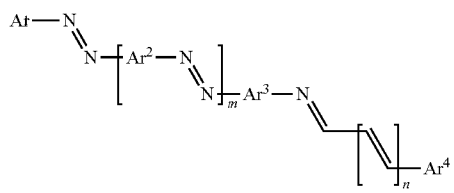

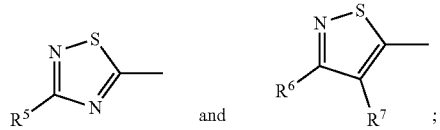

$Ar^2$ and $Ar^3$ are independently of one another and at each occurrence selected from

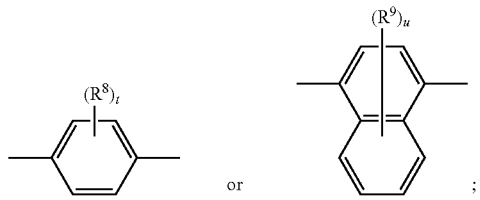

$Ar^4$ is a residue

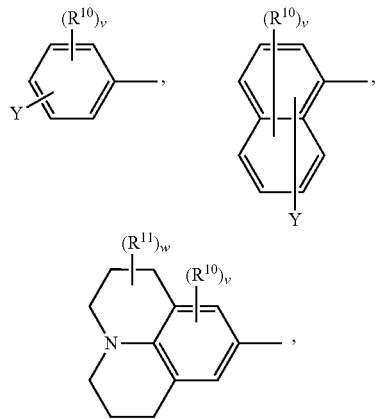

of $C_2$-$C_{10}$-heteroaryl, $C_2$-$C_{10}$-heteroaryl substituted with $C_1$-$C_{12}$-alkyl, $C_1$-$C_{12}$-alkoxy, $C_1$-$C_{12}$-alkylthio, OH, halogen, $C_1$-$C_4$-haloalkyl, $NR^{12}R^{13}$, $CO_2R^{14}$, $COR^{15}$, $SO_2R^{16}$, $NO_2$ or CN;

X is $C_1$-$C_6$-haloalkyl, CN, $COOR^{17}$,

Y is H, $C_1$-$C_{12}$-alkyl; $C_1$-$C_{12}$-alkyl substituted with OH or $NH_2$ and/or interrupted with $NR^{23}$, O or S; $C_1$-$C_{12}$-haloalkyl, $C_7$-$C_{12}$-aralkyl; $NR^{24}R^{25}$, halogen, CN, OH, $C_1$-$C_{12}$-alkoxy; $C_2$-$C_{12}$-alkoxy interrupted with O; $C_1$-$C_{12}$-alkylthio; $COOR^{26}$, $C_6$-$C_{12}$-aryl; $C_6$-$C_{12}$-aryl substituted with $C_1$-$C_{12}$-alkyl, $C_1$-$C_{12}$-alkoxy, $C_1$-$C_{12}$-alkylthio, CN, halogen, OH or $NR^{27}R^{28}$, $C_2$-$C_{10}$-heteroaryl, $C_2$-$C_{10}$-heteroaryl substituted with $C_1$-$C_{12}$-alkyl, $C_1$-$C_{12}$-alkoxy, $C_1$-$C_{12}$-alkylthio, OH, halogen, CN or $NR^{29}R^{30}$; $C_3$-$C_{18}$-cycloalkyl, or $C_3$-$C_{18}$-cycloalkyl substituted with $C_1$-$C_{12}$-haloalkyl, halogen, CN, OH, $C_1$-$C_{12}$-alkoxy, $C_1$-$C_{12}$-alkylthio or $NR^{31}R^{32}$ and/or interrupted by one or more O;

or Y and one adjacent H form together a group

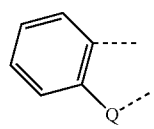

or a 5 to 7-membered heterocyclic ring containing one or two Q,

Q is $NR^{33}$, O or S;

said group

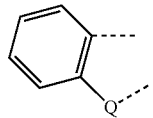

or heterocyclic ring is unsubstituted or substituted with $C_1$-$C_4$alkyl;

$R^1$ is $C_1$-$C_{12}$-alkyl, $C_1$-$C_{12}$-haloalkyl, halogen, CN, $C_1$-$C_{12}$-alkoxy or $C_2$-$C_{12}$-alkoxy interrupted with O;

$R^2$, $R^3$, $R^4$, $R^5$, $R^6$, and $R^7$ are independently of one another and at each occurrence selected from H, halogen, $OCF_3$, $NO_2$, CN, formyl, $COOR^{34}$, $COR^{35}$, $SO_2R^{36}$, $CONR^{37}R^{38}$, $C_1$-$C_{12}$-alkyl; $C_1$-$C_{12}$-alkyl substituted with halogen or CN; $C_1$-$C_{12}$-alkoxy; $C_2$-$C_{12}$-alkoxy interrupted with O; $C_3$-$C_{12}$-cycloalkyl; $C_3$-$C_{12}$-cycloalkyl substituted with halogen or CN and/or interrupted by one or more O; phenyl; or phenyl substituted with halogen, CN, $C_1$-$C_8$-alkyl or $C_1$-$C_8$-haloalkyl;

or $R^2$ and $R^3$, or $R^6$ and $R^7$ together are $C_3$-$C_4$-alkylene or form a benzoanellated ring, said alkylene or benzoanellated ring is unsubstituted or substituted with $C_1$-$C_4$-alkyl, CN, $C_1$-$C_4$-alkoxy, $NO_2$, halogen, or $SO_2R^{39}$;

$R^8$ and $R^9$ are independently of one another and at each occurrence selected from $C_1$-$C_4$-alkyl, $C_1$-$C_4$-haloalkyl, halogen, CN or $C_1$-$C_4$-alkoxy;

$R^{10}$ is at each occurrence selected from $C_1$-$C_{12}$-alkyl, $C_1$-$C_4$-haloalkyl, $C_1$-$C_{12}$-alkoxy, OH, halogen or CN;

$R^{11}$ is at each occurrence $C_1$-$C_4$-alkyl;

$R^{14}$, $R^{15}$, $R^{16}$, $R^{17}$, $R^{26}$, $R^{34}$, $R^{35}$, $R^{36}$, $R^{39}$ and $R^{40}$ are independently of one another $C_1$-$C_{12}$-alkyl; $C_1$-$C_{12}$-alkyl substituted with CN or OH; $C_1$-$C_{12}$-haloalkyl; $C_3$-$C_{18}$-cycloalkyl, $C_3$-$C_{12}$-cycloalkyl substituted with $C_1$-$C_{12}$-haloalkyl, CN, OH or halogen and/or interrupted by one or more O; $C_6$-$C_{12}$-aryl, $C_6$-$C_{12}$-aryl substituted with halogen, CN, OH, $C_1$-$C_{12}$-alkyl or $C_1$-$C_{12}$-haloalkyl; phenylene-$C_3$-$C_{18}$-cycloalkyl; phenylene-$C_3$-$C_{18}$-cycloalkyl substituted with halogen, CN or OH; $C_3$-$C_{12}$-cycloalkylene-phenyl; or $C_3$-$C_{12}$-cycloalkylene-phenyl substituted with $C_1$-$C_{12}$-alkyl, $C_1$-$C_{12}$-haloalkyl, halogen, CN or OH;

$R^{12}$, $R^{13}$, $R^{24}$, $R^{25}$, $R^{27}$, $R^{28}$, $R^{29}$, $R^{30}$, $R^{31}$, $R^{32}$, $R^{37}$ or $R^{38}$ are independently of one another H, $C_1$-$C_{12}$-alkyl; $C_3$-$C_{14}$-cycloalkyl; $C_6$-$C_{12}$-aryl; $C_6$-$C_{12}$-aryl substituted with halogen, CN, OH, $C_1$-$C_{12}$-alkyl or $C_1$-$C_{12}$-haloalkyl; phenylene-$C_3$-$C_{18}$-cycloalkyl; phenylene-$C_3$-$C_{18}$-cycloalkyl substituted with halogen, CN or OH; $C_3$-$C_{12}$-cycloalkylene-phenyl; or $C_3$-$C_{12}$-cycloalkylene-phenyl substituted with $C_1$-$C_{12}$-alkyl, $C_1$-$C_{12}$-haloalkyl, halogen, CN or OH;

or $R^{12}$ and $R^{13}$, $R^{24}$ and $R^{25}$, $R^{27}$ and $R^{28}$, $R^{29}$ and $R^{30}$, $R^{31}$ and $R^{32}$, or $R^{37}$ and $R^{38}$ together are $C_2$-$C_{12}$-alkylene or $C_2$-$C_{12}$-alkylene interrupted by O, S and/or $NR^{41}$;

$R^{23}$, $R^{33}$ and $R^{41}$ are independently of one another H, $C_1$-$C_{12}$-alkyl, $C_3$-$C_{12}$-cycloalkyl, phenyl or phenyl substituted with $C_1$-$C_6$-alkyl, or CN;

m and n are independently of one another 0 or 1, with the proviso that the sum m+n≥1;

s, t, u and v, are independently of one another 0, 1 or 2; and w is 0, 1, 2, 3 or 4 the process comprising condensation of an amino-substituted azo compound of formula (A-A) and an aldehyde of formula (A-B):

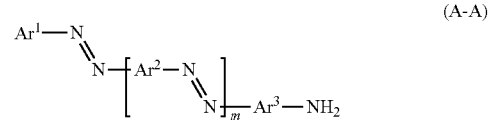
(A-A)

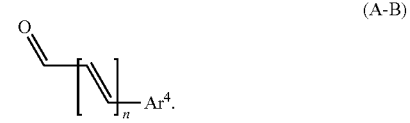
(A-B)

* * * * *